United States Patent
Gvili

(10) Patent No.: US 12,284,191 B2
(45) Date of Patent: Apr. 22, 2025

(54) SELECTIVITY IN PRIVACY AND VERIFICATION WITH APPLICATIONS

(71) Applicant: Yaron Gvili, Kefar Sava (IL)

(72) Inventor: Yaron Gvili, Kefar Sava (IL)

( * ) Notice: Subject to any disclaimer, the term of this patent is extended or adjusted under 35 U.S.C. 154(b) by 0 days.

(21) Appl. No.: 18/154,501

(22) Filed: Jan. 13, 2023

(65) Prior Publication Data

US 2023/0336567 A1    Oct. 19, 2023

Related U.S. Application Data

(63) Continuation of application No. 16/948,633, filed on Sep. 25, 2020, now Pat. No. 11,558,398, which is a continuation of application No. 15/360,848, filed on Nov. 23, 2016, now Pat. No. 10,791,123.

(60) Provisional application No. 62/260,125, filed on Nov. 25, 2015, provisional application No. 62/294,631, filed on Feb. 12, 2016, provisional application No.
(Continued)

(51) Int. Cl.
  *G06F 21/64*    (2013.01)
  *H04L 9/06*     (2006.01)
  *H04L 9/08*     (2006.01)
  *H04L 9/32*     (2006.01)
  (Continued)

(52) U.S. Cl.
  CPC .......... H04L 63/123 (2013.01); H04L 9/0625 (2013.01); H04L 9/085 (2013.01); H04L 9/3239 (2013.01); H04L 63/0428 (2013.01)

(58) Field of Classification Search
  CPC ..... H04L 63/123; H04L 9/0625; H04L 9/085; H04L 9/3239; H04L 63/0428; H04L 9/0891; H04L 9/3242; H04L 2209/56; H04L 9/50
  See application file for complete search history.

(56) References Cited

U.S. PATENT DOCUMENTS 6,396,928 B1    5/2002   Zheng et al.
8,726,009 B1    5/2014   Cook et al.
(Continued)

FOREIGN PATENT DOCUMENTS

EP    3506561 A1    7/2019
EP    3647979 A1    5/2020
WO    WO-2020202082 A1 * 10/2020 ........... G06F 21/602

OTHER PUBLICATIONS

Yu Liu, Kaiping Xue, Peixuan He, David S. L. Wei, Mohsen Guizani; "An Efficient, Accountable, and Privacy-Preserving Access Control Scheme for Internet of Things in a Sharing Economy Environment"; IEEE Internet of Things Journal, vol. 7, Issue: 7; Publisher: IEEE; Jul. 2020; pp. 6634-6646 (Year: 2020).*
(Continued)

*Primary Examiner* — Fatoumata Traore
*Assistant Examiner* — Courtney D Fields
(74) *Attorney, Agent, or Firm* — Brake Hughes Bellermann LLP

(57) ABSTRACT

The present description relates to systems and techniques for allowing a third party verifier to verify aspects of secured data, or successful communication thereof. For example, a message or other data may be associated with a shared manifest that describes aspects of some data but does not reveal or expose the data. As a result, the data may be kept private while selective privacy and verification with respect to the data is achieved by the inclusion of only selected aspects of said data in the shared manifest.

21 Claims, 20 Drawing Sheets

Related U.S. Application Data

62/331,139, filed on May 3, 2016, provisional application No. 62/358,970, filed on Jul. 6, 2016.

(51) Int. Cl.
*H04L 9/40* (2022.01)
*G06F 21/60* (2013.01)

(56) References Cited

U.S. PATENT DOCUMENTS

| | | | |
|---|---|---|---|
| 10,791,123 | B2 | 9/2020 | Gvili |
| 2007/0235517 | A1 | 10/2007 | Oconnor et al. |
| 2013/0339730 | A1* | 12/2013 | Nagai .................. H04L 9/3271 |
| | | | 713/168 |
| 2016/0352694 | A1* | 12/2016 | Lim ...................... H04L 63/107 |
| 2018/0181964 | A1 | 6/2018 | Zagarese et al. |
| 2022/0158849 | A1* | 5/2022 | Monica .................. H04L 9/088 |
| 2024/0119168 | A1* | 4/2024 | Venkatesan ............ H04L 63/20 |

OTHER PUBLICATIONS

Extended European Search Report for European Application No. 16869331.5, mailed Nov. 2, 2018, 8 pages.

Extended European Search Report for European Application No. 20200210.1, mailed Nov. 3, 2020, 5 pages.

Extended European Search Report for European Application No. 22164415.6, mailed Jul. 8, 2022, 8 pages.

First Examination Report for Indian Application No. 201847019630, mailed Dec. 9, 2020, 5 pages.

International Preliminary Report on Patentability for Application No. PCT/US2016/063752, mailed on Jun. 7, 2018, 10 pages.

Non Final Office Action for U.S. Appl. No. 15/360,848, mailed on Jul. 20, 2018, 18 pages.

Bashaa , et al., "Secret Key Generation in Wireless Sensor Network Using Public Key Encryption", ICICT, baghdad, Iraq; Association for Computing Machinery; ACM ISBN 978-1-4803-6643-4/19/04;, Apr. 15-16, 2019, 7 pages.

PCT/US2016/63752 , "International Search Report and Written Opinion Received", Feb. 14, 2017, 11 pages.

Zhang , et al., "A Remote-Attestation-Based Extended Hash Algorithm for Privacy Protection", International Conference on Computer Network, Electronic and Automation, 2017, pp. 254-257.

* cited by examiner

900

| | | | | | | | | | |
|---|---|---|---|---|---|---|---|---|---|
| 910 Secret | $s_j$ | 0 | 0 | 0 | 0 | 1 | 1 | 1 | 1 |
| 920 Auxiliary Secret | $k_j$ | -1 | -1 | 1 | 1 | -1 | -1 | 1 | 1 |
| 930 Transformed Secret | $t_j$ | 0 | 0 | 0 | 0 | -1 | -1 | 1 | 1 |
| 940 Secret Piece | $r_{0,j}$ | 0 | -1 | 0 | 1 | 0 | -1 | 0 | 1 |
| 950 Secret Piece | $r_{1,j}$ | 0 | 1 | 0 | -1 | -1 | 0 | 1 | 0 |

FIG. 9

SELECTIVITY IN PRIVACY AND VERIFICATION WITH APPLICATIONS

CROSS-REFERENCE TO RELATED APPLICATIONS

This application is a continuation of U.S. application Ser. No. 16/948,633, filed on Sep. 25, 2020, titled SELECTIVITY IN PRIVACY AND VERIFICATION WITH APPLICATIONS, which claims priority to U.S. application Ser. No. 15/360,848, filed on Nov. 23, 2016, titled SELECTIVITY IN PRIVACY AND VERIFICATION WITH APPLICATIONS, which claims priority to U.S. Prov. Appln. No. 62/260,125, filed on Nov. 25, 2015, titled SECURE COMMUNICATION WITH SELECTIVITY IN PRIVACY AND VERIFICATION, and U.S. Prov. Appln. No. 62/294,631, filed on Feb. 12, 2016, titled VERIFIABLE COMMUNICATION TECHNIQUES WITH APPLICATIONS TO PREVIEWING, and U.S. Prov. Appln. No. 62/331,139, filed on May 3, 2016, titled SELECTIVE PRIVACY AND VERIFICATION FOR COMPUTATION, COMMUNICATION AND APPLICATIONS, and U.S. Prov. Appln. No. 62/358,970, filed on Jul. 6, 2016, titled MORE SELECTIVE PRIVACY AND VERIFICATION FOR COMPUTATION AND COMMUNICATION, and U.S. Prov. Appln. No. 62/395,276, filed on Sep. 15, 2016, titled FURTHER SELECTIVE PRIVACY AND VERIFICATION FOR COMPUTATION AND COMMUNICATION, the disclosures of which are incorporated by reference herein in their entirety.

TECHNICAL FIELD

This description relates to data security.

BACKGROUND

Conventional systems and techniques exist for securing data, whether at-rest or in-motion or otherwise. Particularly, in the realm of digital data, it is often highly likely that data can potentially be accessed or otherwise illicitly obtained by an entity who is not intended to have access or otherwise unauthorized to the data. Such data must therefore be secured, so that the unintended entity will be unable to inspect or alter the data.

For example, a message containing data to be sent from a transmitting entity to a receiving entity may be encoded in a manner which attempts to ensure that only the intended recipient(s) will be able to decode the message and obtain the data therein. Thus, even if the encoded message is transmitted in a manner that is accessible to unintended recipients (e.g., is sent over the public Internet), the unintended recipients will be unable to obtain or alter the data being communicated. In a similar example, stored data may be encoded in a manner which attempts to ensure that only intended entities will be able to retrieve and decode the stored data. The many known techniques for implementing public/private key cryptography provide specific examples of such scenarios, and other examples are also known.

In many scenarios, however, it is difficult or impossible for a third party to verify aspects of secured data, or successful communication thereof. Consequently, in scenarios in which such third-party verification would be necessary or helpful, undesirable levels of cost and effort must be expended, or the desired verification may have to be abandoned entirely, or may not be sufficiently reliable. In such scenarios, then, profits and efficiencies may be reduced, and data security may be compromised.

SUMMARY

According to one general aspect, a computer program product may include instructions recorded on a non-transitory computer readable storage medium, which, when executed by at least one process, are configured to cause at least one processor to transform a first secret including confidential data into a first public representation of the first secret, execute an instruction on the first secret to obtain a second secret, and transform the second secret into a second public representation of the second secret. The instructions, when executed, may further generate an instruction statement that conveys an instruction relation between the first public representation of the first secret and the second public representation of the second secret, generate a first gestalt statement characterizing a first gestalt relation between a first plurality of pieces secrets, the first gestalt relation defining a manner in which the first pieces secret combine to provide the first secret, and generate a second gestalt statement characterizing a second gestalt relation between a second plurality of pieces secrets, the second gestalt relation defining a manner in which the second pieces secret combine to provide the second secret. The instructions, when executed, may further provide the instruction statement, the first gestalt statement, and the second gestalt statement within a shared manifest to enable verification of application of the instruction with respect to the first secret and the second secret.

In the following implementations, any suitable combination(s) may be understood to be included of the various features recited herein. For example, in one or more implementations, the first public representation of the first secret may be encrypted, and the verification does not require decrypting the first public representation of the first secret.

The instructions, when executed, may further split the first secret into the first plurality of pieces secrets that are combinable via the first gestalt relation, wherein the splitting of the first secret may be inverted using the first gestalt relation, and split the second secret into the second plurality of pieces secrets that are combinable back via the second gestalt relation. The instructions, when executed, may further select a first subset of pieces from the first plurality of pieces secrets, and select a second subset of pieces from the second plurality of pieces secrets. The instructions, when executed, may further generate a first pieces statement that reveals the first subset of pieces secrets to enable verification of knowledge of the first secret, generate a second pieces statement that reveals the second subset of pieces secrets to enable verification of knowledge of the first secret, and include the first pieces statement and the second pieces statement within the shared manifest to enable verification of knowledge of the first secret and the second secret.

The first plurality of pieces secrets may have a first pieces relation to the first secret that enables the first subset of pieces secrets to be publically revealed while maintaining confidentiality of the confidential data. The first public representation of the first secret may include a first hashed value of the first secret, and the verification may involve matching the first public representation with a hashing of the first secret. The first public representation of the first secret may include a first hashed value of the first secret, and the verification may involve matching the first public representation with a hashing of the first subset of pieces.

The instructions, when executed, may further augment the shared manifest to be provided among a plurality of shared manifests in a manner that makes the shared manifest indistinguishable from the plurality of shared manifests to a potential attacker, and that enables a recipient of the shared manifest to detect whether the potential attacker has made a change to the plurality of shared manifests.

The instructions, when executed, may further provide the shared manifest in conjunction with a message associated with the confidential data and sent from a sender to a recipient with access to the confidential data, wherein the verification includes confirmation, by a verifier not having access to the confidential data, that the recipient received the message and had the access to the confidential data, and verification of a characteristic of the confidential data. The verification may include a partial verification of only a portion of the characteristic of the confidential data. The shared manifest may be one of a plurality of shared manifests, and the sender may have only partial control over which shared manifest is received by the recipient.

The instructions, when executed, may further receive a plurality of instructions, including the instruction, compile the plurality of instructions into executable instructions, and execute the plurality of instructions, including the executing the instruction on the first secret to obtain the second secret.

The confidential data may include a digital good and the verification may include confirmation of a characteristic of the digital good for which a recipient of the digital good has committed compensation to a provider of the digital good. The confidential data may include accounting information and the verification may include confirmation of a characteristic of the accounting information. The confidential data may include enciphered data and the verification may include a preview of the enciphered data without deciphering. The confidential data may include encrypted confidential data to be checked for authorization for transmission through a gateway, and the verification may include verifying the authorization without decrypting the encrypted confidential data.

Various corresponding methods and systems may also be implemented. Further, in additional or alternative implementations, a computer program product may instructions recorded on a non-transitory computer readable storage medium, which, when executed by at least one process, may be configured to cause at least one processor to receive a shared manifest. The shared manifest may include an instruction statement that conveys an instruction relation between a first public representation of a first secret and a second public representation of a second secret, wherein the first secret includes confidential data and the second secret was obtained by execution of an instruction on the first secret. The shared manifest may include a first gestalt statement characterizing a first gestalt relation between a first plurality of pieces secrets, the first gestalt relation defining a manner in which the first pieces secret combine to provide the first secret. The shared manifest may include a second gestalt statement characterizing a second gestalt relation between a second plurality of pieces secrets, the second gestalt relation defining a manner in which the second pieces secret combine to provide the second secret. The instructions, when executed, may further verify application of the instruction with respect to the first secret and the second secret, based on the shared manifest.

Any of the various implementations referenced herein, and/or associated methods or systems, may be utilized in conjunction with the preceding computer program product. Further, for example, the instructions, when executed, may access information relevant to the characteristic, and derive additional information regarding the characteristic from the relevant information.

BRIEF DESCRIPTION OF THE DRAWINGS

FIG. 9 is a table diagram illustrating an example construction corresponding to FIG. 8.

DETAILED DESCRIPTION

Figure 1A:
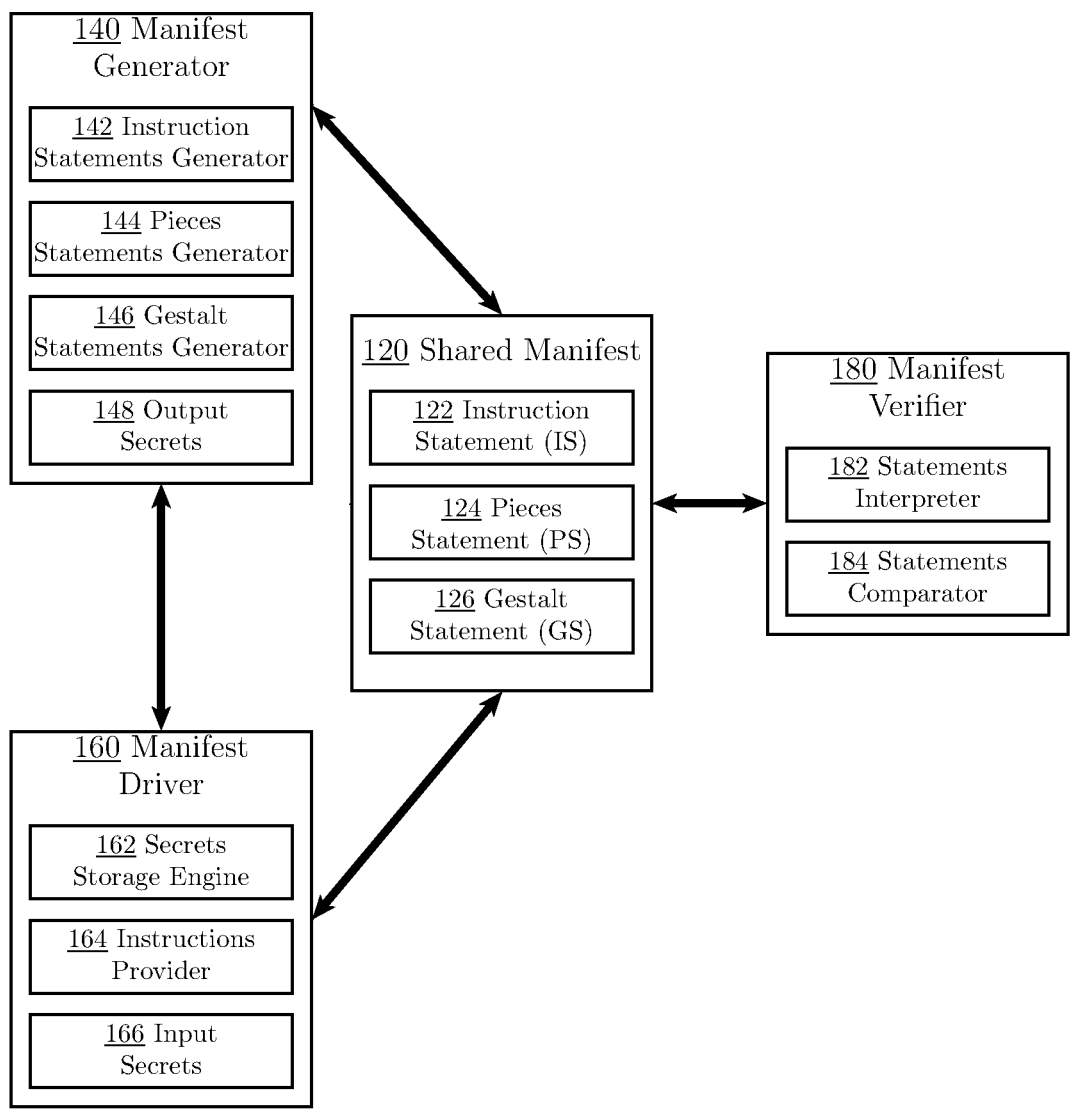
FIG. 1A is a block diagram of a system for selective privacy and verification.
Figure 1B:
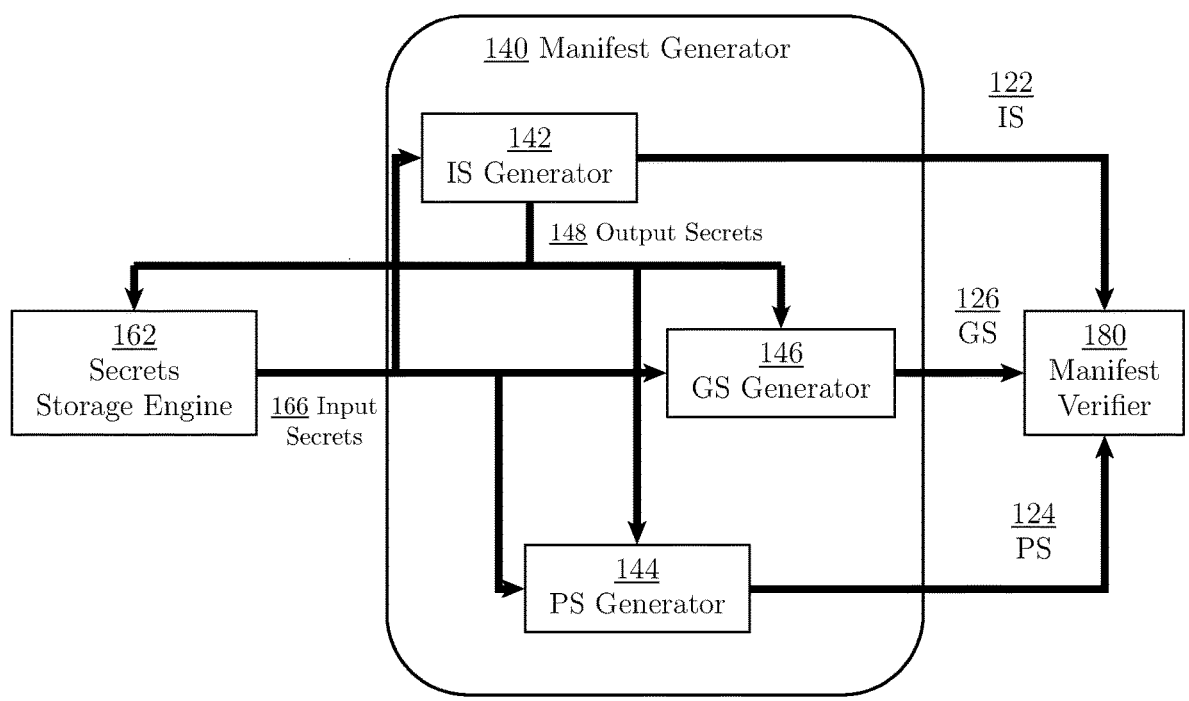
FIG. 1B is a schematic diagram of a system for selective privacy and verification.

FIG. 1A is a block diagram and FIG. 1B is a schematic diagram of a system 100 for selective privacy and verification. In the system 100, a manifest verifier 180 is configured to utilize a shared manifest 120 for data in order to provide de-centralized, third-party selective verification for a manifest driver 160, who is configured to utilize a manifest generator 140 in order to produce with selective privacy the shared manifest 120.

As will be described in more detail herein, the shared manifest 120 may describe aspects of some data but does not reveal or expose said data. Herein, the meaning of not revealing or exposing information about secrets is making it infeasible for unintended entities to learn about said secrets. Thus, said data may be kept private while selective privacy and verification with respect to said data is achieved by the inclusion of only selected aspects of said data in the shared manifest 120.

Figure 3A:
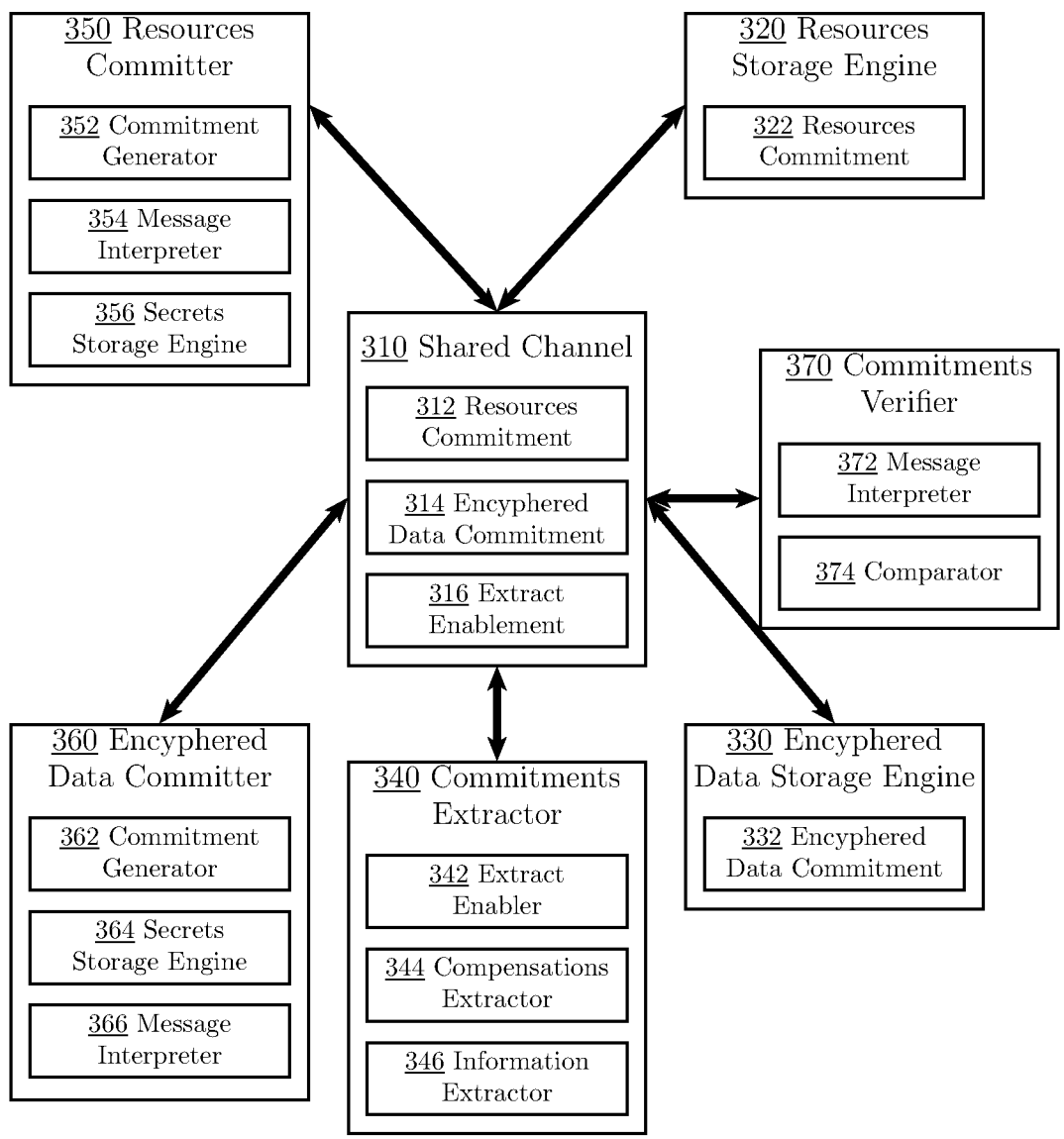
FIG. 3A is a block diagram of a system illustrating a first example embodiment of the system of FIG. 1A.
Figure 4:
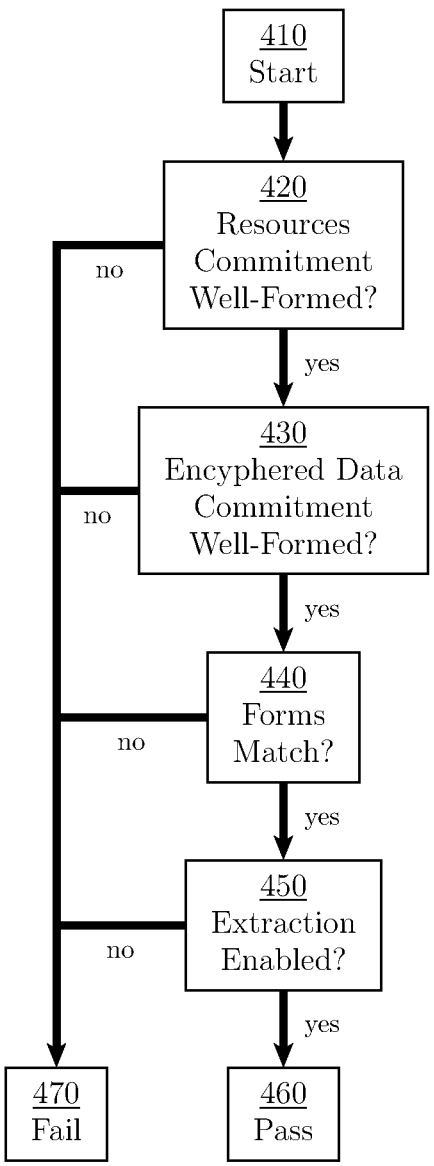
FIG. 4 is a block diagram of a flowchart illustrating example operations of the system of FIG. 3A.
Figure 5:
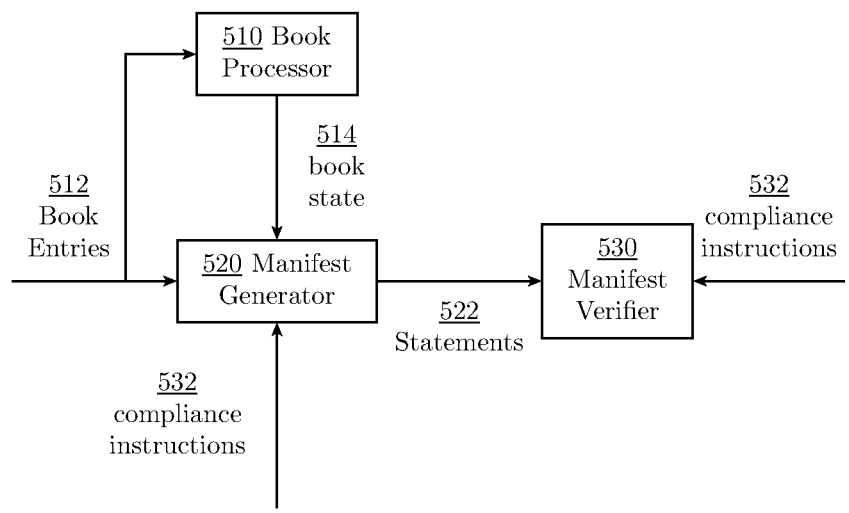
FIG. 5 is a block diagram of a system illustrating a second example embodiment of the system of FIG. 1A.
Figure 6:
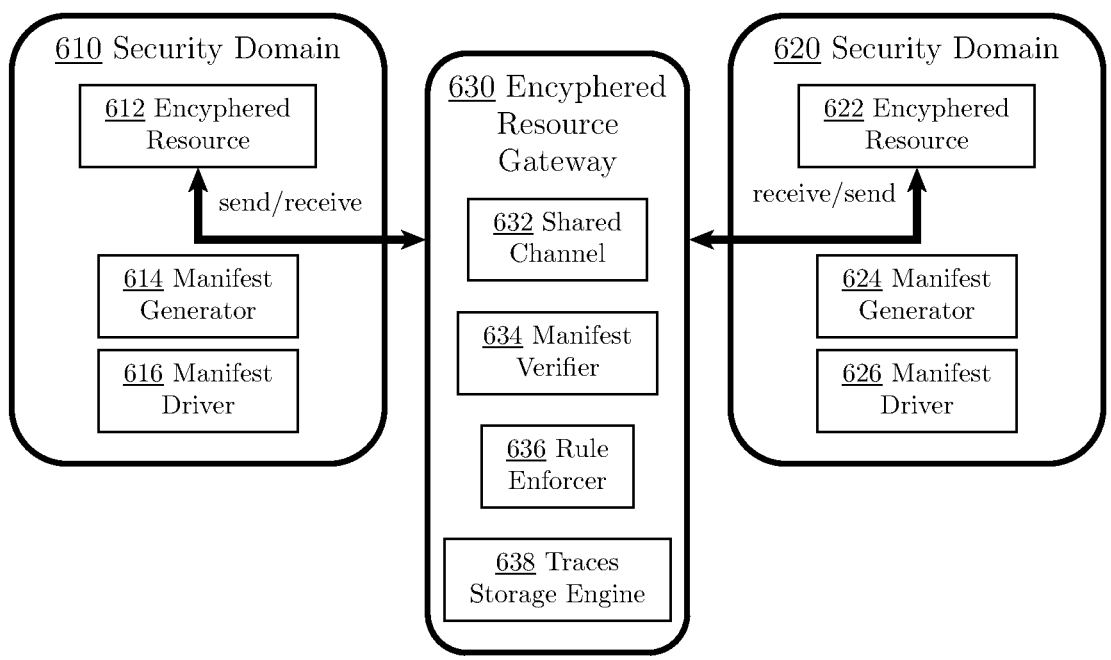
FIG. 6 is a block diagram of a system illustrating a third example embodiment of the system of FIG. 1A.
Figure 10:
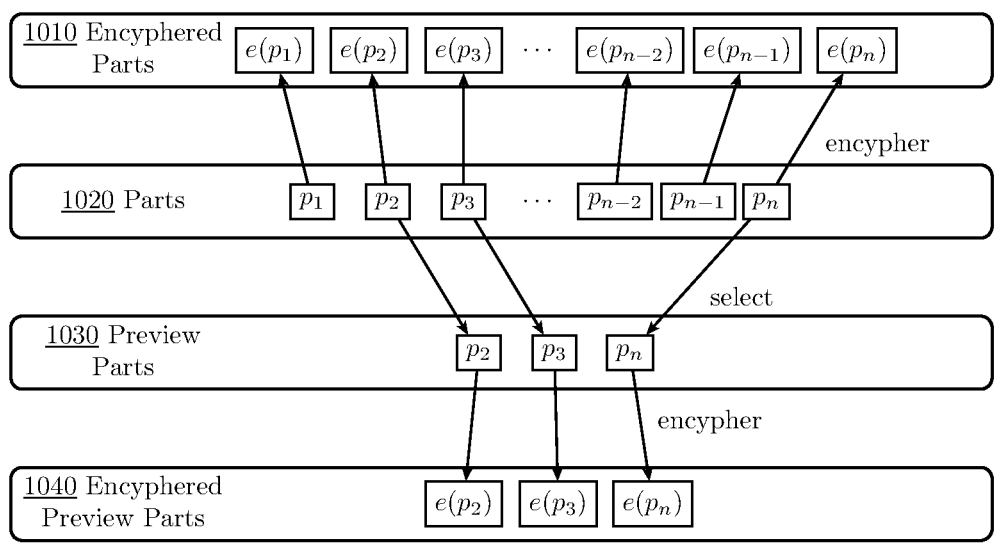
FIG. 10 is a schematic diagram of a system illustrating a fourth example embodiment of the system of FIG. 1A, incorporating an example implementation of FIG. 7.

As described in detail herein, such selective privacy and verification provide advantages in a number of scenarios, including, e.g., restricting or eliminating an ability of parties to deny data aspects described by the shared manifest 120, facilitating commerce involving digital goods or compensations for information as described herein with respect to FIG. 3A and FIG. 4, facilitating compliance auditing as described herein with respect to FIG. 5, and enabling encyphered data previewing and gateway-processing as described herein with respect to FIG. 10 and FIG. 6. Further, as described in detail herein, such privacy and verification may be enhanced in a number of ways including, e.g., by using zero-knowledge hashing as described herein with respect to FIG. 7 and FIG. 8 and FIG. 9, knowledge extension as described herein with respect to FIG. 12, compilation of manifest code as described herein with respect to FIG. 13, as well as various types of verifiable communication techniques, e.g. regular verifiable communication, verifiable communication commitments as described herein with respect to FIG. 14, verifiable partial communication as described herein with respect to FIG. 15, indistinguishability communication as described herein with respect to FIG. 16 and FIG. 17, and verifiable oblivious communication as described herein with respect to FIG. 18.

Moreover, verification techniques described herein, as well as others that would be apparent to one skilled in the art, may be operated in a de-centralized manner, easily implementable by virtually any entity wishing to obtain verification, and without requiring the use of a trusted third party. These and various other uses and advantages of the system 100, and related systems, are described in detail herein, or would be apparent from the following description.

More specifically, for purposes of the example of FIG. 1A, the secrets storage engine 162 is used to fetch input secrets 166 to be operated on using instructions provided by the instructions provider 164. Secrets may be placed in the secrets storage engine 162 at any time. In one example, to be elaborated on with respect to FIG. 5, a financial entity may be interested in keeping its books private while enabling an accounting party to verify that the entitys book is in compliance with certain risk limits. In this example, the entitys book entries may be kept secret and placed in the secrets storage engine 120, while verification risk limits may be enabled by constructing an appropriate shared manifest 120 based on the secret book entries, as described in more detail herein.

Moreover, secrets that are generated as a result of operating the system 100 may also be placed in the secrets storage engine 120. In one example, to be elaborated on with respect to FIG. 3A, a person may be interested in keeping their heartrate data private while enabling a healthcare provider to verify the persons heartrate patterns are within healthy limits. In this example, the persons heartrate data may be kept secret and placed in the secrets storage engine 120 and the heartrate patterns may be obtained as output secrets 148 during the generation of a shared manifest 120 using appropriate instructions, as described in more detail herein. Thus, the secret storage engine 162 may be used to keep secrets that are obtained either internally or externally to the system 100. Furthermore, in embodiments of the system 100, secrets may be placed in the secrets storage engine 162 in sequence, incrementally, in parallel, in a distributed fashion, or other ordering.

Further, for the purposes of the example of FIG. 1B, the instruction statement generator 142, given an instruction, operates on input secrets 166 to produce instruction statements 122 and output secrets 148. Thus, the instruction statement generator 142 may be used to establish a relation between some input secrets 166 to some output secrets 148 without revealing secrets. The relation is determined by the corresponding instruction handled by the instruction statements generator 142. In one example, to be elaborated on in with respect to FIG. 6, an encyphered resource gateway may be configured to allow only certain white-listed documents to pass through the gateway from one security domain to another. In this case the instruction statements 122 may indicate to the gateway that an encyphered document being sent through the gateway indeed appears on the white-list, so that the gateway may allow it through, yet without exposing the document itself to the gateway. More generally, the relation is described in a corresponding instruction statement 122 in the shared manifest 120 that a manifest verifier 180 is able to check.

Figure 7:
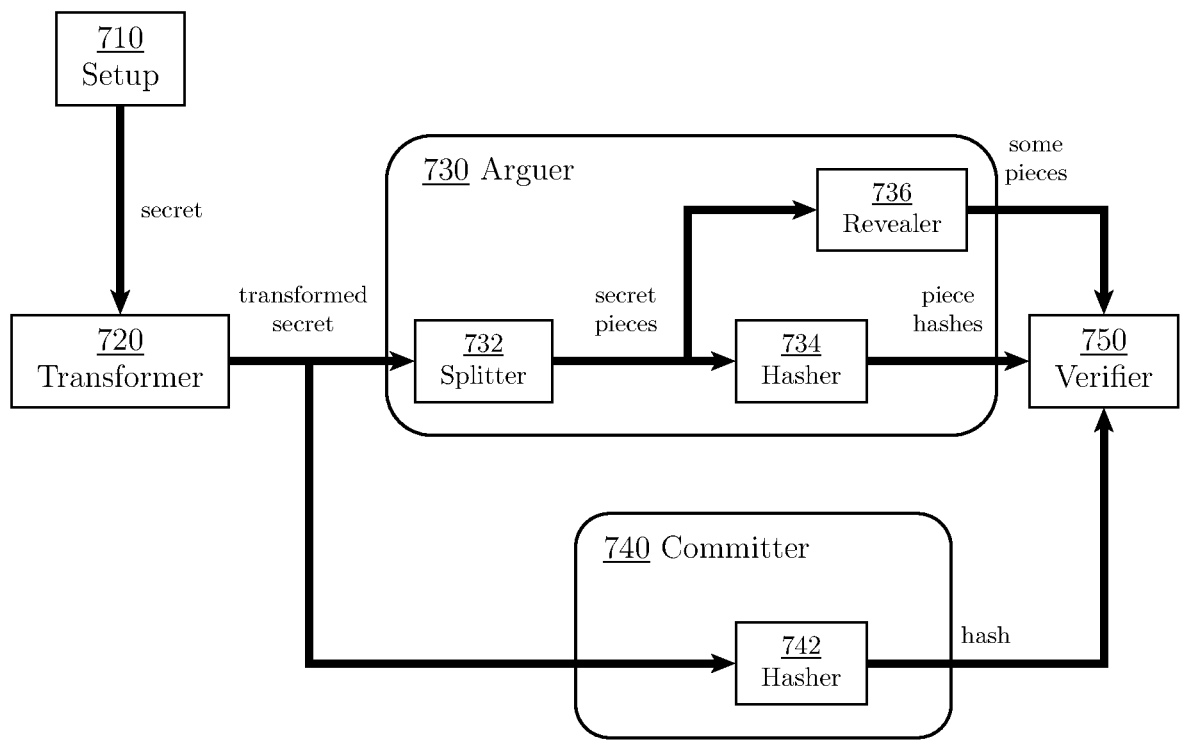
FIG. 7 is a schematic diagram illustrating the use of zero-knowledge hashing in an example implementation of the system of FIG. 1A.
Figure 8:
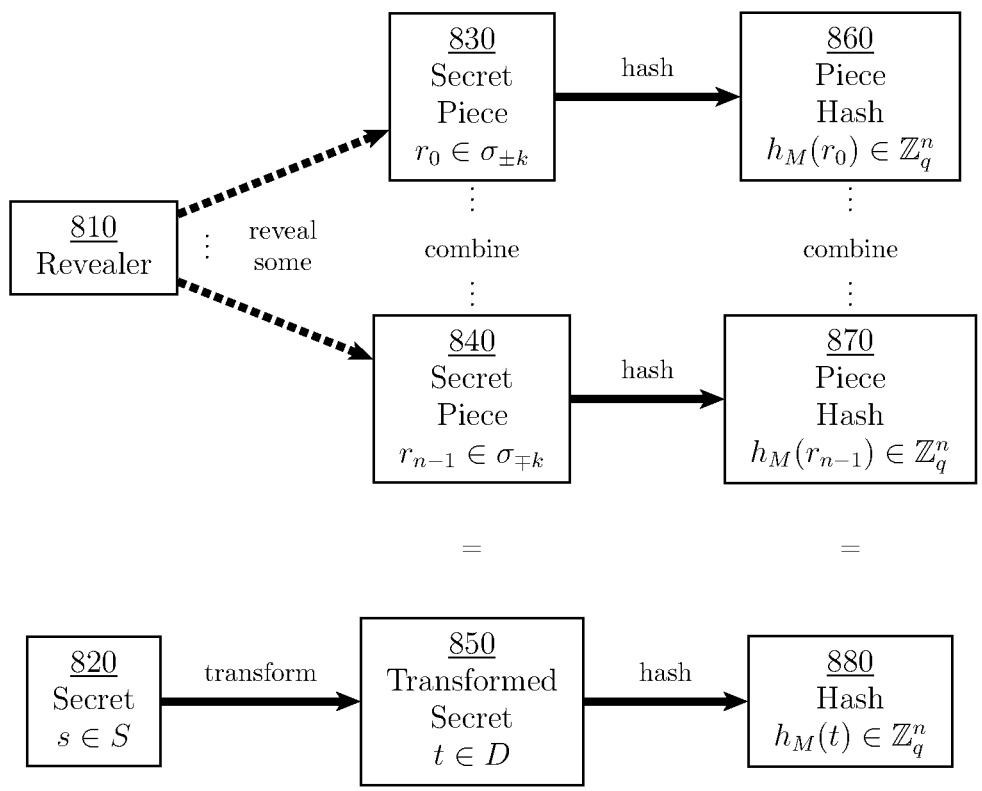
FIG. 8 is a block diagram of a relationship diagram corresponding to FIG. 7.

For example, as described in more detail with respect to FIG. 7 and FIG. 8 and FIG. 9, an arithmetic instruction for adding two given numbers may be used. In this case, the corresponding relation may be between two input secrets 166 and one output secret 148 such that the latter is the result of adding the formers, while the corresponding instruction statement 122 may be a description of this relation in the shared manifest 120. As described, the output secrets 148 may be placed in the secrets storage engine 162 and may be used in future operations or instructions, e.g. as input secrets 166. In this example, the result of adding the two given numbers may be used as input for a second instruction for adding a third given number. Repeating this with additional given numbers results in output secrets 148 for sums of several given numbers.

More generally, different instructions may be used in repeated operation. As described in more detail with respect to FIG. 13, it will be appreciated that such instructions may be organized in complex structures, e.g. in programs expressed in appropriate source code.

Further, for the purposes of the example of FIG. 1B, the pieces statements generator 144 operates on given input secrets 166 to produce output secrets 148. More specifically, each of the given input secrets 166 is split into at least two resulting output secrets 148, here referred to as pieces secrets. The split is such that each of the given input secrets 166 may be reproduced from its corresponding pieces secrets yet certain selected subsets of the pieces secrets corresponding to an input secret may be revealed without exposing information about the input secret.

In one example, to be elaborated on with respect to FIG. 10, a preview of a digital movie may be made available while keeping the document secret and while convincing a verifier that the preview is authentic, without resorting to a trusted third-party. This may be done by splitting the digital movie into pieces and exposing only some of the pieces as described herein. As will be made apparent in this description, the restriction of avoiding exposing information supports selective privacy and verification.

It will be appreciated that this restriction on exposing precludes simple splitting. For example, splitting a secret document into pages would not satisfy the restriction, since revealing any of the piece secrets, i.e. any of the pages of the secret document, would in fact expose information about the secret document. In accordance with the restriction, the splitting may be made using randomization, e.g. using well-known methods of secret sharing, such that the information available from revealing only certain selected subsets of the pieces secrets appears random.

Further, the pieces statements generator 144 may be used to produce a pieces statement 124 to be included in the shared manifest 120. The pieces statement 124 describes the relation between the given input secrets 166 and the pieces secrets. In addition, the pieces statement 124 reveals a certain selected subset of the pieces secrets such that no information on the input secrets 166 is exposed.

As will be described in more detail with respect to FIG. 7 and FIG. 8 and FIG. 9, the subset of secret pieces that is revealed would not feasibly be in complete control of the entity (or entities) producing the manifest, thus enabling a manifest verifier 180 to detect an attempt of said entity to cheat, e.g. by revealing secret pieces that are inconsistent with the relation described by the pieces statement 124. Thus, an honestly produced pieces statement 124 allows a manifest verifier 180 to be convinced that said relation between the revealed input secrets 166 and the pieces secrets holds yet without learning information about the given input secrets 166.

Further, for the purposes of the example of FIG. 1B, the gestalt statement generator 146 operates on input secrets 166 and output secrets 148 to produce a gestalt statement 126. More specifically, the gestalt statement 126 describes the relation between the input secrets 166 and the above described pieces secrets yet without exposing information about any secrets.

As will be described in more detail with respect to FIG. 7 and FIG. 8 and FIG. 9, the gestalt statement 126 may be made using zero-knowledge hashing, such that the relation is evident from exposed hashes yet it is still infeasible for unintended entities to learn about the secrets from the hashes. As will be described in more detail with respect to FIG. 11, the hashes corresponding to gestalt statements 126 may be organized in a tree or other structures. In one example, to be elaborated on with respect to FIG. 5, a financial entity may maintain a ledger of its financial transactions. The financial entity may make hashes available for each transactions in the ledger, while a tree structure of hashes may be made available for the ledger. Thus, the financial entity may make gestalt statements 126 describing the relation between the hashes of the transactions and that of the ledger, allowing a verifier to confirm the relation without exposing the transactions or the ledger.

Further, for the purposes of the example of FIG. 1A, the output secrets 148 may further be used by the pieces statements generator 144 to produce the pieces statement 124 and by the gestalt statement generator 146 to produce the gestalt statement 126. Put another way, output secrets 148 produced in the operation of the manifest generator 140 may be reused in the making of further statements, and in particular need not first be placed in the secrets storage engine 162. For example, in case of an instruction for multiplying two numbers that are kept secret, the multiplication result, which is also kept secret, may be reused, e.g. in splitting it to pieces as described.

Further, for the purposes of the example of FIG. 1A, the manifest verifier 180 uses a statements interpreter 182 to interpret statements placed in the shared manifest 120 and a statements comparator 184 to compare said statements. More specifically, the statement interpreter 182 is configured to distinguish between types of statements, namely instruction statements 122 and pieces statements 124 and gestalt statements 126, and to interpret the information they describe. The statements comparator 184 may configured to compare the interpreted statements and perform checks for certain data aspects that may be described by the statements. The manifest verifier 180 is configured to accept the shared manifest 120 when the statements interpreter 182 successfully interprets the statements and the statements comparator 184 finds the statements pass the checks.

In one example, to be elaborated with respect to FIG. 6, an encyphered resource gateway may be configured to allow only certain white-listed documents to pass through the gateway from one security domain to another. The encyphered resource gateway may use a manifest verifier 180 to check that a shared manifest 120 describing the document indicates that it indeed appears on the white list, without exposing the document.

Thus, as described herein with respect to FIG. 1A, the gestalt statement 124 describes a splitting into pieces of the input secrets 166 and/or output secrets 148 into pieces without revealing them, the pieces statement 124 describes a revealing of some but not all of the pieces, and the instruction statement 122 describes a relation between said secrets, as well as between their pieces, corresponding to an instruction. The instruction statement 122, pieces statement 124, and gestalt statement 126 are configured such that together they enable verifying said instruction has been applied. The instruction statement 122, pieces statement 124, and gestalt statement 126 are interpreted by the statements interpreter 182 and then compared by the statements comparator 184 to determine validity.

In some embodiments, the relationship between the input secrets 166 and the output secrets 148 is determined by an instruction that is described not only by a type of operation but also by additional information, e.g. random values. In some embodiments, a multiplicity of instruction statements 122, pieces statement 124, and gestalt statement 126 may be used in the operation of one instruction, which may be viewed as a complex instruction, e.g. as described herein for modular exponentiation. Various embodiments of the system of FIG. 1A are described in detail herein.

In many embodiments of the system of FIG. 1A, one entity may operate the manifest driver 160 and the manifest generator while another entity may operate the manifest verifier 180. The motivations for this may vary. For example, the first entity may hold secrets it is incentivized to enable the second entity to verify some aspects of said secrets, while the second entity is incentivized to provide value in return for this enablement. Example systems involving these and similar motivations are described herein. In other embodiments, one entity may operate all of the manifest driver 160, the manifest generator, and the manifest verifier 180. Again, the motivation for this may vary. For example, one entity may be interacting with a second entity such that each entity enables the other to verify certain aspects of the formers secrets. Of course, it will be appreciated that such example divisions of operation are not exhaustive or limiting, and many other known or future techniques for divisions of operation may be used, as would be apparent from the present description.

Further in the example of FIG. 1A, the shared manifest 120 may be made available via virtually any medium that is accessible to the entities/modules 140, 160, 180. For example, the shared manifest 120 may be made available via a direct physical connection to a storage device. In further examples, it may be made available via a storage interface, e.g. shared memory or a storage service accessible via the public Internet, and presented in various standard ways, e.g.

via file sharing, distributed storage, and email. In other examples, the shared manifest 120 may be made available via a channel, e.g. a private local area network (LAN), a private wide area network (WAN), or a virtual private network (VPN). The medium for accessing the shared manifest 120 may include various connectivity techniques, such as wireless, wired, electromagnetic, and optical.

In will be appreciated that, with respect to the system 100 and its various embodiments, the system operations may be augmented with auxiliary information such as timestamps, digital signatures, and authentication data, e.g. in order to enhance security of said embodiments.

Figure 2:
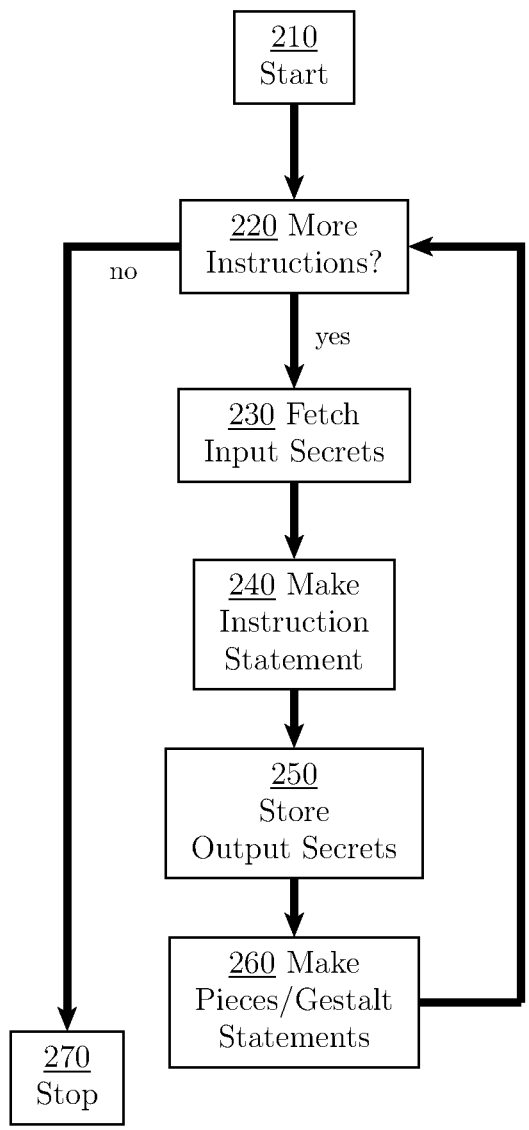
FIG. 2 is a block diagram of a flowchart illustrating example operations of the system of FIG. 1A.

FIG. 2 is a block diagram of a flowchart illustrating example operations of the system of FIG. 1A. In the example of FIG. 2, operations 220-260 are illustrated as separate, sequential operations. However, in various implementations, additional or alternative operations may be included, and/or one or more operations may be omitted. In the various implementations, two or more operations or sub-operations may be executed in a partially or completely overlapping or parallel manner, or in a nested, iterative, looped, or branched fashion.

In FIG. 2, an instruction may be made available. If so, the operation continues to fetch input secrets 230, to make instruction statement (IS) 240, to store output secrets 250 as may have been produced, and to make piece and gestalt statements 260, and returns to check for more instructions 220. If no more instructions are available, the operation may stop 270.

Of course, FIG. 2 represents a high-level view of example operations of the system 100 of FIG. 1A, and should not be considered limiting of additional or alternative embodiments. For example, as described above, it may occur that the various statements may be made together or individually, and, in the latter case(s), any of the statements may be made before the other.

Example embodiments of the system of FIG. 3A, an information compensation system that may be built using the system of FIG. 1A and verifiable communication techniques, are described herein. The system allows a first entity in possession of private data and a second entity in possession of resources to exchange selected information relating to the data with selected compensations from the resources. In addition, the exchange may be verified by a third-party that is not exposed to private data.

Figure 3B:
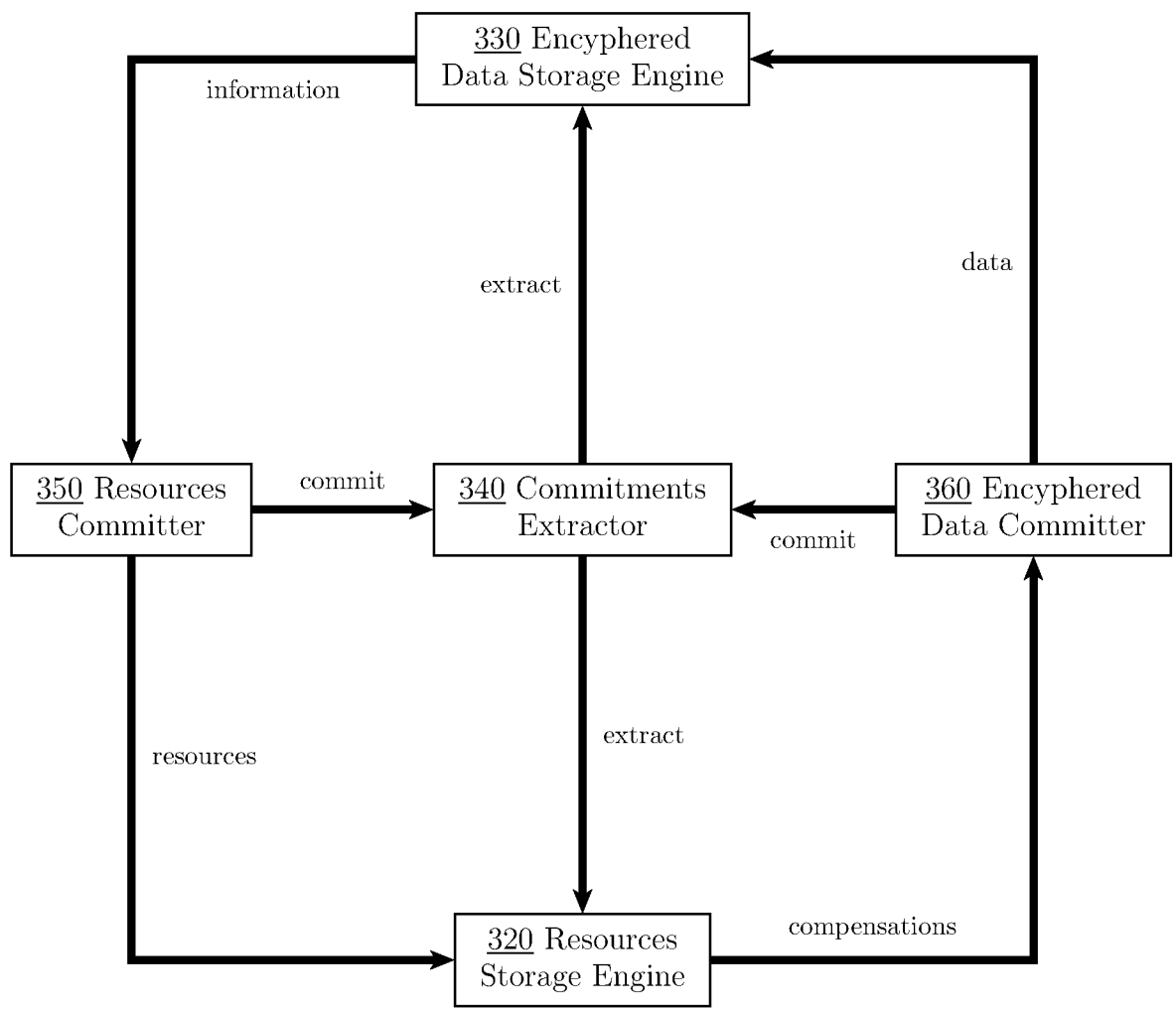
FIG. 3B is a schematic diagram of a system illustrating a first example embodiment of the system of FIG. 1A.

An example embodiment of the system of FIG. 3B involves an entity operating a resource committer 350, referred to as provider, and an entity operating an encyphered data committer 360, referred to as owner. The owner puts data into an encyphered data storage engine 330 (in the form of an encyphered data commitment 332, in accordance with FIG. 3A) such that information relating to the data initially inaccessible to the provider may be extracted later. The provider puts resources into a resources storage engine 320 (in the form of a resources commitment 322, in accordance with FIG. 3A) such that compensations that are initially inaccessible to the owner can be extracted later by the commitment extractor 340.

Thus, the owner and the provider commit to an extraction of information and compensations. An enabler for the extraction may optionally be included, so that the extraction is at first disabled, or otherwise it is enabled by default. The extraction is committed to by both sides and when enabled it may be affected. Once the extraction is affected, both the information and the compensations are extracted from the information storage engine and the value storage engine to the provider and the owner, respectively.

As will be appreciated from the description with respect to FIG. 1A, the system of FIG. 3A may utilize the system 100 to implement some of its operations. For example, the commitment generator 362 may use the manifest driver 160 and the manifest generator 140 to produce a shared manifest 120 describing the encyphered data commitment, the secret storage engine 356 and 364 may correspond to the secret storage engine 162, and the commitments verifier 370 may correspond to the manifest verifier 180.

As described above, with respect to FIG. 3A, the exchange may be delayed until the resources commitment 312, the encyphered data commitment 314 and the extract enablement 316 are all available on the shared channel 310. Example methods for making these commitments and enablement are described in more detail with respect to FIG. 14.

The described example information compensation system distinguishes between the data of the owner and the information to be delivered to the provider. Thus, the owner can keep the data private. Further, this system distinguishes between the resources of the provider and the compensations for the owner. Thus, the provider may condition the compensations on ex-post results related to the information. For example, using this system it is possible to set up an extraction whereby a discount from an insurance company is conditioned on the result of a formula accounting for the owners car data, without exposing this data to the insurance company.

The described example information compensation system of FIG. 3A should be understood to apply widely. For example, it may be applied to contexts of medical information, e.g. where medical data may be used to derive medical results such as statistical ones, of quantified-self, e.g. where personal data may be used to derive market segmentation results, or of (personal or entity) credit information, e.g. where financial data may be used to derive credit results such as creditworthiness or a credit score.

In the described example information compensation system, verifiable communication techniques may be employed as follows. Each piece of data is collected on behalf of its owner by a device protecting the pieces integrity. For example, a device may include trusted computing hardware that can sign the data using a private key accessible only to the device. The integrity of a piece of data may also be supported by cryptographic hashes as described herein. Each piece of data is put in a message M and into the encyphered data storage engine 330.

Further in the described example information compensation system, the provider makes a commitment as an argument S to enable delivery to him/her. The provider puts resources into the resources storage engine 320, such as payments or coupons, whose compensations to the owner are conditioned on delivery of certain derivations to the provider by the owner, e.g. by a payment processor or a smart contract enforcing the condition. The owner makes a commitment as an argument T referencing encyphered data in the information storage engine with a manifest suitable to the derivations, as an argument T to permit their delivery to the provider. An extract enabler 342 for the extraction, to introduce a delay or an approval process before the extraction may be affected, using verifiable communication commitments as described herein, e.g. with respect to FIG. 14.

Further in the described example information compensation system, the opening of said commitments may be done by a third-party, such as a creditor who could delay opening until a positive credit decision would have been made, or by an automatic process, such as a time delay or a smart contract. Using verifiable communication commitments ensures the enabler does not gain access to messages. The extraction is affected once enabled and arguments S, T are verified. This extracts derivations for the provider and compensations for the owner. One may use temporal arguments, which have previously been described for verifiable communication, as a way to timestamp system operations.

Example embodiments of the system of FIG. 3A, for a digital goods system that enables publicly confirming an exchange of a payment for a digital good without exposing the digital good to the public, are described. The system allows a seller of a digital good sold to make it accessible to a buyer conditioned on payment. The seller, operating as the encyphered data committer 360, places an inaccessible encyphered form of a digital good, as an encyphered data commitment 314, in an encyphered goods store, operating as the encyphered data storage engine 330. The buyer, operating as the value committer 350, pays the amount asked by the seller to a payment store, operating as the value storage engine 320. Both the buyer and the seller commit to a transaction involving the stored digital good and the stored payment. An enabler for the transaction, operating as the commitment extractor 340, may optionally be included, so that the transaction is at first disabled, or otherwise it is enabled by default.

Further in the example embodiments for a digital goods system, the transaction may be committed to by both sides and may be enabled, by means of an extract enablement 316, so that the transaction may be affected. Its effect is to release both the (deciphered) digital good, via the information extractor 346, and the payment, via the compensations extractor 344, from their corresponding stores 330 and 320, so that the former is delivered only to the buyer and the latter is remitted only to the seller and the transaction can be verified by any observer.

The example digital goods system should be understood to apply widely. For example, by taking the digital good to be a notarized document, one may obtain a system for payment against a notary service that is privacy preserving. Similarly, one may apply the system to trade finance contexts such as letters of credit (LoC) or documentary collections (D/C), by taking the digital good to be documents required by a bank, or other financial institution, to release payment such as a bill-of-lading, a transport document, or an invoice. The same applies to other financial and legal contexts where official documents are required to affect a transaction. An advantage of the digital goods system in these cases is that the documents remain private while the transaction is confirmed. Further, many forms of payments such as debit, credit, cryptocurrencies and non-monetary payments such as a transfer of title or another digital good may be taken.

In some embodiments of the example digital goods system, verifiable communication may be employed as follows. A digital good is set as a message M. A seller places an encyphered form of M in the encyphered good store described above. Depending on the method of verifiable communication, this form may be $g^M$ for example. The seller can publish an offer to deliver the message behind the encyphered form using a traditional system, such as an online market place. The seller may also publish a cryptographic hash of M that can be used to validate M in a delivery. A buyer makes a commitment as an argument S to permit delivery to him/her. The buyer makes a payment to the payment store described above in the amount of the offer price against the verification of delivery of M, e.g. by a payment processor or a smart contract system. A seller makes a commitment as an argument T to permit delivery of M to the buyer. One may include an enabler for the transaction, to introduce a delay or an approval process before the transaction may be affected, using verifiable communication commitments.

Further in the examples of a digital goods system, the opening of said commitments may be done by a third-party, such as a creditor who could delay opening until a positive credit decision would have been made, or by an automatic process, such as a time delay or a smart contract. Using verifiable communication commitments ensures the enabler does not gain access to M. The transaction is affected once enabled and arguments S, T are verified. The affecting of the transaction releases the digital good for delivery to the buyer, by the digital good store, and the payment for remitting to the seller, by the payment store. One may use temporal arguments, which have previously been described for verifiable communication, as a way to timestamp system operations.

FIG. 4 is a block diagram of a flowchart illustrating example operations of the system of FIG. 3A. In particular, FIG. 4 shows an example operation of a commitments verifier 370. Following the start 410 of operation, the resources commitment well-formedness is checked. For example, for the purposes of the above described digital goods system using verifiable communication, the commitment message corresponding to the resources commitment 312 is checked for whether it indeed described the commitment. If the answer is no, the operation proceeds to fail 470. Otherwise, the encyphered data commitment well-formedness is checked. For example, for the purposes of the above described digital goods system using verifiable communication, the commitment message corresponding to the encyphered data commitment 314 is checked for whether it indeed described the commitment. If the answer is no, the operation proceeds to fail 470. Otherwise, the matching of the two forms is checked. For example, for the purposes of the above described digital goods system using verifiable communication, the two commitment messages are compared for whether they are both relate to the same verifiable communication. If the answer is no, the operation proceeds to fail 470. Otherwise, the extraction enabled 450 status is checked. For example, for the purposes of the above described digital goods system using verifiable communication, the enablement for the opening of the commitments is checked. If the answer is no, the operation proceeds to fail 470. Otherwise, the operation proceeds to pass 460.

Example embodiments of the system of FIG. 5, a transactions compliance system 500 which may be built as an example embodiment of the system of FIG. 1A, are described. The system allows an entity, e.g. a financial company, to convince an auditor that its transaction books are in compliance, e.g. according to known regulations, without exposing the book entries to the auditor.

In the example transaction compliance system 500, book entries 512 and compliance instructions 532 for an entity, such as a financial company, are given. The book entries 512 describe transactions, e.g. buying or selling of specific financial securities. The book entries 512 may be processed by the book processor 510 to produce, or update, book state 514. For example, the book processor 510 may maintain the positions, or amounts, of each financial security and update them after each transaction. The book state 514 may be produced, or updated, as a result of this maintenance and may reflect information pertaining to compliance status of the entity. The book entries 512 and the book state 514 may be provided to the manifest generator 520 as inputs. Further, the manifest generator 520 is configured with the compliance instructions 532, which allow determining the compliance status from the given inputs, using methods described for the system 100. Then, the manifest generator 520 may generate statements 522, in accordance with the compliance instructions 532, that describe the compliance status based on the given inputs. The statement 522 do not expose the book entries 512 or the book state 514, as described with respect to the system 100, and may be included in a manifest. Next, the manifest verifier 530 is provided with the statement 522. Further, the manifest verifier 530 is configured with the compliance instructions 532. Thus, the manifest verifier 532 may check, using methods described for the system 100, that the statements 522 are consistent in accordance with the compliance instructions 532.

Embodiments of the system of FIG. 5 may utilize the system of FIG. 1 as described here. The book entries 512 may be implemented using secret inputs 166 generated by the manifest driver 160. The book state may be implemented using secret outputs 148 derived by the manifest generator 140. The manifest generator 520 may be implemented using the manifest generator 140. The compliance instructions 532 may be implemented using the instruction provider 164 by the manifest driver 160. The statements 522 may be implemented using the shared manifest 120, with instruction statements 122, pieces statements 124, and gestalt statements 126. The manifest verifier 530 may be implemented using the manifest verifier 180.

Example embodiments of the system of FIG. 6, a cypher gateway system 600 that may be built as an embodiment of the system of FIG. 1A and using verifiable communication techniques, are described. The system allows setting up security domains and encyphered resource gateways in between. An encyphered resource gateway may enforce policies on encyphered resources being transferred through it, between the security domains it stands between, without deciphering or otherwise accessing the resources and without relying on key services such as key escrow.

Embodiments of the system of FIG. 6 may utilize the system of FIG. 1 as described here. The manifest generators 614 and 624 may be implemented using the manifest generator 140. The manifest drivers 616 and 626 may be implemented using the manifest driver 160. The manifest verifier 634 may be implemented sing the manifest verifier 180. The shared manifest 120 may be placed on the shared channel 632.

In the example cypher gateway system 600, policies may be set up for taking certain actions in response to specific transfers, e.g. blocking a transfer or raising an alert. The encyphered resource gateway 630 may apply policies by intercepting messages placed on the shared channel 632, which is under its control. The encyphered resource gateway 630 may use the manifest verifier 634 to determine selected aspects of said messages, even if encyphered and their content remains inaccessible to the encyphered resource gateway 630.

Further in the example cypher gateway system 600, to enforce a policy, a rule enforcer 636 is used to determine the actions. The rules may be defined e.g. in terms of senders, recipients, and properties of resources. In the example, the enforcer applies rules consulting traces that are placed in the traces storage engine 638. These traces capture information about grants and revocations orders, and more generally about authorization operations, for resources. A grant or revocation order may involve resources being granted or revoked, sender (grantor or revoker) keys, and receiver (grantee or revokee) keys. When allowed by the enforcer given the policies, the effect of an order may be to grant or revoke rights to access resources, or to administering such rights for them, to recipients possibly in other security domains. Orders may originate from owners of resources, administrators, or other users. The traces of these orders, fetched from the traces storage engine 638, are consulted by the policies rule enforcer 636, allowing the gateway to control a send that goes through it. A send may be allowed through as determined by applying these policies.

Using the described a cypher gateway system 600, certain restricted resources, even in encyphered form, may be prevented from leaving their security domain through the gateway. For example, the transfer of encyphered resource 612 from security domain 610 to security domain 620 may be blocked, and similarly the transfer of encyphered resource 622 from security domain 620 to security domain 610 may be blocked. Encyphered resources may be identified in policies, e.g. by their public keys or by their cryptographic hashes as described herein. This way, a violating sender would not convince the gateway that the (encyphered) resource is not restricted when in fact it is. One may use a cypher gateway system to ensure that certain restricted resources in one security domain may be sent only to certain allowed recipients, who may be identified by their public keys, in other security domains.

Further in the example cypher gateway system 600, a cypher gateway system may be used to monitor or report unauthorized sends. Hence honeypots, canary traps, and other detection schemes, are enabled for encyphered resources by enabling the detection of aspects of encyphered resources being sent. Since all policy required information exists in the sends, they may be directly stored for auditing purposes, with no need for a separate audit system that would need to be kept in sync and secured separately.

The example cypher gateway system 600 should be understood to apply widely. In one example, it may be applied to trusted computing contexts. A CPU, or any other unit with processing capabilities, may have an embedded private key that never leaves the unit. This gives the unit the capacity to secretly authenticate and transfer encrypted data without the owner of the device having a feasible way to know it, which is often considered a serious security threat. Using a cypher gateway system and placing the unit in a separate security domain, one may restrict the unit to transmitting allowed data without exposing the data.

In another example of the cypher gateway system 600, it may be applied to intranets and the Internet, wired or wireless networks, static or dynamic or ad-hoc networks, and so on. Traditionally, there is a conflict between the desire of a network operator to understand traffic flowing through its network and the desire of network users to privacy. Using a cypher gateway system and placing users in security domains, the network operator may require aspects of the traffic be conveyed without needing the full traffic details to be exposed.

In an example embodiment of the cypher gateway system, verifiable communication may be employed as follows. Resource 1 is represented as a message M and converted into encyphered form within security domain 1. Depending on the method of verifiable communication used, this form may be $g^M$ for example. Encyphered resource 1 is associated with key pair 1 (public and private keys), which are controlled by user 1. A gateway policy is set up to allow key pair 1 to grant and revoke access to resources it is associated with to any user in security domain 2. User 1 makes an argument S showing knowledge of M for encyphered resource 1 and any desirable properties of M using the manifest of the message.

Meanwhile in security domain 2, key pair 2 is created and controlled by users 2. User 1 issues an order to grant private key 2 access to encyphered resource 1. The order includes a reference to public key 2 and is signed with private key 1. The order is traced by keeping detailed information about it, such as issuer, sequence number, time, etc. User 1 sends resource 1 to user 2 by constructing an argument T, showing that knowledge of private key 2 implies knowledge of M, and communicating T and encyphered resource 1 to security domain 2. The gateway intercepts the send, verifies arguments S, T and observes that M is verifiably communicated to an owner of private key 2. The gateway does not have or need access to M to do so. The gateway consults the traces which show that user 1 has granted private key 2 access to resource 1, and that this grant has not been revoked. The gateway applies the policy, which allows this grant, and permits the send to go through. The sent argument T and encyphered resource 1 are received at security domain 2, which are labeled here as encyphered resource 2, allowing user 2 to access M.

Further in the example, since orders refer to public keys, not private keys, there is no need to have access to private keys for constructing orders. In this example, policies determine if an order is allowed. If user 1, or anyone allowed to do so such as an administrator, had issued an order to revoke the grant after it was given, the gateway would have blocked the send. An attempt to send a different resource, for which the traces showed there was no grant, would have been blocked as well. The gateway could be configured, instead of or in addition to blocking sends, to monitor or report policy violations, i.e. orders or sends that are not allowed by the policies, or to perform other actions. Temporal arguments, which have previously been described for verifiable communication, may be used to timestamp system operations.

Example embodiments of the system of FIG. 3A for a system for previewing digital goods are described. In the non-limiting examples, the system enables a preview in encyphered form to be extracted from an original digital good in encyphered form, which is committed to the encyphered data storage engine 330 by the encyphered data committer 360. Further, it enables a verifier, corresponding to a specific commitments verifier 370, to check that the preview is consistent with the original without exposing them. Further, the system enables a preview recoverer, corresponding to a specific commitments extractor 340, to recover the preview from its encyphered form.

The system for previewing digital goods operates as follows. A preview extractor obtains a digital good in encyphered form and extracts from it a preview in an encyphered form that enables verification. A preview verifier observes the encyphered preview and checks that it indeed matches the encyphered digital good, without deciphering it, and that a preview recoverer can recover the preview. The preview recoverer recovers the preview from its encyphered form and matches with the encyphered digital good.

The described system for previewing digital goods improves on traditional previewing, which, without verification, requires a higher level of trust, for example in view of the risk the preview does not faithfully represent the good as may be claimed by the extractor. In traditional previewing, this trust often manifests in reputation of the extractor, which takes effort to build, while extractors that have not built this reputation (yet) often need to pay for services of a third party, such as a distributor that already established a reputation of its own.

In more detail, with respect to FIG. 10, the components of the example system for previewing digital goods may interact as follows. The encyphered digital good is given in a form that enables extraction of an encyphered preview from it. As elaborated on later, the encyphered digital good may be split into encyphered parts 1010, corresponding to parts 1020 of the digital good. Further, a preview extractor may extract from the parts 1020 selected preview parts 1030 and form the encyphered preview parts 1040 from them. The extraction is consistent, meaning that the preview parts 1030 in deciphered form are consistent with the parts 1020 in deciphered form of the digital good. In addition, the extraction enables verification and recovery using the same encyphered forms, which are available on a shared manifest. Next, a verifier observes on the shared manifest the encyphered preview parts 1040 and matches them to the encyphered parts 1010 of the digital good, without deciphering. If the parts are indeed in the expected form and a match is found, the verifier accepts; otherwise, it rejects. Meanwhile, a preview recoverer, that also accesses the same encyphered preview parts 1040 on the shared manifest, may recover the preview parts 1030 from the encyphered preview parts 1030 and match the parts of the recovered preview with the encyphered parts 1010 of the digital good similarly. The preview recoverer may succeed in performing this recovery only when the verifier has accepted but fails when the verifier has rejected. This correspondence between successful verification and recovery is a desirable property of the system.

The example system for previewing digital goods may be used with other systems involving digital goods. In one example, it may be used in the context of a digital goods system in the implementation of an encyphered good committer, e.g. a cryptographic device on a SIM card in a smartphone, and an encyphered good store, e.g. a network file storage appliance hosting content in encyphered form. This may be done in order to provide said preview of said digital good to potential buyers that make it easier for them to proceed to transacting to buy said digital good using said digital goods system.

Example embodiments of the example system for previewing digital goods are described. The encyphered parts 1020 and the encyphered preview parts 1030 may be implemented as digital files stored in digital storage devices. An advantage of the system described here is that, due to enciphering, such digital storage devices need not be trusted to limit the risk of leaking the content of the good or preview. The described preview extractor, preview recoverer, and preview verifier may be implemented as separate hardware modules that are communicating over a network or interconnect.

For example, in the context of a previewing digital images, the preview extractor may be implemented using a module connected to image memory in a digital camera, the preview recoverer may be implemented using a module connected to a display in a handheld device, and the preview verifier may be implemented using a module connected to a storage device in an auditing system. An advantage of the system described here is that such modules need not operate all at the same time or be located all physically close to each other, and may be operated by independent entities.

In some implementations of the example system for previewing digital goods, verifiable communication may be employed as follows. The digital good, represented as a string of bits, is split into n parts such that each part may be interpreted independently of other parts. The parts need not be disjoint though in many cases it may be a convenient choice. For example, a digital video may be split into 1-minute video parts and a digital book may be split into 1-page parts. A zero-knowledge hash h(•) may be applied to each part and an incremental hashing scheme may be applied to the hashes. A Merkle-tree, or some other authenticated data structure, of the hashes in the scheme may be used for verification of some of these hashes by authenticating them against the structure, often involving the checking of fewer than all hashes. Let H(•) be a cryptographic hash function on bit strings. Zero-knowledge hashes of the parts may be input to H(•) to obtain a bit string that is used to select a subset of the parts, to ensure that the selected subset is unpredictable and enhance security. In one example, to get a subset of size k with (nearly) uniform probability, $$\left\lceil \log_2 \binom{n}{k} \right\rceil$$

bits from the output of H(•) may be used to select such a subset. In a second example, a stream of bits from the output of H(•) may be used to select such a subset via sampling parts from a streaming digital good. The selected parts may be taken together to form a (sample) preview digital good that is consistent with the original digital good. A verifier can check that the hashes of preview parts match those of selected original parts to confirm this consistency. An arguer may verifiably communicate the preview digital good using one of the known methods.

In a second example of the system for previewing digital goods, it may be incorporated in an information compensation system in the implementation of an encyphered information storage engine, e.g. a cryptographic device for enciphering prior to storing in a storage device, and preview derivations from digital good data, e.g. previews of video clips. In this system, a digital good may be used as the data and a preview of the digital good may be used as the derivation of the data, thus allowing getting compensation for a preview of a digital good. This may be done in order to facilitate the settlement of a sale of the preview to a buyer without exposing the preview to settlement agents.

In a third example of the system for previewing digital goods, it may be incorporated in a cypher gateway system in the implementation of encyphered resources for digital goods and their previews, e.g. cryptographic devices for safekeeping sensitive data, and that of key pairs, e.g. security tokens. This may be done in order to prevent unauthorized extraction of restricted information from security domains. By considering the encyphered forms of the preview and digital good, a cypher gateway is able to consider them in its decision whether to allow through communication of said digital good.

The cypher gateway may also be configured to modify the communication in a controlled way, e.g. using proxy re-encryption. In these examples, one may reduce the hardware and networking resources needed in operation, e.g. the use of encyphered forms for the digital goods and the previews allows them to be securely stored in a shared storage, such as cloud storage, thus avoiding the need to store copies at several end-user devices and the need to communicate them from afar when they are available from proximate shared storage.

Indistinguishability communication, a technique applicable to verifiable communication in the context of an at least partially unreliable or untrusted shared channel, is described. Such a channel may erase, modify, insert, reorder or delay communications which could lead to inconsistencies such as a party successfully verifying communication that was not (yet or at all) received by another party or vice versa. Examples for such channels are erasure channels and untrusted centralized storage channels. The technique is useful in mitigating risks of such inconsistencies.

Indistinguishability communication may be used with the above described system for verifiable, possibly in the context of a digital goods system or an information compensation system, as discussed above. This results in observers gaining access to previews of digital goods that are communicated on the channel, while verifying that recipients gain access to these digital goods, even via an unreliable or untrusted channel.

Indistinguishability communication may also be used with channels providing only temporary access to communications, such as an unreliable storage channel or a broadcasting channel with limited retransmissions. Due to indistinguishability of verification and deciphering, verifiers may be convinced that during the time a particular communication is (possibly repeatedly) observed on the channel and passes verification, the recipients of the communication have access to its message. Hence, verification and deciphering may be viewed as co-occurring.

Indistinguishability communication may be implemented in a module in networking and communication systems, e.g. in a channel access device. It may be used to reduce the hardware and networking resources needed by allowing communications to be multicasted or broadcasted, as described below, so that the volume of communication and the need for retransmissions and for storing-and-forwarding are reduced without exposing encyphered content.

Figure 16:
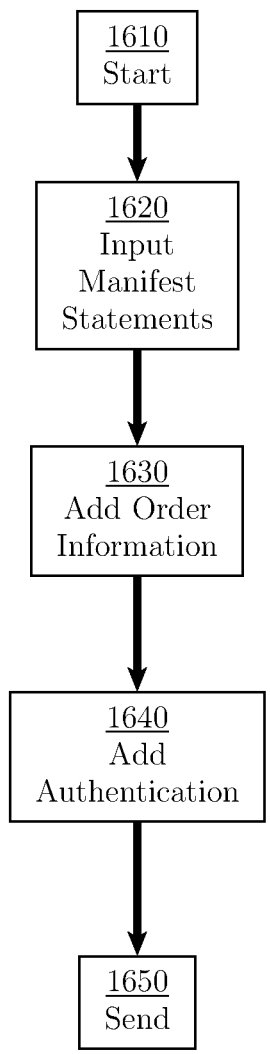
FIG. 16 is a block diagram of a flowchart illustrating a sender use of indistinguishability communication in the system of FIG. 1A.
Figure 17:
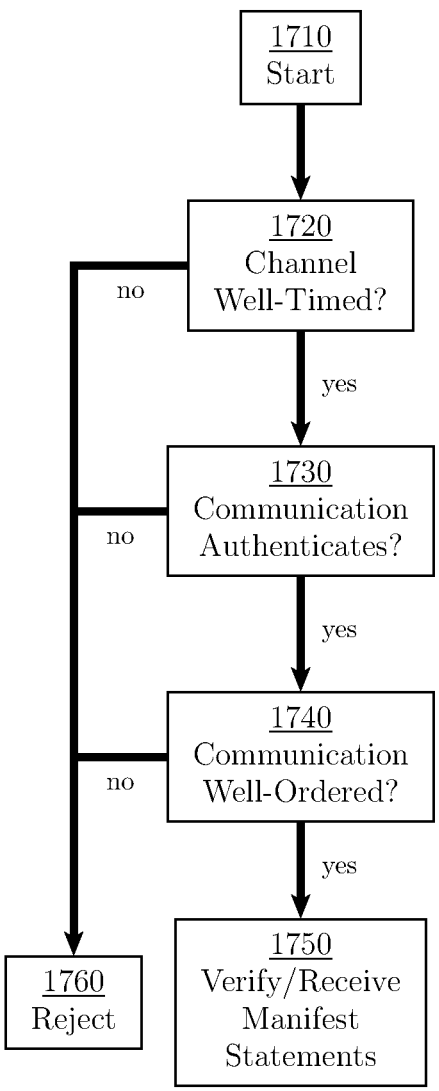
FIG. 17 is a block diagram of a flowchart illustrating a receiver use of indistinguishability communication in the system of FIG. 1A.

Example uses of indistinguishability communication in the system of FIG. 1A are described. FIG. 16 is a block diagram of a flowchart illustrating a sender use of indistinguishability communication in the system of FIG. 1A. Following the start 1610, the sender proceeds to inputs manifest statements 1620, then to add order information 1630 to them, next to add authentication to these, and finally to send the resulting communication. FIG. 17 is a block diagram of a flowchart illustrating a receiver use of indistinguishability communication in the system of FIG. 1A. Following the start 1710, the receiver first checks that the channel is well-timed 1720. If the answer is no, the receiver proceeds to reject 1760. Otherwise, the receiver checks whether the communication authenticates 1730. If the answer is no, the receiver proceeds to reject 1760. Otherwise, the receiver checks whether the communication is well-ordered 1740, i.e. with respect to other received communication. If the answer is no, the receiver proceeds to reject 1760. Otherwise, the receiver proceeds to verify/receive the manifest statements 1750.

Techniques of indistinguishability communication may build on a number of other techniques, for example, as follows. A communication sender uses anonymous access to the channel, ensures a communication occurs on the channel periodically, includes order information in each communication, and uses randomized enciphering with, and authenticates, each communication. A communication receiver uses anonymous access to the channel, checks for periodic occurrence of communication on the channel, checks for correct authentication of communications, checks well-ordering of communications from each party, and checks for correct form of communications: a communication receiver that is a verifier follows with verifying the communication, whereas one that is a decipherer follows with deciphering the communication. The technique ensures that attacks cannot result in an inconsistent view of the channel by different communication receivers, as described below.

In more detail, the indistinguishability communication technique operates as follows. First, anonymous access to the channel ensures that receiving, i.e. deciphering, and verification are indistinguishable. For example, anonymous access to a broadcast or multicast channel may be used. Anonymity makes parties indistinguishable from one another from the point of view of an attacker of the channel. Since in verifiable communication the same arguments S, T are used in both verification and deciphering, anonymous access ensures that deciphering and verification are indistinguishable outside of the party performing them.

Further using of randomized enciphering ensures all communications are different and indistinguishable too. With this, an attacker is reduced to attacking a random subset of communications, so e.g. attacks cannot single out a specific party or isolate verifiers.

Further using of authenticated communications, prior to passing the communications to the channel, limits these attacks to erasure and reordering and delays, since modifications and insertions may be detected and dropped, rather than passed, from the channel by communicating parties when their communication fails to authenticate.

Assuming erasures occur with some probability p<1, retransmitting directly or effectively, e.g. using codes, each communication a sufficient number of times, each time with randomization as described above, ensures that eventually all communications are accessible to all parties despite the erasures, and that eventually all parties obtain a consistent view of the channel. For example, a fountain code may be used to reach a sufficient number of effective retransmissions. For p=1, communicating parties obtain an empty yet still consistent view of the channel. Hence, these attacks cannot result in an inconsistent view among parties.

Further inclusion of ordering information, such as a serial number, may be made by a party in each of its (input) communications prior to authenticating them, so that reordering (possibly after failed attempts to correct) and erasures may be detected by other parties as a communication not in a well order, e.g. having a non-consecutive serial number.

Finally, keeping communication alive periodically, e.g. once per second by any party even carrying no payload, ensures that delays are detected by other parties as a missing communication within the expected period, i.e. as a channel that is not well-timed.

Techniques for selectivity in privacy and verification techniques in devising various device instructions are described. Zero-knowledge hashing arguments are described herein as a means to make gestalt statements, pieces statements, and instruction statements. A set of general-purpose instructions is described. The described instructions include arithmetic, comparison, hashing, and permuting ones involving elements, numbers, and/or constants. These make extensive use of linear algebra, such as in matrix/vector multiplications, for computation of zero-knowledge hash values. Because of this use of linear algebra, these instructions are a good fit for enhancing widely available hardware—such as general-purpose CPUs and GPUs, vectorized and embedded processors, secure processors as such SIM cards, programmable hardware such as FGPAs, dedicated hardware such as ASICs, and other processing architectures—with privacy and verification capabilities, e.g. based on their support for linear algebra operations. These operations may be efficiently (possibly incrementally) parallelized and distributed across many computing threads, e.g. cores or co-processors or circuits, and/or across many nodes, e.g. machines or virtual machines or containers, for enhancing various applications, e.g. cluster computing such as streaming or Map/Reduce or lambda architecture. Moreover, device instructions may apply the same operation to multiple items and hence are a good fit for enhancing hardware supporting SIMD. Further, the device enables a wide range of hardware enhanced with privacy and verification capabilities in a manner not available in conventional hardware. In contrast, existing solutions for verifiable computation often involve operations that are more expensive computationally than linear algebra operations and are often harder to efficiently parallelize or distribute. Further, these solutions often support directly only a limited set of instructions and may only support some other instructions indirectly, e.g. via a software implementation using a (relatively large) program that utilizes the directly-supported instructions. Finally, these solutions often do not have a good fit to enhancing widely available hardware as described here for the device.

Example embodiments of the system of FIG. 1A using zero-knowledge hashing as in FIG. 7 are described. In a well-known paper dated 1995, Ajtai described constructions of one-way functions based on some well-known lattice problems. In another well-known paper dated 1996 Goldreich, Goldwasser and Halevi described constructions based on Ajtais that provided for collision-free hash functions as well as collision-free universal hash functions. Shown here is a zero-knowledge argument of knowledge of a pre-image of such collision-free hash functions, in particular one that is simple and fast for both the prover and the verifier. Some zero-knowledge argument systems may employ collision-free hashing as a building block and may use zero-knowledge hashing described herein as a building block.

The GGH's construction for collision-free hashing is recalled. Let n, m, $q \in \mathbb{N}$ be parameters such that $$n \log q < m < \frac{q}{2n^4}, q = O(n^c)$$

for some constant c>0. Let $M_{n \times m} \in_R \mathbb{Z}_q^{n \times m}$ be a random matrix. The hash function $h_M: \{0, 1\}^m \to \mathbb{Z}_q^n$ is then defined for $s := s_1 s_2 \ldots s_m \in \{0, 1\}^m$ as $h_M(s) := Ms \bmod q$. GGH show that it is infeasible to find collisions for $h_M$ unless the well-known lattice problems have good approximations in the worst case. GGH also show a slight modification to get universal and collision-free hash functions. To this end, q is chosen as a prime, $r \in \mathbb{Z}_q^n$ is chosen at random, and the hash function is defined as $h_{r,M}(s) := r + Ms \bmod q$. With respect to FIG. 7, setup 710 may be used to select a hash function as described. GGH's construction uses a modified Ajtai theorem stating that a well-known lattice problem can be solved in the worst case if the following problem can be solved in the average case: for parameters n, m, $q \in \mathbb{N}$ such that $$n \log q < m < \frac{q}{2n^4}, q = O(n^c)$$

for some constant c>0, given input $M \in \mathbb{Z}_q^{n \times m}$ find output $x \in \{-1, 0, 1\}^m \setminus \{0\}^m$ such that $Mx=0 \pmod{q}$ and $\|x\| \le m$. This problem is labeled (A2) in GGH, and this labeling is adopted here. GGH go on to show that finding a collision $h_M(s_1) = h_M(s_2)$ for $s_1 \ne s_2 \in \{0, 1\}^m$ yields a solution $x := s_1 - s_2 \in \{-1, 0, 1\}^m$ to (A2).

An example construction of zero-knowledge hashing built on Ajtais and GGHs results is described. By using this construction, provers may convince that with some probability they know a secret preimage of a public hash vector and that this preimage lies in a small domain, in which finding preimages is hard. The construction does not leak any information about the secret preimage beyond this. Involving mostly linear operations, the construction is relatively simple and efficient.

An overview of the example construction of zero-knowledge hashing with respect to FIG. 7 is described. First, a secret in some domain is set up using the setup 710. Then, the secret is transformed using the transformer 720 to a transformed secret that is in a domain equal to the sum of at least two sub-domains. This lets the secret be split using the splitter 732 to at least two secret pieces, one in each of the sub-domains that linearly combine back to it. The description below refers to two sub-domains and to summation as the linear combination; this should not be interpreted to limit the number of sub-domains or the linear combination that may be used. For convenience of reference, herein the two sub-domains are called the positive and negative domain; this should not be interpreted to mean that an element of the positive (resp. negative) domain is a positive (resp. negative) number.

In the example, the transformed secret is split into two secret pieces, one in the positive domain and the other in the negative domain, that sum to the transformed secret and that each separately leaks no information about the transformed secret or the secret. For example, given any one piece as a fixed value, drawing the other piece with uniform probability leads to a uniform distribution of their sum, which describes the transformed secret. For example with d>2 sub-domains and a linear combination, for some k<d of pieces to be revealed, given k pieces as fixed values, drawing remaining d−k pieces with uniform probability leads to a uniform distribution of the linear combination of all pieces, which describes the transformed secret. One may use linear all-or-nothing-transforms to get pieces with such properties.

Then, a hash value of the transformed secret is computed using hashes 742 and posted as a commitment by the committer 740. Next, hash values for the secret pieces, computed using the hasher 734, are posted. Both types of hash values are computed with a linear hash function that is hard to invert over the union of the domains, for example the one described above with respect to GGH. Finally, one of the secret pieces is revealed using the revealer 736. Finally, the verifier 750 checks that this piece hashes to its corresponding posted hash value and that the posted hash values of the pieces sum to that of the transformed secret.

FIG. 8 shows a block diagram of a relationships diagram corresponding to FIG. 7. The secret 820 is transformed into the transformed secret 850 which is hashed to the hash 880. The transformed secret 850 is split into the secret pieces 830-840, such that the secret pieces 830-840 may be combined back to the transformed secret 850. The secret pieces are hashed to the piece hashes 860-870 and may be combined back to the hash 880. Finally, the revealer 810 reveals only some of the secret pieces 830-840.

An example construction for zero-knowledge hashing is described with respect to FIG. 9. In FIG. 9, an example table is shown where each row described possibilities for a j-th element of a type of secret, to be described here, and where each column corresponds to one possibility across the types. Given are $m \in \mathbb{N}$ and a secret 910. In the example, characters are Peter the prover and Victor the verifier. Both are computationally bounded, preventing Peter from changing his commitments and Victor from discovering secrets by inverting $h_M$. Victor knows only the domain of s, so that Victor views $s \in_R \{0, 1\}^m$. Peter begins with setting up secrets. Let $S := \{0, 1\}$ so that $s \in S^m$. Let $\alpha_i := \{ix | x \in S\}$ for $i \in \{1, 1\}$. First, peter chooses the auxiliary secret 920 $k := \{k_j\}_{j=1}^m \in_R \{-1, 1\}^m$ and sets $\sigma_{\pm k} := \times_{j=1}^m \alpha_{\pm k_j}$. Next, Peter sets the transformed secret 930 $t := (t_j)_{j=1}^m := (s_j k_j)_{j=1}^m \equiv s \odot k$. Finally, Peter chooses the secret piece 940 $r_0 := (r_{0,j})_{j=1}^m \in_R \sigma_{+k}$ and sets the secret piece 950 $r_1 := (r_{1,j})_{j=1}^m := t - r_0$.

By construction $r_1 \in \sigma_{-k}$ and $t \in \sigma_{+k}$. Peter keeps s, t, $r_0$, $r_1$, k secret. These have the property that $s_j$ can be recovered from $t_j$, so this (random) map is invertible, or from $(r_{0,j}, r_{1,j})$ but no information about $s_j$ is revealed from $r_{0,j}$ alone or $r_{1,j}$ alone, for any given $j \in [m]$. Indeed $s_j = abs(t_j) = abs(r_{0,j} + r_{1,j})$ whereas Victor views $Pr(s_j | r_{i,j}) = \frac{1}{2}$ for any given $i \in \{0, 1\}$, $j \in [m]$ as can be seen in the table of possibilities in FIG. 9.

Peter uses the construction. Let $D := \sigma_{+k} \cup \sigma_{-k}$. Extend the domain of $h_M(\cdot)$ to D as $h_M : D \to \mathbb{Z}_q^n$ so that t, $r_0$, $r_1 \in D$ can be input to $h_M(\cdot)$. Peter commits to t, and hence also s, by posting T where $T := h_M(t)$. Peter posts $R_0$, $R_1$ where $R_i := h_M(r_i)$ for $i \in \{0, 1\}$ and Victor checks that $T = R_0 + R_1 \pmod q$; this step may be improved by Peter posting $R_0$ and Victor recovering $R_1$ as $T - R_0$. Victor chooses $c \in_R \{0, 1\}$. Peter posts v where $v := r_c$. Victor checks that $v \in D$ and that $h_M(v) = R_c$. If the checks pass, Victor is convinced that with probability $\frac{1}{2}$ Peter also knows v' where $v' \in D$ and $h_M(v') = R_{1-c}$ and hence also u such that $u \in D$, $u = v + v'$, and $h_M(u) = T$. Because of the hardness of finding collisions for $h_M$ due to the hardness result for (A2) described above, Victor is also convinced that $v = r_c$, $v' = r_{1-c}$, $u = t$. Yet Victor does not learn anything new about s from v due to the property described above. A simulator that gets to select c can set $r_{1-c} := h_M^{-1}(T - R_c)$, which is generally in $\mathbb{Z}_q^m$ and not D, and hide it since $r_{1-c}$ is not revealed.

To make a zero-knowledge argument based on the above construction, Peter may convince Victor with probability much higher than $\frac{1}{2}$, approaching 1. Increasing the probability requires new technique. Standard round-repeating does not work securely, since by observing multiple draws of $r_{0,j}$, $r_{1,j}$ Victor learns about $t_j$, and hence about $s_j$. Specifically, Victor may infer $t_j = 0$ or $t_j = -1$ or $t_j = 1$ when observations follow draws with replacement from the multisets $\{-1, 0, 0, 1\}$ or $\{0, -1\}$ or $\{0, 1\}$ respectively; these are easy to statistically distinguish with high confidence after a small number of draws.

To increase the probability, a partly-cheating protocol with a pair of rounds for each bit of security may be used instead. Let w be the security parameter in bits, so that 2w rounds are used. For each pair of rounds $k \in W := \{1, \ldots, w\}$, peter chooses $a_k$, $b_k \in \{0, 1\}$. Let $T' := T'_k := -T$ if $a_k = 1$ or $T' := T$ otherwise. Peter posts T', in place of T in the above described construction, once per an argument. Peter commits to $r_{i,j,2k+1-a_k}$ corresponding to $t_j$ as usual for $i \in \{0, 1\}$, $j \in [m]$ and to $r_{b_k,j,2k+a_k} \in_R U_{j,k}$ where $U_{j,k} \in_R \{r'_{0,j}, r'_{1,j} | t'_j = -t_j\}$ for $j \in [m]$ is the multiset of $r'_{0,j}, r'_{1,j}$ values from a column having $t'_j = -t_j$ chosen randomly from the table of possibilities. These result in $R_{i,j,2k+1-a_k}$ for $i \in \{0, 1\}$, $j \in [m]$ and $R_{b_k,j,2k+a_k}$ for $j \in [m]$ being posted. Peter posts $(R_{1-b_k,j,2k+a_k})_{j=1}^m := T' - h_M((r_{b_k,j,2k+a_k})_{j=1}^m)$ which is a cheat-vector generally having a $h_M(\cdot)$ preimage in $\mathbb{Z}_q^m$, not D. The protocol ensures Victor never sees this preimage. Victor posts a challenge c of length w bits. Peter posts $c_0$, $c_1$ of length w bits each having $c = c_0 \oplus c_1$ and $c_{a_k}[k] = b_k$ for $k \in W$, which can be solved for $c_{a_k}[k]$ and then for $c_{1-a_k}[k]$. Next, Peter posts $c_0$, $c_1$ and reveals $r_{c_i[k],j,2k+i}$ for $i \in \{0, 1\}$, $j \in [m]$, $k \in W$. Finally, Victor verifies the argument by checking that c, r, R, T' posts match, namely that $c = c_0 \oplus c_1$, that $T' = (\sum_{i=0}^1$ $R_{1,j,2k})_{j=1}{}^m$ and $-T'=(\Sigma_{i=0}{}^1 R_{1,j,2k+1})_{j=1}{}^m$ for $k \in W$, and that $(R_{c_i,[k],j,2k+i})_{j=1}{}^m = h_M((r_{c_i,[k],j,2k+i})_{j=1}{}^m)$ for $i \in \{0, 1\}$, $k \in W$. The inclusion of the rounds $(2k+a_k)_{k \in W}$, in which Peter uses $-t$ and $-T$, has a balancing effect on observed distribution of $r_{i,j,k}$ values: Victor's observations follow draws with replacement from the multiset $\{-1, 0, 0, 1\}$ for $j \in [m]$, $k \in W$. Hence the same $t$, $T$ can be securely used in all pairs of rounds.

As one round in each pair is effectively a response to a challenge, passing verification convinces Victor with probability $1-2^{-w}$ that Peter knows corresponding $s$, $t$ where $h_M(t)=T$. As for the construction, Victor does not learn anything new about $s$. A simulator that gets to select $c$ can hide two cheat values, one for each round of a pair, in a $2 \times 2$ matrix with a row for each of $r'_0$, $r'_1$ and a columns for each round of the pair, along a row or diagonal that is not revealed. The structure of the argument for a pair of rounds is such that effectively Victor gets to choose whether Peter would expose $r'$ values along a diagonal or a row of the $2 \times 2$ matrix, whereas Peter gets to choose which diagonal or row respectively.

The described zero-knowledge hashing arguments may be made non-interactive using standard techniques. A use of one known method for converting interactive arguments to non-interactive ones is described. Using the technique of signatures of knowledge, the non-interactive argument proceeds as follows. Let $H_w$ be a cryptographic hash function (not $h_M$) from arbitrary bit strings to bit strings of length $w$, that is $H_w:\{0, 1\}^* \to \{0, 1\}^w$, and let $\|$ be the bit string concatenation operator. A parameter appearing under $H_w(\bullet)$ is understood as its bit string representation. Let $P_*$ be a tuple of all public parameters, and let $R_*$ be a tuple of all R-values posted by Peter in the interactive argument. Instead of Victor's challenge and Peter's response, Peter posts $(c, r)$ where $c:=H_w(P_* \| R_* \| T')$, $r:=(r_{c_k,j,k})_{j=1,k=1}{}^{m,w}$ and Victor checks that $H_w(P_* \| R_* \| T'')=c$ where $T'':=\Sigma_{k=1}{}^w (h_M(r_{c_k,j,k})+R_{1-c_k,j,k}))_{j=1}{}^m$.

The described zero-knowledge hashing arguments of knowledge may be converted to one of communication as follows. In addition to the posts $R_0$, $R_1$, Peter verifiably communicates $r_0$, $r_1$ as opaque messages $M_0$, $M_1$ with secret keys $K_0$, $K_1$ respectively to Robert, the receiver. When Victor chooses $c$ and Peter posts $v:=r_c$, observers may verify whether $r_c$ matches $M_c$ in the corresponding communication, and/or Peter posts $K_c$ to allow observers to infer $M_c$. Following this, Victor is convinced that with same probability Robert also received $r_{1-c}$, so Victor views Robert and Peter the same, and the argument conclusions apply to both Peter and Robert.

A verifiable commitment to a message may be made using a zero-knowledge argument, as described, for its hash. This is a commitment because of the hardness of finding a preimage for a collision resistant hash function, like the uses in the present examples, and is verifiable because the argument is verifiable as described above. Different commitments, based on the same zero-knowledge hashing, may be made to the same message by using any of a number of well-known techniques, including padding and HMAC (hash-based message authentication codes). Multiple commitments may be organized in a chain, a tree, or similar structures.

The described zero-knowledge hashing may be extended to streams. So far the zero-knowledge hash applied to messages of length $m$ bits. $m$ can be increased to fit a message of any size; doing so would require more memory to accommodate larger $r_{i,j}$, M as well as processing the entire stream even if validation would fail on the first few bits. Alternatively, zero-knowledge hashing may be used in well-known incremental hashing schemes. Thus, zero-knowledge hashing is applied to each block of the stream separately, and an incremental hashing is used to combine the hashes of the blocks. The size of the block may be chosen based on various considerations including resulting level of security, streaming latency, and required computational resources. One may also use message padding to ensure hash values for two blocks differ even if their non-padded messages do not. The structure of an incremental hashing scheme allows this combination to be done in parallel or in a distributed fashion.

Incremental hashing may be applied with the described zero-knowledge hashing as follows. Let b be the block size in bits, N be the number of blocks in the stream, and $s \in \mathbb{N}$ where $N \leq 2^s$. A zero-knowledge hash h is applied to a string $x'_i:=\langle i, x_i\rangle$ of length $m:=s+b$ bits where $x_i$ is the content of block i (zero-based) and where m is the same as in our zero-knowledge hashing. The hashes are then combined using an incremental hash H. Bellare and Micciancio described a few options in a well-known paper dated 1997. One option is AdHash, with a parameter M' of k bits, defined by $H(x_1, \ldots, x_N):=\Sigma_{i=1}{}^N h(x'_i) \bmod M'$. An example choice is $s=64$, $k=s^{3/2}=512$. Another option is LtHash, which has a parameter p of l bits, works with $h:=\{0, 1\}^m \to \mathbb{Z}_p^k$, and is defined by $H(x_1, \ldots, x_N):=\Sigma_{i=1}{}^N h(x'_i) \bmod p$ over $\mathbb{Z}_p^k$. Bellare and Micciancio paper noted in their paper that the choice $k=500$, $l=110$ is sufficient in practice.

The described construction may be generalized in multiple ways, including the following examples. A numeric base $a>2$ may be used. In this case, $S:=\{0, 1, \ldots, a-1\}^m$ and the rest of the construction for $\alpha_{\pm 1}$, k, $\sigma_{\pm k}$, t, $r_0$, $r_1$, D remains the same. The construction will work when a is small enough that (A2) remains hard for $x \in D\setminus\{0\}^m$. Similarly, one may also use a varying base $(a_j)_{j=1}{}^m$ with $S_j:=\{0, 1, \ldots, a_j-1\}$, $S:=\times_{j=1}{}^m S_j$, $\alpha_{i,j}:=\{ix|x \in S_j\}$ for $i \in \{-1, 1\}$, $\sigma_{\pm k}:=\times_{j=1}{}^m \alpha_{\pm k,j}$, $D_j:=\alpha_{-1,j} \cup \alpha_{1,j}$, and $D:=\times_{j=1}{}^m D_j$. The above described techniques for making a zero-knowledge argument, a non-interactive argument, verifiable communication of the argument, zero-knowledge hash commitments, and verifying a stream apply similarly.

A different structure for the challenge c may be used. In this case, a formula where c is a bijective function of $c_i$ given $c_{1-i}$ for $i \in \{0, 1\}$ can be used in place of e, such as splitting the binary form of c into components of b bits each and using addition modulo $2^b$ per component. These options apply in this construction as well as in other sigma-protocols.

Both the zero-knowledge construction and argument may be applied to a universal hash function $h_{r,M}(\bullet)$. Let $h_M(r, s):=h_{r,M}(s)$. The difference between $h_M(\bullet)$ and $h_M(\bullet, \bullet)$ is that the former is linear in one variable, satisfying $h_M(s_1)+h_M(s_2)=h_M(s_1+s_2)$, whereas the latter in two, satisfying $h_M(r_1, s_1)+h_M(r_2, s_2)=h_M(r_1+r_2, s_1+s_2)$. Hence, the universal hash function may be substituted for the non-universal one in the construction and argument by considering its two variables in linear operations.

Zero-knowledge hashing argument methods described herein may be built on secure linear/affine hashing. One example scheme is that described herein due to GGH with parameters n, m, q. A second scheme involves hash functions $h_M$, $h_{r,M}$ that are extended to $\{0, \ldots, d-1\}^m \to \mathbb{Z}_q^n$ with $d \in \mathbb{Z}$ and $$n \frac{\log q}{\log d} < m.$$

A third scheme, whose security was analyzed by Micciancio, involves using a block-circulant matrix M where n divides m, allowing reducing the storage size of M from m×n to m as well as speeding up the hashing using the number-theoretic transform (NTT), a modular-arithmetic version of the discrete Fourier transform (DFT), which may be efficiently implemented using the fast Fourier transform (FFT). A fourth scheme, due to Lyubashevsky and Micciancio, involves using a block-matrix M where each block is chosen at random as a linear transformation to which ideal lattices are invariant. A similar scheme is due to Peikert and Rosen. A fifth scheme called SWIFFT, due to Lyubashevsky and Micciancio and Peikert and Rosen, is a highly optimized version of the previous scheme. A standard assumption of hardness applies to the problem of finding collisions as well as to the problem of finding a pre-image for the hash function in these settings. Moreover, these schemes are considered secure against quantum computational attacks. Finally, a secure additively-homomorphic hash function $h(\bullet)$ may be used in place of $h_M(\bullet)$ in zero-knowledge hashing arguments described herein.

Various zero-knowledge arguments are described herein. In zero-knowledge arguments described herein, one round is detailed and the generalization to multiple rounds is understood to follow using described techniques unless said otherwise in context. Herein, in zero-knowledge hashing arguments, pre-images (t values) and their parts ($r_\pm$ values) are verified to be in their domain ($D^m$), unless said otherwise in context. Herein, notations such as $s^{[a]}$, $t^{[a]}$, $k^{[a]}$, $\sigma^{[a]}$, $r^{[a]}$ are used to denote values with an additional index a. A signed-modulus notation a s mod n:=sgn(a)(|a| mod n), defined for $a \in \mathbb{Z}$, $n \in \mathbb{N}$, is used as well. Mathematical relations with free indexes apply to each combination of indexes in their domain. Unless said otherwise in context, a free index i ranges over [n] and a free index j ranges over [m]. Operations such as absolute value $|\bullet|$ or floor $\lfloor \bullet \rfloor$ of a vector as well as operations such as multiplication $\odot$ or division/of vectors are each taken element-wise. The operation ÷, /, +, − used to denote division without remainder, quotient, addition, and subtraction; when these operations are used on vectors, they apply to numbers corresponding to the vectors, unless said otherwise in context. Unless said otherwise, parameters are set such that pre-image problems are hard per said standard assumption.

Herein, a challenge refers to means of affecting what secrets that their holder committed to would need to be revealed for verification to pass, such that the choice of secrets to reveal is unpredictable to and not controlled by the holder at the time of commitment to the secrets. One example for a challenge is a random value used to select which secrets would be revealed. A second example is the value of a secure hash function in a Fiat-Shamir transform of a given protocol. A third example is an extension of the first or second example using a pseudo-random number generator seeded with their value, resulting in a longer sequence of challenges. A fourth example is using oblivious-transfer (OT) or k-out-of-n OT for selecting to reveal some of the secrets possibly with some probability. A fifth example is an extension of the fourth example by extending OT, resulting in a longer sequence of OT.

Zero-knowledge hashing argument described herein may be composed in a manner similar to connecting circuit gates. A secret for which one zero-knowledge hashing argument is made may be viewed as the output of the argument, and this output may be used as input to other such arguments. For example, zero-knowledge hashing arguments for two secrets may be followed by a zero-knowledge hashing argument for modular addition and then by a zero-knowledge hashing argument for modular multiplication of numbers composed by elements, both described herein. In composing arguments, some elements of some of the arguments may be permuted to align their position with that of elements of other arguments, in order to align outputs of some arguments with inputs of others, effectively wiring them as circuit gates. This may be done using arguments for permutation of elements, described herein.

A first example zero-knowledge hashing argument for binary elements, in the ring Z2, is described. A splitting of a secret in $\mathbb{Z}_2$ into two pieces in $\pm \mathbb{Z}_2$, such that the pieces are embedded in $\mathbb{Z}_q$ via an appropriate mapping and only one piece is revealed, may be used in a zero-knowledge argument that the secret is in $\mathbb{Z}_2$. Methods for using zero-knowledge hashing to obtain a zero-knowledge embedding of $\mathbb{Z}_2$ in $\mathbb{Z}_q$ are described here. Let $S := \mathbb{Z}_2$. Let $\alpha_i := \{ix|x \in S\}$ for $i \in \{-1, 1\}$. Let $D := \alpha_1 \cup \alpha_{-1}$. Let $s := (s_1, \ldots, s_m) \in S^m$. Let $k := (k_1, \ldots, k_m) \in_R \{-1, 1\}^m$. Let $\sigma_{\pm k} := \times_{j=1}^m a_{\pm k_j}$. Let $t := (t_1, \ldots, t_m)$ where $t_j := s_j k_j$ for $j \in [m]$. Let $r_+ := (r_{+,1}, \ldots, r_{+,m}) \in \sigma_{+k}$, $r_- := (r_{-,1}, \ldots, r_{-,m}) \in \sigma_{-k}$ be pieces randomly chosen with $r_{+,j} + r_{-,j} = t_j$ for $j \in [m]$, i.e. from the set $\{(r_+, r_-) | r_+ \in \sigma_{+k}, r_- \in \sigma_{-k}, r_+ + r_- = t\}$. Let $r_0$, $r_1$ be a random permutation of $r_+$, $r_-$ of which one is revealed by Peter to Victor. This results in the following table of possibilities appearing in FIG. 9. Then s is determined by t while Victor learns nothing about s from one of $r_0$, $r_1$.

Moreover, a partially cheating protocol for a pair of rounds, each with its own choices of $r_\pm$, may be used in a zero-knowledge argument of knowledge of a pre-image of $h_M(t)$. It may also be used in an argument of knowledge of a pre-image of $h_{r,M}(t)$ by accounting for the linearity of $h_{r,M}$ in r, which here is distinct from $r_+$, $r_-$. For example, for $s_j = 0$ (resp. $s_j = 1$), Peter may set either $r_{\pm,j} \in_R \{(0, 0), (k_j, -k_j)\}$ or $r_{\pm,j} = (0, 0)$ as a random choice in each round (resp. set $r_{\pm,j} \in_R \{(0, k_j), (k_j, 0)\}$ in each round), and use said protocol on the pair of rounds to reveal $r_j^{[1]}$, $r_j^{[2]}$ with a multiset-drawn distribution $(r_j^{[1]}, r_j^{[2]}) \in_R \{(0, 0), (0, 0), (0, k_j), (k_j, 0)\}$ viewed by Victor. Other balanced distributions for $(r_j^{[1]}, r_j^{[2]})$ may be used as well, e.g. one with a non-uniform probability of drawing from the multiset shown. Here, $r_j^{[1]}$ (resp. $r_j^{[1]}$) is a revealing of one of $r_{\pm,j}$ of the first (resp. second) round in the pair. Effectively, the protocol lets Peter avoid revealing $-k_j$ and present a balanced, i.e. independent of $s_j$, distribution to Victor. Thus, Peter only reveals $k_j$ and teaches Victor nothing about $s_j$ even in many pairs of rounds.

The structure of statements for this construction is described. The GS includes the hash values $h_M(t)$, $h_M(r_+)$, $h_M(r_-)$ of t, $r_+$, $r_-$ for each round; their connection may be verified by checking that $h_M(t) = h_M(r_+) + h_M(r_-)$. The PS includes the revealings in the protocol described; the revealing of $r_0$ or $r_1$ in each round provides the pieces evidence, which is verified by checking that each revealed vector is in the described expected domain and that the distribution of vector elements follows the described expected distribution. The IS includes a description of the instruction, namely one declaring that the secret vector is composed of binary elements and referencing the GS and the PS; it is verified by checking that the GS and the IS are ones for binary elements as described.

A second example zero-knowledge hashing for o-ary elements, in the ring $\mathbb{Z}_o$, is described. A zero-knowledge embedding of $\mathbb{Z}_2$ in $\mathbb{Z}_q$, as described herein, may be extended to a zero-knowledge embedding of $\mathbb{Z}_o$ in $\mathbb{Z}_q$. Methods for using zero-knowledge hashing to obtain a zero-knowledge embedding of $\mathbb{Z}_2$ in $\mathbb{Z}_q$ are described here. Peter makes a zero-knowledge hashing argument for o-ary elements as follows. Let $S:=\mathbb{Z}_o$ for $o<<q$, let $\alpha_j$, D, s, k, $\sigma_\pm$, $r_\pm$ be defined for this S as was defined in the first example zero-knowledge hashing argument, and consider the case $k_j=1$ for which $t_j=s_j$. For each round, where round indexes are dropped, Peter sets $c:=(c_j)_{j=1}^m \in \mathbb{Z}_2$ where $c_j=1$ if $r_{+,j}+r_{-,j}<0$ and otherwise $c_j=0$, and argues knowledge of a pre-image in $\mathbb{Z}_2$ of $y:=h_M(c)$ as described in the first example zero-knowledge hashing argument, thus posting y. Now, $r_+ + r_- + oc = t$ holds, while revealing one of $r_\pm$ teaches nothing about t, for each round. For each pair of rounds, Peter follows the partially cheating protocol described in the first example zero-knowledge hashing argument to argue knowledge of a pre-image of $h_M(t)$, thus posting $h_M^{[1]} := h_M(t)$, $h^{[2]} := h_M(r_+)$, $h^{[3]} := h_M(r_-)$ for each round. In response to a challenge for each pairs of rounds, Peter reveals one of $r_\pm$ for each round as described in the protocol in the first example zero-knowledge hashing argument. Victor verifies this argument for o-ary elements by checking said arguments of knowledge and that $h^{[1]} = h^{[2]} + h^{[3]} + oy \bmod q$. In more detail, where such details should be understood when not elaborated in arguments, Victor checks the argument for y for each round, that $h^{[1]}$ is common to all rounds, that revealings correspond to challenges, that each revealed $r_+$ (resp. $r_-$) is in D and hashes to $h^{[2]}$ (resp. $h^{[3]}$), and that $h^{[1]} = h^{[2]} + h^{[3]} + oy \bmod q$ holds for each round. Since $h^{[1]}$ is common to all rounds, Peter need only post it once for the argument. Since $h^{[1]} = h^{[2]} + h^{[3]} + oy \bmod q$ must hold for verification to pass, Peter may skip posting $h^{[3]}$ and Victor may recover $h^{[3]}$ as $h^{[1]} - h^{[2]} - oy \bmod q$, thus reducing communication demands of the argument.

This method may be modified as follows. The argument may be made similarly in the case $k_j = -1$ for which $t_j = -s_j$, with $c_j = 1$ if $r_{+,j} + r_{-,j} > 0$ and otherwise $c_j = 0$, with $r_+ + r_- - oc = t$ mod $o$ and $h^{[1]} = h^{[2]} + h^{[3]} - oy \bmod q$ holding, and with $h^{[3]}$ recovered as $h^{[1]} - h^{[2]} + oy \bmod q$ instead.

The structure of statements for this construction is described. The GS includes the hash values $h^{[1]}$, $h^{[2]}$, $h^{[3]}$ of t, $r_+$, $r_-$, c for each round; their connection may be verified e.g. by checking that $h^{[1]} = h^{[2]} + h^{[3]} + oy \bmod q$ as described in one case. The PS includes the revealings described; the revealing of $r_0$ or $r_1$ in each round provides the pieces evidence, which is verified by checking that each revealed vector is in the described expected domain and that the distribution of vector elements follows the described expected distribution. The IS includes a description of the instruction, namely one declaring that the secret vector is composed of o-ary elements and referencing the GS and the PS, as well as the hash value y of c; it is verified by checking that the GS and the IS are ones for o-ary elements as described. The structure of statements for other instructions described herein arises similarly.

An example method of extending this construction to more pieces is described. A construction with n+1 pieces $R' := (r'_i)_{i=1}^{n+1}$ starting from one with n pieces $R := (r_i)_{i=1}^n$ may be obtained as follows. First, a random $u \in [n]$ may be chosen, and e.g. a choice such that $sgn(r_u)$ is not a majority among $(sgn(r_i))_{i=1}^n$ may be used to ensure a (near) balance between positive and negative signs of items in R', e.g. to obtain a smaller carry domain. Initially for n=2 and thereafter for n>2, it holds that $r_u \in \pm \mathbb{Z}_o$. Hence, $r_u$ may be split into $r_{+,u}$, $r_{-,u} \in \mathbb{Z}_o$ using the method described above for t. Next, R' may be constructed as the items $(r_i)_{i=1}^{u-1}$, $r_{+,u}$, $r_{-,u}$, $(r_i)_{i=u+1}^n$. A reordering of these items may be used as well. A relation over $(h_M(r'_i))_{i=1}^{n+1}$ in a zero-knowledge argument is obtained from one over $(h_M(r_i))_{i=1}^n$ by replacing $h_M(r_u)$ in the latter with $h_M(r_{+,u}) + h_M(r_{-,u})$ in the former, and by extending the domain of the carry to account for the split. For example, $h_M(t) = h_M(r_1) + h_M(r_2) + oy \bmod q$ where $y := h_M(c)$, $c \in \mathbb{Z}_2^m$ may be replaced with $h_M(t) = h_M(r'_1) + h_M(r'_2) + h_M(r'_3) + oy \bmod q$ where $r_2$ was split to $r'_2 + r'_3$ and where $y := h_M(c)$, $c \in \mathbb{Z}_3^m$.

A third example zero-knowledge hashing argument for zero elements is described. Let $J \subseteq [m]$ be a set of elements where $s_j = 0$ for $j \in J$ that Peter wishes to argue for. To this end, Peter may make a zero-knowledge hashing argument for o-ary elements, as described herein, modified as follows: in all rounds, for each $j \in J$ Peter sets $r_{+,j} = r_{-,j} = 0$. Victor verifies this argument for zero-elements by checking said arguments of knowledge and that in each round the revealed $r_0$ or $r_1$ (one of $r_\pm$) has $r_{\cdot,j} = 0$ for $j \in J$.

A fourth example zero-knowledge hashing argument for partial equality of elements is described. Peter makes a zero-knowledge hashing argument for partial equality of elements as follows. Let $s^{[1]}$, $s^{[2]}$ be secrets and $J \subseteq [m]$ be a set of elements such that $s_j^{[1]} = s_j^{[2]}$ for $j \in J$. First, Peter makes a zero-knowledge hashing argument for modular subtraction of elements, described herein, showing that $s^{[3]} = s^{[1]} - s^{[2]}$. Then, Peter makes a partial zero-knowledge argument for zero elements, described herein, showing that $s_j^{[3]} = 0$ for $j \in J$.

A fifth example zero-knowledge hashing argument for permutation of elements is described. Peter makes a zero-knowledge hashing argument for permutation of elements as follows. Let P be the public m×m permutation matrix for the argument. Let $s^{[1]}$, $s^{[2]} \in S^m$ be secrets where $s^{[2]} := Ps^{[1]}$. Peter argues knowledge of pre-images of $h^{[1]} := h_M(t^{[1]})$, $h^{[2]} := h_M(t^{[2]})$ using a method as described above modified as follows: sets $r_\pm^{[2]}$ to $(P(r_\pm^{[1]} \odot k^{[1]})) \odot k^{[2]}$ and reveals either $r_+^{[1]}$, $r_+^{[2]}$ or $r_-^{[1]}$, $r_-^{[2]}$, e.g. using a common challenge for both in the method. Herein, $r_\pm^{[1]}$, $r_\pm^{[2]}$ and similar notations are understood to mean only either $r_+^{[1]}$, $r_+^{[2]}$ or $r_-^{[1]}$, $r_-^{[2]}$ are revealed, e.g. using a common challenge. Thus, Peter posts $h^{[1]}$, $h^{[2]}$. Victor verifies this argument for permutation of elements by checking the described arguments of knowledge and that each revealed pair $r_\pm^{[1]}$, $r_\pm^{[2]}$ satisfies $|r_\pm^{[2]}| = |Pr_\pm^{[1]}|$.

The argument may be characterized as follows. For a rotation matrix P, the permutation of elements is equivalent to rotation of elements. Given an argument of knowledge for a pre-image of $h^{[1]}$ (as input to this argument) has already been made, the computational resources demanded by this argument are dominated by 1 argument of knowledge of a pre-image. In case $k^{[2]}$ is constrained to be chosen equal to $Pk^{[1]}$, the communication resources demanded by the argument can be reduced by having Victor recover $r_\pm^{[2]}$ as $Pr_\pm^{[1]}$ and Peter skip posting $r_\pm^{[2]}$. In this case, the argument of knowledge of a pre-image for $h^{[2]}$ may be skipped, though hash values are still posted.

The argument may be enhanced as follows. For a set $J \subset [m]$, let $I_J$ be an m×m matrix where entries $I_{j,j}$ for $j \in J$ are set to 1 and all other entries are set to 0. Provided problems of finding a pre-image remain hard, the argument may be modified to a partial permutation argument by having Peter constrain only elements $j \in J$ of $r^{[2]}$, so that $I_J r^{[2]} = I_J (P(r_\pm^{[1]} \odot k^{[1]})) \odot k^{[2]})$, and set remaining elements (in a described way for an argument of knowledge of a pre-image), and having Victor verify that $|r_\pm^{[2]}| = |Pr_\pm^{[1]}|$ only for elements $j \in J$, i.e. that $I_J |r_{35}^{[2]}| = I_J |Pr_\pm^{[1]}|$. When the first (resp. last) element is free in a 1-right (resp. 1-left) rotation, the resulting argument is a 1-right-shift (resp. 1-left-shift) argument and the corresponding partial permutation matrix is a 1-right-shift (resp. 1-left-shift) matrix. When $|S|=2$, the argument is a (possibly partial) bit permutation argument. Moreover, a varying base $S_j := \mathbb{Z}_{o_j}$ for corresponding varying moduli $o_j$ may replace S, o as well, by using a varying base in said arguments of knowledge of a pre-image. Provided problems of finding a pre-image remain hard, the argument may be made for a subset $J \subset [m]$ of the elements by modifying the included arguments of knowledge of a pre-image to set $r_j$ values in $\mathbb{Z}_q$ for $j \in [m]\setminus J$, while continuing to set $r_j$ values in $\mathbb{Z}_o$ for $j \in J$; the resulting argument is a partial argument for permutation of elements. If the verification relation is additive, this may be done e.g. by choosing $v_j \in_R \mathbb{Z}_q$, and setting element j of $r_+$ (resp. $r_-$) to a modified (blinded) version that is incremented (resp. decremented) by $v_j$ for $j \in J$. Furthermore, an extended argument may be made for permutation of elements of v vectors, each of length m, using a matrix $P_\xi$ of size vm×vm acting on a block-concatenation of v vectors of size m, and using an extended block-diagonal hash matrix $M_\xi$ of size vn×vm, with v copies of M along its diagonal and zeros elsewhere, in an extended hash function $h_{M_\xi}$ for the arguments of knowledge of a pre-image. In this case, said variables M, $r_\pm^{[1]}$, $r_\pm^{[2]}$, $k_\pm^{[1]}$, $k_\pm^{[2]}$ are replaced with $M_\xi := \text{diag}(M_1, \ldots, M_v)$, $r_{\xi,\pm}^{[1]} := (r_{35}^{[1,1]}, \ldots, r_{35}^{[1,v]})$, $r_{\xi,\pm}^{[2]} := (r_{35}^{[2,1]}, \ldots, r_{35}^{[2,v]})$, $k_{\xi,\pm}^{[1]} := (k_{35}^{[1,1]}, \ldots, k_{35}^{[1,v]})$, $r_{\xi,\pm}^{[2]} := (k_{35}^{[2,1]}, \ldots, k_{35}^{[2,v]})$ where $M_a = M$ for $a \in [v]$. Here, the second bracketed index ranges over [v] and corresponds to a block. Varying $M_a$ for $a \in [v]$ may also be used, provided pre-image problems remain hard. The length (resp. size) of each block in these defined vectors (resp. matrix) may be varied, provided pre-image problems remains hard, to obtain a varying-length extended argument.

As described herein for modular addition of elements, hash values of the form $h_{r,M}$ and a varying base $S_j := \mathbb{Z}_{o_j}$ for corresponding varying moduli $o_j$, so that $o^k$ for $k \in [m]$ is replaced with $\Pi_{j=1}^k$ (defined as 1 for k=0), may be used in similar ways, and an extended argument may be made in similar ways as well. Provided problems of finding a pre-image remain hard, a set $J \subset [m]$ of elements of c' and of corresponding elements of $r_\pm$ may be chosen as 0. Arguments for zero elements are described herein. In this case, an argument for multiple numbers, each interpreted over a disjoint subset of elements, may be made by choosing as 0 the most significant element of each number and by setting (and verifying) $r_\pm = 0$ for these elements in all rounds. For example, for the choices m:=4096 and J:={j|j∈[m], j=0 mod 64}, an argument may be made for 64 numbers, where the ith number for $i \in [64]$ is interpreted over 64 elements with indexes 64i-63, . . . , 64i (listed from least significant to most significant). Thus, in this example, the argument may be viewed as one of single-instruction multiple-data (SIMD), as may be other arguments herein such as for permutation and addition of elements, for an ADD instruction and 64 numbers as data. When o=2, this example may be characterized as one for 64 numbers of 64 bits each. Moreover, said permutation argument for c, c' may be modified to become a partial permutation argument. A partial set J may be defined to include only some of the numbers, e.g. the 64-element numbers in said example, resulting in a partial argument for modular addition of numbers, provided pre-image problems remain hard.

An argument for subtraction of numbers may be made using an argument for addition of numbers with repositioned operands. For example, to argue that $s^{[3]} = s^{[1]} - s^{[2]} \mod o^m$, an argument that $s^{[1]} = s^{[2]} + s^{[3]} \mod o^m$ may be made.

An example with 3 pieces is described. Here, free indexes i, a, b are ranging over [2], [3], [3] respectively. Require $k^{[i]}$ be all equal, and for simplicity assume all are equal to 1. Let a':=a+1 mod 3. Peter sets $w^{[a]} := r_a^{[1]} + r_a^{[3]} \mod o$, so that each is a sum of two corresponding pieces. Therefore, $w^{[a]}$ are random in $\mathbb{Z}_o^m$ subject to $\Sigma_{a=1}^3 w^{[a]} = \Sigma_{a,b=1}^3 r_a^{[1]} + r_b^{[2]}$ (mod o). Peter sets $r^{[a,b]} := r_a^{[1]} + r_b^{[2]}$, $r'^{[a,b]} := r^{[a,b]} \mod o$, and computes a carry vector (or vectors) c for $f := \Sigma_{a,b=1}^3 r'^{[a,b]}$, i.e. such that oc+f=(f mod o). Peter computes $h^{[a,b]} := h_M(r'^{[a,b]})$, $y := h_M(c)$. Peter posts $h^{[a,b]}$, y as commitments. Victor verifies that $h^{[3]} := h_M(t^{[3]}) = oy + \Sigma_{a,b=1}^3 h^{[a,b]} \mod q$. Victor chooses a challenge $u \in [3]$. Let u':=u+1 mod 3. Peter reveals the carry and secret pieces corresponding to 2 indices determined by Victor for u, namely c, $r_u^{[1]}$, $r_{u'}^{[1]}$, $r_u^{[2]}$, $r_{u'}^{[2]}$, thus allowing Victor to learn $w^{[u]}$, $w^{[u']}$ but not about any $t^{[i]}$. Victor verifies the argument by reconstructing $r'^{[u,u]}$, $r'^{[u',u]}$, $r'^{[u,u']}$ and checking that they respectively hash to $u'^{[u,u]}$, $u'^{[u',u]}$, $u'^{[u,u']}$ and by checking that $h_M(c) = y$.

A sixth example zero-knowledge hashing argument for modular addition or subtraction of elements is described. Peter makes a zero-knowledge hashing argument for modular addition of elements as follows. Let $s^{[1]}$, $s^{[2]} \in S^m$, $s^{[3]} := (s_j^{[1]} + s_j^{[2]} \mod o)_{j=1}^m$ be secrets. Peter argues knowledge of pre-images of $h^{[1]} := h_M(t^{[1]})$, $h^{[2]} := h_M(t^{[2]})$, with $k^{[1]} = k^{[2]}$, using a method as described above, thus posting $h^{[1]}$, $h^{[2]}$. Next, Peter sets $t^{[3]} := (t_j^{[1]} + t_j^{[2]} s \mod o)_{j=1}^m$, $h^{[3]} := h_M(t^{[3]})$ and $c := (\text{sgn}(t_j^{[3]} - t_j^{[1]} - t_j^{[2]}))_{j=1}^m$ so that the relation $oc_j = t_j^{[3]} - t_j^{[1]} - t_j^{[2]}$ holds, and posts $h^{[3]}$. Now, $s^{[3]}$ is determined by $t_j^{[3]}$, where $s_j^{[3]} = |t_j^{[3]}|$ and $t_j^{[3]} = k_j^{[3]} s_j^{[3]}$, with $k^{[3]} = k^{[1]}$. Hence, $h^{[3]}$ is a hash value for $s^{[3]}$. Here c has the role of a signed carry vector for the modular addition. Finally, Peter argues knowledge of a pre-image in $\{-1, 0, 1\}^m$ of $y := h_M(c)$, thus posting y, using an available argument making method for secrets in $\mathbb{Z}_2^m$. Victor verifies this argument for modular addition of elements by checking said arguments of knowledge of a pre-image and that $h_i^{[1]} + h_i^{[2]} + oy_i = h_i^{[3]} \mod q$.

This argument may be characterized as follows. For o=2, modular addition of elements is equivalent to a bitwise XOR operation on bit elements. Given arguments of knowledge of pre-images for $h^{[1]}$, $h^{[2]}$ (as inputs to this argument) have already been made, the computational resources demanded by this argument for modular addition of elements are dominated by 2 arguments of knowledge of a pre-image.

This argument may be enhanced as follows. Hashes of the form $h_{r,M}$ may be used, where herein r in $h_{r,M}$ forms is unrelated to $r_\pm$ values, in place of $h_M$ by accounting for linearity for r, so that e.g. a linear relation with a sum of hash values of the form $\Sigma_k h_{r_k,M}$ on one hand results in a hash value of the form $h_{(\Sigma_k r_m),M}$ on the other hand. This applies to similar linear relations described herein. Moreover, as described herein, hash values of the form $h_{r,M}$ and a varying base $S_j := \mathbb{Z}_{o_j}$ for corresponding varying moduli $o_j$ may be used with a separate carry vector $c^{[a]}$ for each distinct modulo $o^{[a]}$ and a corresponding hash $y^{[a]}$, resulting in a relation of the form $h^{[1]} + h^{[2]} + \Sigma_a o^{[a]} y^{[a]} = h^{[3]} \mod q$ where a enumerates distinct modulo, and with an argument as described herein that each carry vector $c^{[a]}$ has zero elements for all j except where $S_j = o^{[a]}$. Finally, an extended argument may be made in similar ways as described for permutation of elements.

An argument for subtraction of elements may be made using an argument for addition of elements with repositioned operands. For example, to argue that $s_j^{[3]} = s_j^{[1]} - s_j^{[2]} \mod o$ for $j \in [m]$, an argument that $s_j^{[1]} = s_j^{[2]} + s_j^{[3]} \mod o$ for $j \in [m]$ may be made.

A similar argument for modular addition or subtraction of numbers is described. Peter makes a zero-knowledge hashing argument for modular addition of numbers as follows. Here secrets are interpreted as radix-o numbers. Let $s^{[1]}$, $s^{[2]} \in S^m$, $s^{[3]} := s^{[1]} + s^{[2]} \mod o^m = \Sigma_{j=1}^m o^{j-1}(s_j^{[1]} + s_j^{[2]}) \mod o^m$ be secrets. Let P be an m×m 1-right-shift matrix, for which $P(x_1, \ldots, x_m) = (x_m, x_1, \ldots, x_{m-1})$. Peter argues knowledge of pre-images of $h^{[1]} := h_M(t^{[1]})$, $h^{[2]} := h_M(t^{[2]})$, with $k^{[1]} = k^{[2]}$, using a method as described above, thus posting $h^{[1]}$, $h^{[2]}$.

Peter sets $t^{[3]}:=h_\mathcal{M}(t^{[1]}+t^{[2]}$ s mod $o^m=\Sigma_{j=1}^m o^{j-1}(t_j^{[1]}+t_j^{[2]})$ s mod $o^m$, $h^{[3]}:=h_\mathcal{M}(t^{[3]})$, $c:=(\text{sgn}((t_j^{[1]}+t_j^{[1]}$ s mod $o)-t_j^{[1]}-t_j^{[2]}))_{j=1}^m$, $c':=k^{[1]}(P(k^{[1]}\odot c))$ so that the relation $oc_j+c'_j=t_j^{[3]}-t_j^{[1]}-t_2^{[2]}$ holds, and posts $h^{[3]}$. Now, $s^{[3]}$ is determined by $t^{[3]}$, where $s_j^{[3]}=|t_j^{[3]}|$ and $t_j^{[3]}=k_j^{[3]}s_j^{[3]}$, with $k^{[3]}=k^{[1]}$. Hence, $h^{[3]}$ is a hash value for $s^{[3]}$. Here c and c' have the role of a signed carry vector for modular addition of numbers, and the above relation between them is argued using a permutation argument. Finally, Peter argues knowledge of pre-images in $\{-1, 0, 1\}^m$ of $y:=h_\mathcal{M}(c)$, $y':=h_\mathcal{M}(c')$ using a method as described above for secrets in $\mathbb{Z}_2^m$, thus posting y, y'. Victor verifies this argument for modular addition of numbers by checking said arguments of knowledge and that $h_i^{[1]}+h_i^{[2]}+oy_i+y'_i=_i^{[3]}$ mod q.

A seventh example zero-knowledge hashing argument for modular multiplication of elements or numbers is described. Peter makes a zero-knowledge hashing argument for modular multiplication of elements as follows. Let $s^{[1]}$, $s^{[2]} \in S^m$, $s^{[3]}:=(s_j^{[1]}s_j^{[2]}$ mod $o)_{j=1}^m$ be secrets. In the case of multiplication, $k_j^{[1]} \neq k_j^{[2]}$ may be used. Peter argues knowledge of pre-images in $\mathbb{Z}_o$ of $h^{[1]}:=h_\mathcal{M}(t^{[1]})$, $h^{[2]}:=h_\mathcal{M}(t^{[2]})$, using a method as described above, thus posting $h^{[1]}$, $h^{[2]}$. Next, Peter sets $t^{[3]}:=(t_j^{[1]}t_j^{[2]}$ s mod $o)_{j=1}^m$, $h^{[3]}:=h_\mathcal{M}(t^{[3]})$ and posts $h^{[3]}$. Now, $s^{[3]}$ is determined by $t^{[3]}$, where $s_j^{[3]}=|t_j^{[3]}|$ and $t_j^{[3]}=k_j^{[3]}s_j^{[3]}$, with $k_j^{[3]}=k_j^{[1]}k_j^{[2]}$. Hence, $h^{[3]}$ is a hash value for $s^{[3]}$. Finally, Peter sets $h_{a,b}^{[1,2]}:=h_\mathcal{M}(r_a^{[1]}\odot r_b^{[2]})$ and posts $h_{a,b}^{[1,2]}$ for a, b∈v where $v:=\{+, -\}$. The relation $(r_+^{[1]}+r_-^{[1]})\odot(r_+^{[2]}+r_-^{[2]})=t^{[3]}$ (s mod o) holds and using hashing $\Sigma_{a,b\in v}h_{a,b}^{[1,2]}=h^{[3]}$ holds. Let a', b'∈v be those for which $r_{a'}^{[1]}$, $r_{b'}^{[1]}$ are revealed in said arguments for $h^{[1]}$, $h^{[2]}$. Victor verifies this argument for modular multiplication of elements by checking said arguments of knowledge of a pre-image and that $h(r_{a'}^{[1]}\odot r_{b'}^{[2]})=h_{a',b'}^{[1,2]}$.

A setup where $r_a^{[1]}r_b^{[2]}$ s mod o provides no information about neither $r_a^{[1]}$ nor $r_b^{[2]}$ for a, b∈v may be used. For example, a setup with $r_\pm^{[1]}$, $r_\pm^{[2]} \in \mathbb{Z}^*_o$ with o prime may be used, e.g. by modifying the definition of $\alpha_i$ to $\{i|x\in S\backslash\{0\}\}$. A prime o close yet less than $2^w \ll q$ for $w\in\mathbb{N}$ may be used to maximize the use of a w-bit representation of values in $\mathbb{Z}^*_o$. A Mersenne prime $o=2^w-1$ may be used with values of w it exists for. Fast modular arithmetic methods for such primes may be used as well. In this example setup, the argument for modular multiplication of elements may be modified as follows. Let a'', b'' negate a', b' so that $v=\{a', a''\}=\{b', b''\}$. Peter sets $c:=r_{a''}^{[1]}\odot r_{b''}^{[2]}$ s mod o and posts c in addition to his posts for $r_{a'}^{[1]}$, $r_{b'}^{[2]}$ in the argument for modular multiplication of elements. Victor verifies this modified argument for modular multiplication of elements by checking in addition that $h_\mathcal{M}(c)=r_{a'',b''}^{[1,2]}$. This added check provides a higher level of security to the modified argument compared to that of the unmodified argument.

An argument for modular division-without-remainder of elements may be made using an argument for modular multiplication of elements with repositioned operands. For example, to argue that. $s_j^{[3]}=s_j^{[1]}\div s_j^{[2]}$ mod o for j∈[m], an argument that $s_j^{[1]}=s_j^{[2]}s_j^{[3]}$ mod o for j∈[m] may be made. Herein, ÷ denotes division without remainder.

An argument for modular division-with-remainder of elements may be made by using an argument for modular multiplication of elements, an argument for quotient of elements, and an argument for remainder of elements. Let $u:=(u_1, \ldots, u_m)\in S^m$ be the quotient vector and let $d:=(d_1, \ldots, d_m)\in S^m$ be the remainder vector. For example, to argue that $s_j^{[3]}=\lfloor s_j^{[1]}/s_j^{[2]} \rfloor$ mod o for j∈[m], arguments that $u_j=s_j^{[2]}s_j^{[3]}$ mod o, $s_j^{[1]}=u_j+d_j$, $s_j^{[2]}>d_j\in S$ may be made, as described herein for comparison of elements.

An argument for modulus (resp. integer-division) of elements may be made using an argument for division-with-remainder and taking the remainder d (resp. quotient q) as the output of the argument.

Peter makes a zero-knowledge hashing argument for modular multiplication of numbers as follows. Here vectors are interpreted with elements in $\mathbb{Z}_o$ as radix-o numbers and use the operation · to denote their multiplication. Similarly, radix-o numbers are interpreted as vectors with elements in $\mathbb{Z}_o$ where appropriate, e.g. as arguments to hash functions. Let $s^{[1]}$, $s^{[2]} \in S^m$, $s^{[3]}:=s^{[1]}\cdot s^{[2]}$ mod $o^m$ be secrets, so that $s^{[3]}=\Pi_{k=1}^m (\Sigma_{j=1}^m o^{j-1}s_j^{[2]})$ mod $o^m$ holds. Peter argues knowledge of pre-images of $h^{[1]}:=h_\mathcal{M}(t^{[1]})$, $h^{[2]}:=h_\mathcal{M}(t^{[2]})$, with $k_1^{[1]}=k_j^{[1]}$ and $k_1^{[2]}=k_j^{[2]}$ for j∈[m], using a method as described above, thus posting $h^{[1]}$, $h^{[2]}$. Next, Peter sets $t^{[3]}:=t^{[1]}\cdot t^{[2]}$ s mod $o^m$, $h^{[3]}:=h_\mathcal{M}(t^{[3]})$ and posts $h^{[3]}$. Now, $s^{[3]}$ is determined by $t^{[3]}$, where $s_j^{[3]}=|t_j^{[3]}|$ and $t_j^{[3]}=k_j^{[3]}s_j^{[3]}$ with $k_j^{[3]}=k_j^{[1]}k_j^{[2]}$. Hence, $h^{[3]}$ is a hash value for $s^{[3]}$. Finally, Peter sets $h_{a,b}^{[1,2]}:=h_\mathcal{M}(r_a^{[1]}\cdot r_b^{[2]}$ mod $o^m)$ and posts $h_{a,b}^{[1,2]}$ for a, b∈v where $v:=\{+, -\}$. The relation $(r_+^{[1]}+r_-^{[1]})\cdot(r_+^{[2]}+r_-^{[2]})=t^{[3]}$ (s mod $o^m$) holds and using hashing $\Sigma_{a,b\in v}h_{a,b}^{[1,2]}=h^{[3]}$ holds. Let a', b'∈v be those for which $r_{a'}^{[1]}$, $r_{b'}^{[2]}$ are revealed in said arguments for $h^{[1]}$, $h^{[2]}$. Victor verifies this argument for modular multiplication of numbers by checking said arguments of knowledge of a pre-image and that $h(r_{a'}^{[1]}\cdot r_{b'}^{[2]}$ s mod $o^m)=h_{a',b'}^{[1,2]}$.

A setup where $r_a^{[1]}r_b^{[2]}$ s mod o provides no information about neither $r_a^{[1]}$ nor $r_b^{[2]}$ for a, b∈v may be used. For example, a setup with $r_\pm^{[1]}$, $r_\pm^{[2]} \in \mathbb{Z}_{o^m}$ and o prime may be used, e.g. by modifying the definition of $\alpha_0$ to $\{i|x\in S\backslash\{0\}\}$ (here index 0 corresponds to the least significant o-radix digit of the numbers), so that $r_\pm^{[1]}$, $r_\pm^{[2]}$ are taken from the subgroup in $\mathbb{Z}^*_{o^m}$ of numbers that are co-primes to o, having a single multiplicative inverse in that group. A prime o close yet less than $2^w \ll q$ for $w\in\mathbb{N}$ may be used to maximize the use of a w-bit representation of values in $\mathbb{Z}^*_o$. A Mersenne prime $o=2^w-1$ may be used with values of w it exists for. Fast modular arithmetic methods for such primes may be used as well. Then, in this example setup, the argument for modular multiplication of elements may be modified as follows. Let a'', b'' negate a', b' so that $v=\{a', a''\}=\{b', b''\}$. Peter sets $c:=r_{a''}^{[1]}\cdot r_{b''}^{[2]}$ s mod $o^m$ and posts c in addition to posting $r_{a'}^{[1]}$, $r_{b'}^{[2]}$ in the argument for modular multiplication of numbers. Victor verifies this modified argument for modular multiplication of numbers by checking in addition that $h_\mathcal{M}(c)=h_{a'',b''}^{[1,2]}$. This added check provides a higher level of security to the modified argument compared to that of the unmodified argument.

An argument for modular division-without-remainder of numbers may be made using an argument for modular multiplication of numbers with repositioned operands. For example, to argue that $s^{[3]}=s^{[1]}\div s^{[2]}$ mod $o^m$, where here ÷ applies to numbers, an argument that $s^{[1]}=s^{[2]}\cdot s^{[3]}$ mod $o^m$ may be made.

An argument for modular division-with-remainder of numbers may be made by using an argument for modular multiplication of numbers, an argument for quotient of numbers, and an argument for remainder of numbers. Let $u:=(u_1, \ldots, u_m)\in S^m$ be the quotient vector and let $d:=(d_1, \ldots, d_m)\in S^m$ be the remainder vector. For example, to argue that $s^{[3]}=\lfloor s^{[1]}/s^{[2]} \rfloor$ mod $o^m$, arguments (for numbers) that $u=s^{[2]}\cdot s^{[3]}$ mod $o^m$, $s^{[1]}=u+d$ mod $o^m$, $s^{[2]}>d\in S$ may be made using arguments for comparison of numbers, as described herein.

An argument for modulus (resp. integer-division) of numbers may be made using an argument for division-withremainder of numbers and taking the remainder d (resp. quotient q) as the output of the argument.

These arguments may be modified to partial ones as follows. For a given argument and $J \subseteq [m]$, $w:=|J|$, Peter makes a modified argument that constrains only elements $j \in J$ using techniques described herein for arguments for permutation of elements. For convenience of notation, element indexes may be permuted such that they are mapped to $[w]$ and the given argument is made with m replaced by w, so that index 0 corresponds to the least significant o-radix digit. Thus, vectors of w elements are interpreted as numbers in $\mathbb{Z}_{o^w}$ and arithmetics is done modulo $o^w$ in the relations described for the argument. The remaining elements $j \in [m] \setminus J$ are not similarly constrained by the modified argument.

An example with 3 pieces is described. Here, free indexes i, a, b are ranging over [2], [3], [3] respectively. Require $k^{[t]}$ be all equal, and for simplicity assume all are equal to 1. Peter chooses $r_a^{[t]} \in_R \mathbb{Z}_o^m$ subject to $\Sigma_{a=1}^3 r_a^{[t]} = t^{[t]}$ (mod o) and chooses $v_a \in_R \mathbb{Z}_o^m$ subject to $\Sigma_{a=1}^3 v_a = 0$ (mod o). Let $a' := a+1$ mod 3. Peter sets $w^{[a]} := v_a - v_{a'} + r_a^{[1]} r_a^{[2]} + r_a^{[1]} r_{a'}^{[2]} + r_{a'}^{[1]} r_a^{[2]}$ mod o. Therefore, $w^{[a]}$ are random in $\mathbb{Z}_o^m$ subject to $\Sigma_{a=1}^3 w^{[a]} = \Sigma_{a,b=1}^3 r_a^{[1]} r_b^{[2]}$ (mod o). Peter sets $r^{[a,b]} := r_a^{[1]} r_b^{[2]}$, $r'^{[a,b]} := -r^{[a,b]}$ mod o, $v'_a := v_a - v_{a'}$ mod o and computes a carry vector (or vectors) c for $f := \Sigma_{a,b=1}^3 r^{[a,b]} + \Sigma_{a=1}^3 v'_a$, i.e. such that oc+f=(f mod o). Peter computes $h^{[a,b]} := h_M(r^{[a,b]})$, $h'^{[a]} := h_M(v'_a)$, $y := h_M(c)$. Peter posts $h^{[a,b]}$, $h'^{[a]}$, y as commitments. Victor verifies that $h^{[3]} := h_M(t^{[3]}) = oy + \Sigma_{a,b=1}^3 h^{[a,b]} + \Sigma_{a=1}^3 h'^{[a]}$ mod q. Victor chooses a challenge $u \in [3]$. Let $u' := u+1$ mod 3. Peter reveals secret pieces corresponding to 2 indices determined by Victor for u, namely c, $r_u^{[1]}$, $r_{u'}^{[1]}$, $r_u^{[2]}$, $r_{u'}^{[2]}$, $u_u$, $u_{u'}$, thus allowing Victor to learn $w^{[u]}$, $w^{[u']}$ but not about any $t^{[t]}$. Victor verifies the argument by reconstructing $r'^{[u,u]}$, $r'^{[u',u]}$, $r'^{[u,u']}$, $v'_u$ and checking that they respectively hash to $h'^{[u,u]}$, $h'^{[u',u]}$, $h'^{[u,u']}$, $h'^{[u]}$, and by checking that $h_M(c) = y$.

An eighth example zero-knowledge hashing argument for comparison of numbers is described. Peter makes zero-knowledge hashing arguments for comparison of numbers as follows. An argument for equality of numbers may be done by choosing and revealing equal parts. This may be done provided problems of finding a pre-image remain hard. In more detail, the argument may be made as follows. Let s, s' be secrets and let $K \in [m]$. Let $J := \{j_1, \ldots, k_K\}$, $J' := \{j'_1, \ldots, j''_K\}$ be sets where $J, J' \subseteq [m]$ and $\forall k \in [K]: s_{j_k} = s'_{j'_k}$. Peter makes an argument of knowledge of a pre-image modified as follows. In each round of the protocol, Peter may choose equal $r_{\pm j_k}$, $r'_{\pm j'_k}$ values and reveal only one pair, either $r_{+j_k}$, $r'_{+j'_k}$ or $r_{-j_k}$, $r'_{-j'_k}$, for all $k \in K$, e.g. using a challenge common to all these elements in a round pair. Victor verifies this argument for equality of numbers by checking said argument of knowledge of a pre-image and that the revealed $r_0$ or $r_1$ (one of $r_\pm$) has $\forall k \in [K]: r_{\cdot j_k} = r'_{\cdot j'_k}$.

An argument for inequality of numbers may be made as follows, provided problems of finding a pre-image remain hard. To argue that at least one number whose elements span $[m]$ is unequal between two secrets $s^{[1]}$ and $s^{[2]}$, Peter may post their unequal hash values (resp. hashes) $h^{[1]}$, $h^{[2]}$ where $h^{[1]} := h_M(t^{[1]})$, $h^{[2]} := h_M(t^{[2]})$ (resp. $h^{[1]} := h_M(s^{[1]})$, $h^{[2]} := h_M(s^{[2]})$). Victor verifies this argument for inequality of elements by checking that $h^{[1]} \neq h^{[2]}$. To argue that at least one number in a set of numbers, whose elements span the set $J \subseteq [m]$, is unequal between $s^{[1]}$ and $s^{[2]}$, Peter may proceed as follows. Peter sets $s^{[3]}$ where $s_j^{[3]} := 0$ for $j \in J' := [m] \setminus J$ and $s_j^{[3]} := s_j^{[1]} - s_j^{[2]}$ for $j \in J$. Now, Peter makes a partial argument for zero elements that $s^{[3]} = 0$ for $j \in J'$ and one for modular subtraction of elements that $s_j^{[3]} = s_j^{[1]} - s_j^{[2]}$ for $j \in J$, using argument techniques described herein. Thus, Peter makes $h^{[3]}$ where $h^{[3]} := h_M(t^{[3]})$ known to Victor. Victor verifies this argument for inequality of numbers by checking said arguments of knowledge of a pre-image and that $h^{[3]} \neq h_M(0)$. With hardening, described herein, hardened hash values would be used instead, e.g. Peter would also make an argument for the hash value $h_M(0')$, where 0' is a hardening of 0, and Victor would use $h_M(0')$ in place of $h_M(0)$ in verification.

An argument for ordering of numbers, e.g. one secret number being less than another, may be made using an argument for ordering of elements composing numbers, as follows. Let $s^{[1]}$, $s^{[2]}$ be secrets. To argue that $s^{[1]} \geq s^{[2]}$ as numbers in $\mathbb{Z}_{o^m}$, Peter may make an argument for ordering of elements that $s_j^{[1]} \geq s_j^{[2]}$ for $j \in [m]$. Here index m corresponds to the most significant digit of the numbers. To argue that $s^{[1]} > s^{[2]}$ as numbers in $\mathbb{Z}_{o^m}$, Peter may make a similar argument for ordering of elements that $s^{[1]} \geq s^{[2]} + 1$, using techniques for arguments with constant numbers as described herein. To argue that $s^{[1]} \leq s^{[2]}$ (resp. $s^{[1]} < s^{[2]}$) as numbers in $\mathbb{Z}_{o^m}$, Peter may make a similar argument with the roles of $s^{[1]}$, $s^{[2]}$ swapped. Victor verifies each of these arguments for ordering of numbers by checking said argument for ordering of elements. These arguments may be modified to partial ones using techniques described herein applied to elements composing numbers.

A ninth example zero-knowledge hashing argument for constant numbers is described. Peter makes a zero-knowledge hashing argument for constant numbers as follows. Provided problems of finding a pre-image remains hard, arguing that a secret has (public) constant numbers may be done as follows. Let $J \subseteq [m]$ be an element set and let $x_j$ for $j \in J$ be public, such that the numbers to be made public are composed of the elements in J. Let $s^{[1]}$ be a secret where $s_j^{[1]} = x_j$ for $j \in J$. Peter sets $s^{[2]}$ where $s^{[2]} = x_j$ for $j \in J$ and $s_j^{[2]} \in_R \mathbb{Z}_o$ for $j \in [m] \setminus J$ and posts $s^{[2]}$. Peter sets $s^{[3]} := s^{[1]} - s^{[2]}$ mod q, so that $s_j^{[3]} = s_j^{[1]} - s_j^{[2]}$ mod o for $j \in J$ and $s_j^{[3]} = s_j^{[1]} - s_j^{[2]}$ mod q for $j \in [m] \setminus J$, and makes a (partial) argument for subtraction of elements, as described herein, that $s^{[3]}$ is the result of subtracting $s^{[2]}$ from $s^{[1]}$ and a (partial) argument for zero elements, as described herein, that $s_j^{[3]} = 0$ for $j \in J$. Victor verifies this argument for constant numbers by checking said arguments of knowledge of a pre-image. This argument may also be made with subtraction of $s^{[1]}$ from $s^{[2]}$.

A tenth example zero-knowledge hashing argument with negative numbers is described. Peter may make zero-knowledge hashing arguments with negative numbers as follows. First, Peter and Victor agree on a numeral system so that a certain set of positive numbers in $\mathbb{Z}_{o^w}$, where w is the number of elements composing a given number, is interpreted as negative numbers. To obtain simple arguments with negative numbers, a generalization of the two's complement numeral system to modulus o may be used, in which a number $x \in \mathbb{Z}_{o^w}$, $x \geq o^{w-1}$ is interpreted as the negation of the number $y \in \mathbb{Z}_{o^w}$ such that $x + y = 0$ mod $o^w$. A (possibly partial) argument that x is negative may be made by arguing that $x \geq o^{w-1}$ using arguments for comparison of numbers and for constant numbers, described herein; similarly, an argument that a number y is (interpreted as) positive may be made by arguing that $y < o^{w-1}$. An argument that the number y is the (positive) negation of x (argued to be negative) may be argued using an argument for addition for $x+y$ followed by one for comparison to 0 of $x+y$. Other arguments for a relation with x may be made with arguments for a corresponding relation with y, where the connection between the two relation is determined by algebraic rules. In one example, an argument for addition (resp. subtraction) with x may be made using a corresponding argument for subtraction (resp. addition) argument with y. In a second example, an argument for multiplication with numbers in said numeral system may be made using a corresponding argument for multiplication with the corresponding positive numbers followed by an adjustment for the sign, as follows. Let y' be the (positive) output of the latter argument. When both multiplicants of the former argument are argued to be positive or both negative, the output of the former argument is taken to be y' and otherwise it is taken to be x', which is a number argued to be the negative number corresponding to y'. If an argument output expected to be positive (resp. negative) in terms of number theory, e.g. the result of adding or of multiplying two positive numbers (resp. of adding two negative numbers or of multiplying a positive number and a negative number), is argued to be negative (resp. positive) in said numeral system then one may infer that an overflow has occurred in the computation of the output.

An eleventh example zero-knowledge hashing argument for hashing is described. Peter makes a zero-knowledge hashing argument for hashing of elements or numbers as follows. Provided problems of finding a pre-image remain hard, arguing that a secret of size≤m elements hashes to some hash value may be a byproduct of other zero-knowledge hashing arguments described herein. For example, Peter may make an argument for o-ary elements, described herein, for the secret in order to argue that it hashes to some hash value that has been posted. If the size of the secret is >m elements then hashing may be done as follows. The secret s may be split element-wise into small secrets $s^{[k]}$ of size ≤m elements each. An argument for hashing of elements for a secret of size ≤m elements as described is made for each of the small secret, thus posting the hash value $h^{[k]}:=h_M(s^{[k]})$. Finally, the hash value for s may be set to a cryptographic hash of the $h^{[k]}$ values. The cryptographic hash may be any agreed one between the prover and the verifier. For example, an authenticated data structure, such as a Merkle tree, or an incremental hash, such as AdHash and LtHash, may be used for the cryptographic hash; such hashes have the benefit of supporting parallel and distributed evaluation. Standard techniques, such as applying another secure hash to the hash of the authenticated data structure, may be used to strengthen security, e.g. against a length extension attack. Moreover, arguments for hashing may be applied to pieces of a secret or to pieces of each secret corresponding to a node in an authenticated data structure. For example, each secret corresponding to a node in a Merkle tree T of secrets may be split into p pieces, such that n Merkle trees $T'_i$ for $i \in [p]$ may be formed with all nodes corresponding to ith pieces for some $i \in [p]$, and an argument for hashing may be made for each $T'_i$.

Figure 11:
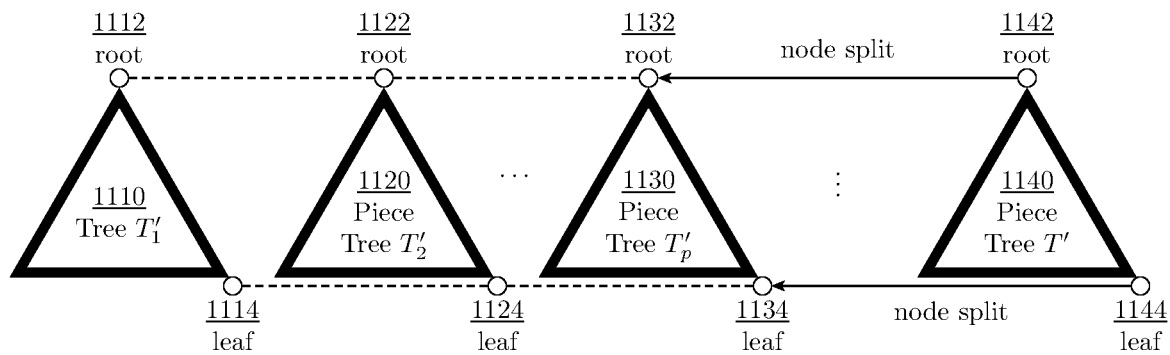
FIG. 11 is a schematic diagram of a system illustrating an example use of the zero-knowledge hashing.

FIG. 11 is a schematic diagram of a system illustrating an example use of zero-knowledge hashing. With respect to the eleventh example zero-knowledge hashing, FIG. 11 shows each Merkle tree 1110-1140 as a triangle, with internal nodes not shown, along with a root node and a leaf node. FIG. 11 illustrates that the root node 1142 of tree 1140 is split into a corresponding root node 1112,1122,1132 in each of the piece trees 1110,1120,1130 and that the leaf node 1144 of tree 1140 is split into a corresponding leaf node 1114,1124,1134 in each of the piece trees 1110,1120,1130. This illustration conveys that each node, including internal nodes, on the tree 1140 is split into a corresponding node in each of the piece trees 1110,1120,1130. This structure of Merkle tree splitting enables arguing about T, e.g. that a specific leaf node in T has a secret hash value h, by making arguments about $T'_i$ for $i \in [p]$, e.g. that each corresponding leaf node in $T'_i$ has hash value $h'_i$ without revealing all $h'_i$. For example, the $h'_i$ values may sum to h, perhaps with carry vectors as described herein, yet nothing may be learned about h by the revealing of only some $h'_i$ values. Such methods may be used in verifiable previewing applications that use an authenticated data structure, such as a Merkle tree, e.g. to commit to the digital good.

A twelfth example zero-knowledge hashing argument for modular exponentiation is described. Peter makes a zero-knowledge hashing argument for modular exponentiation as follows. In an operation for modular exponentiation, let o be the modulus, B be the base, P be the power, b be an upper bound on the bit length of P, and $\{P_u\}_{u=1}^b$ be the (zero-padded) bit representation of P. First, Peter sets $Q_u:=1+(B-1)P_u$ mod o for $u \in [b]$. Next, Peter makes arguments for $\{P_u, Q_u\}_{u=1}^b$, involving arguments for addition and for multiplication of numbers. Finally, Peter sets $R_b:=Q_b$ and (following exponentiation-by-squaring) $R_u:=Q_u R_{u+1}^2$ mod o for $u \in [b-1]$, and makes arguments for $\{R_u\}_{u=1}^b$, involving arguments for multiplication of numbers, to show that $R_0=B^P$. This method may be viewed as a private information retrieval (PIR) one for computing the product $\Pi_{\{u|u \in [b], P_u=1\}} B^u$ mod o using $\{P_u\}_{u=1}^b$ as the selection bits.

A thirteenth example zero-knowledge hashing argument with floating point numbers is described. Peter makes a zero-knowledge hashing argument with (generalized) floating point numbers as follows. Let $F_i:=B^{E_i}M_i$ for any i denote floating point numbers with base B, exponents $E_i$, and mantissas $M_i$. Peter may make arguments with $F_i$ by using a common exponent. For example, a binary operation over $F_1$, $F_2$ where $F_1 \geq F_2$ is described. Peter sets $F_3:=B^{E_3}M_3$ where $E_3:=E_2$, $M_3:=M_1 B^{E_1-E_2}$. Peter argues these relations, which involves arguments for equality, subtraction, multiplication, and modular exponentiation, described herein, so that $F_3=F_1$ may be inferred by a verifier. Now $F_2$, $F_3$ have a common exponent. Peter may make arguments for arithmetic operations over $F_2$, $F_3$ by arguing operations on the mantissas and keeping the exponent, e.g. an addition $F_4:=F_2+F_3$ may be argued as $M_4=M_2+M_3$, $E_4=E_2$. Peter may truncate mantissas, by dropping least significant elements in them, or extend exponents, by zero-padding most significant elements to them, for example, when making arguments with floating point numbers. A signed mantissa may be used, and the sign may be argued using a comparison argument, described herein.

A fourteenth example zero-knowledge hashing argument for packing of elements is described. Peter makes a zero-knowledge hashing argument for packing of elements as follows. Herein, packing means composing an element from multiple elements as its digits, possibly with a varying base (radix). For example, an element in $\mathbb{Z}_{2^{2d}}$ with 2d binary digits may be made by packing 2d elements each in $\mathbb{Z}_2$, or alternatively d elements each in $\mathbb{Z}_{2^2}$, or alternatively a mix of elements each in $\mathbb{Z}_2$ or $\mathbb{Z}_{2^2}$ with a total of 2d bits. By way of example, packing of v elements each in $\mathbb{Z}_o$ into an element in $\mathbb{Z}_{o^v}$ is described. Here, a free index a ranges over [v]. Let $s^{[a]} \in S^m$ and $s^{[\Xi]}:=(\Sigma_{a=1}^v o^{a-1}s_j^{[a]})_{j=1}^m$ be secrets. Peter argues knowledge of pre-images of $h^{[a]}:=h_M(t^{[a]})$, with all $k^{[a]}$ equal, using a method as described above, thus posting $h^{[a]}$. Peter sets $t^{[\Xi]}:=(\Sigma_{a=1}^v o^{a-1}t_j^{[a]})_{j=1}^m$, $h^{[\Xi]}:=h_M(t^{[\Xi]})$ and posts $h^{[\Xi]}$. Now, $s^{[\Xi]}$ is determined by $t^{[\Xi]}$, where $s_j^{[\Xi]}=|_j^{[\Xi]}|$ and $t_j^{[\Xi]}=k_j^{[\Xi]}s_j^{[\Xi]}$, with $k^{[\Xi]}=k^{[a]}$. Hence, $h^{[\Xi]}$ is a hash value for $s^{[\Xi]}$. Victor verifies this argument for packing of elements by checking said arguments of knowledge of a pre-image and that $\Sigma_{a=1}^v o^{a-1} h_i^{[a]}=h_i^{[\Xi]}$ mod q.

This argument may be characterized as follows. For o=2, packing of elements is equivalent to a bit-packing. Given arguments of knowledge of pre-images for $h^{[a]}$ (as inputs to this argument) have already been made, the computational resources demanded by this argument for packing of elements are dominated by 1 argument of knowledge of a pre-image. The communication resources demanded by this argument may be reduced by having Victor recover $r_\pm^{[\Xi]} := \sum_{a=1}^v o^{a-1} r_\pm^{[a]}$ and Peter skip posting $r_\pm^{[\Xi]}$.

This argument may be enhanced as follows. Hashes of the form $h_{r,M}$ and either a fixed base S or a varying base $S_j := \mathbb{Z}_{o_j}$ for corresponding varying moduli $o_j$ may be used similarly. A partial argument and an extended argument may be made in similar ways as well. An argument for unpacking of elements may be made using an argument for packing of elements, where $\bullet^{[\Xi]}$ is on the input side and $\bullet^{[a]}$ are on the output side of the argument; in both packing and unpacking, the same relations in arguing and verifying apply.

A fifteenth example zero-knowledge hashing argument for logical operations on elements is described. Peter makes zero-knowledge hashing arguments for logical operations as follows. An argument for logical-NOT of elements in $\mathbb{Z}_2$ may be made using an argument for subtraction of elements in $\mathbb{Z}_2$ with a minuend 1. For example, to argue that $s_j^{[2]} = \neg s_j^{[1]}$ where o=2 for j∈[m], an argument that $s_j^{[2]} = 1 - s_j^{[1]}$ where o=2 for j∈[m] may be made.

An argument for logical-AND of elements in $\mathbb{Z}_2$ may be made using an argument for addition of elements in $\mathbb{Z}_2$ with a carry 1. For example, to argue that $s_j^{[3]} = s_j^{[1]} \wedge s_j^{[2]}$ where o=2 for j∈[m], an argument that $s_j^{[1]} + s_j^{[2]} - oc_j = s_j^{[3]}$ mod o where o=2, $c_j=1$ (by showing that $h_i^{[1]} + h_i^{[2]} + oy_i = h_i^{[3]}$ mod q as described herein) for j∈[m] may be made.

An argument for logical-AND of elements in $\mathbb{Z}_2$ may also be made using an argument for modular multiplication of elements in $\mathbb{Z}_2$. For example, to argue that $s_j^{[3]} = s_j^{[1]} \wedge s_j^{[2]}$ where o=2 for j∈[m], an argument that $s_j^{[3]} = s_j^{[1]} s_j^{[2]}$ mod o where o=2 for j∈[m] may be made.

An argument for a logical operation may be made using one or more arguments for other logical operations that compose to it per Boolean algebra rules. For example, an argument for logical-NAND may be made composing ones for logical-AND and logical-NOT, and one for logical-NOR may be made by composing ones for logical-OR and logical-NOT. Similarly, an argument for a given Boolean function may be made by composing arguments for logical operations per the logical form of the Boolean function.

Arguments for logical operations on elements in $\mathbb{Z}_{2^w} \subset \mathbb{Z}_q$ may be made using arguments for unpacking, as described herein, each element into w elements in $\mathbb{Z}_2$ and arguments for logical operations on the unpacked elements.

A sixteenth example zero-knowledge hashing argument for comparison of elements is described. Peter makes zero-knowledge hashing arguments for comparison of elements as follows. An argument for equality of elements may be done by choosing and revealing equal parts. This may be done provided problems of finding a pre-image remain hard. In more detail, the argument may be made as follows. Let J⊆[m] be a set of elements where ∀j, j'∈J: $s_j = s_{j'}$. Peter makes an argument of knowledge of a pre-image with the following modification. In each round of the protocol, Peter may choose equal $r_{\pm,j}$ values for the elements and reveal only one value, either $r_{+,j}$ or $r_{-,j}$, for all elements in J, e.g. using a challenge common to all these elements in a round pair. Victor verifies this argument for equality of elements by checking said argument of knowledge of a pre-image and that the revealed $r_0$ or $r_1$ (one of $r_\pm$) has ∀j, j': $r_{\bullet,j} = r_{\bullet,j'}$. The described modification may be applied similarly to an argument involving more than one secret, where the equal elements may be of one or more secrets.

An argument for inequality of elements may be made as follows, provided problems of finding a pre-image remain hard. To argue that at least one element in [m] is unequal between two secrets $s^{[1]}$ and $s^{[2]}$, Peter may post their unequal hash values (resp. hashes) $h^{[1]}$, $h^{[2]}$ where $h^{[1]} := h_M(t^{[1]})$, $h^{[2]} := h_M(t^{[2]})$ (resp. $h^{[1]} := h_M(s^{[1]})$, $h^{[2]} := h_M(s^{[2]})$). Victor verifies this argument for inequality of elements by checking that $h^{[1]} \neq h^{[2]}$. To argue that at least one element in a set J⊆[m] is unequal between $s^{[1]}$ and $s^{[2]}$, Peter may proceed as follows. Peter sets $s^{[3]}$ where $s_j^{[3]}$: 0 for j∈J':=[m]\J and $s_j^{[3]} := s_j^{[1]} - s_j^{[2]}$ for j∈J. Now, Peter makes a partial argument for zero elements, as described heron, that $s^{[3]} = 0$ for j∈J' and a partial argument for modular subtraction of elements, as described herein, that $s^{[3]} = s^{[1]} - s^{[2]}$ for j∈J. Thus, Peter makes $h^{[3]}$ where $h^{[3]} := h_M(t^{[3]})$ known to Victor. Victor verifies this argument for inequality of elements by checking said arguments of knowledge of a pre-image and that $h^{[3]} \neq h_M(0)$. With hardening, described herein, the hardened hash values would be used instead, e.g. Peter would also make an argument for the hash value $h_M(0')$, where 0' is a hardening of 0, and Victor would use $h_M(0')$ in place of $h_M(0)$ in verification.

A seventeenth example zero-knowledge hashing argument for comparison of elements is described. Peter makes zero-knowledge hashing arguments for comparison of numbers as follows. An argument for equality of numbers may be done by choosing and revealing equal parts. This may be done provided problems of finding a pre-image remain hard. In more detail, the argument may be made as follows. Let s, s' be secrets and let K∈[m]. Let J:={$j_1, \ldots, j_K$}, J':={$j'_1, \ldots, j'_K$} be sets where J, J'⊆[m] and ∀k∈[K]: $s_{j_k} = s'_{j'_k}$. Peter makes an argument of knowledge of a pre-image modified as follows. In each round of the protocol, Peter may choose equal $r_{\pm,j_k}$, $r'_{\pm,j'_k}$ values and reveal only one pair, either $r_{+,j_k}$, $r'_{+,j'_k}$ or $r_{-,j_k}$, $r'_{-,j'_k}$, for all k∈K, e.g. using a challenge common to all these elements in a round pair. Victor verifies this argument for equality of numbers by checking said argument of knowledge of a pre-image and that the revealed $r_0$ or $r_1$ (one of $r_\pm$) has ∀k∈[K]: $r_{\bullet,j_k} = r'_{\bullet,j'_k}$.

An argument for inequality of numbers may be made as follows, provided problems of finding a pre-image remain hard. To argue that at least one number whose elements span [m] is unequal between two secrets $s^{[1]}$ and $s^{[2]}$, Peter may post their unequal hash values (resp. hashes) $h^{[1]}$, $h^{[2]}$ where $h^{[1]} := h_M(t^{[1]})$, $h^{[2]} := h_M(t^{[2]})$ (resp. $h^{[1]} := h_M(s^{[1]})$, $h^{[2]} := h_M(s^{[2]})$). Victor verifies this argument for inequality of elements by checking that $h^{[1]} \neq h^{[2]}$. To argue that at least one number in a set of numbers, whose elements span the set J⊆[m], is unequal between $s^{[1]}$ and $s^{[2]}$, Peter may proceed as follows. Peter sets $s^{[3]}$ where $s_j^{[3]} := 0$ for j∈J':=[m]\J and $s_j^{[3]} := s_j^{[1]} - s_j^{[2]}$ for j∈J. Now, Peter makes a partial argument for zero elements, described herein, that $s^{[3]} = 0$ for j∈J' and one for modular subtraction of elements, described herein, that $s_j^{[3]} = s_j^{[1]} - s_j^{[2]}$ for j∈J. Thus, Peter makes $h^{[3]}$ where $h^{[3]} := h_M(t^{[3]})$ known to Victor. Victor verifies this argument for inequality of numbers by checking said arguments of knowledge of a pre-image and that $h^{[3]} \neq h_M(0)$. With hardening, the hardened hash values would be used instead, e.g. Peter would also make an argument for the hash value $h_M(0')$, where 0' is a hardening of 0, and Victor would use $h_M(0')$ in place of $h_M(0)$ in verification.

An eighteenth example zero-knowledge hashing argument for ordering of elements is described. An argument for ordering of elements, such as one element's secret value being less than another's, may be made using an argument for subtraction involving the elements and preserving the sign, as follows. Let $s^{[1]}$, $s^{[2]}$ be secrets. To argue that $s_j^{[1]} \geq s_j^{[2]}$ for $j \in [m]$, Peter sets $s^{[3]} := s^{[1]} - s^{[2]}$ and makes an argument that $s^{[3]} + s^{[2]} = s^{[1]}$ where $k^{[1]} = k^{[2]} = k^{[3]}$; this argument is similar to the one for modular addition of elements described herein without the signed carry vector. To argue that $s_j^{[1]} > s_j^{[2]}$ for $j \in [m]$, Peter makes a similar argument that $s_j^{[1]} \geq s_j^{[2]} + 1$ using arguments with constant elements described herein. To argue that $s_j^{[1]} \leq s_j^{[2]}$ (resp. $s_j^{[1]} < s_j^{[2]}$) for $j \in [m]$, Peter makes a similar argument with the roles of $s^{[1]}$, $s^{[2]}$ swapped. Victor verifies each of these arguments for ordering of elements by checking said argument of knowledge of a pre-image and that $k^{[1]} = k^{[2]} = k^{[3]}$. This argument may be modified to a partial one for a set $J \subseteq [m]$ of elements using techniques for arguments for permutation of elements described herein, e.g. by setting $r_j$ values in $\mathbb{Z}_q$ for $j \in [m] \setminus J$ while continuing to set $r_j$ values in $\mathbb{Z}_o$ for $j \in J$.

An argument for ordering of numbers, e.g. one secret number being less than another, may be made using an argument for ordering of elements composing numbers, as follows. Let $s^{[1]}$, $s^{[2]}$ be secrets. To argue that $s^{[1]} \geq s^{[2]}$ as numbers in $\mathbb{Z}_{o^m}$, Peter may make an argument for ordering of elements that $s_j^{[1]} > s_j^{[2]}$ for $j \in [m]$. Here index m corresponds to the most significant digit of the numbers. To argue that $s^{[1]} > s^{[2]}$ as numbers in $\mathbb{Z}_{o^m}$, Peter may make a similar argument for ordering of elements, described herein, that $S^{[1]} \geq s^{[2]} + 1$. To argue that $s^{[1]} \leq s^{[2]}$ (resp. $s^{[1]} < s^{[2]}$) as numbers in $\mathbb{Z}_{o^m}$, Peter may make a similar argument with the roles of $s^{[1]}$, $s^{[2]}$ swapped. Victor verifies each of these arguments for ordering of numbers by checking said argument for ordering of elements. These arguments may be modified to partial ones using techniques for permutation of elements, described herein, applied to elements composing numbers.

A nineteenth example zero-knowledge hashing argument for constant elements or numbers is described. Peter makes a zero-knowledge hashing argument for constant elements as follows. Provided problems of finding a pre-image remains hard, arguing that a secret has (public) constant elements may be done as follows. Let $J \subseteq [m]$ be an element set and let $x_j$ for $j \in J$ be public. Let $s^{[1]}$ be a secret where $s_j^{[1]} = x_j$ for $j \in J$. Peter sets $s^{[2]}$ where $s^{[2]} = x_j$ for $j \in J$ and $s_j^{[2]} \in_R \mathbb{Z}_o$ for $j \in [m] \setminus J$ and posts $s^{[2]}$. Peter sets $s^{[3]} := s^{[1]} - s^{[2]} \mod q$, so that $s_j^{[3]} = s_j^{[1]} - s_j^{[2]} \mod o$ for $j \in J$ and $s_j^{[3]} = s_j^{[1]} - s_j^{[2]} \mod q$ for $j \in [m] \setminus J$, and makes a (partial) argument for subtraction of elements, described herein, that $s^{[3]}$ is the result of subtracting $s^{[2]}$ from $s^{[1]}$ and a (partial) argument for zero elements, described herein, that $s_j^{[3]} = 0$ for $j \in J$. Victor verifies this argument for constant elements by checking said arguments of knowledge of a pre-image. This argument may also be made with subtraction of $s^{[1]}$ from $s^{[2]}$.

Peter makes a zero-knowledge hashing argument for constant numbers as follows. Provided problems of finding a pre-image remains hard, arguing that a secret has (public) constant numbers may be done as follows. Let $J \subseteq [m]$ be an element set and let $x_j$ for $j \in J$ be public, such that the numbers to be made public are composed of the elements in J. Let $s^{[1]}$ be a secret where $s_j^{[1]} = x_j$ for $j \in J$. Peter sets $s^{[2]}$ where $s^{[2]} = x_j$ for $j \in J$ and $s_j^{[2]} \in_R \mathbb{Z}_o$ for $j \in [m] \setminus J$ and posts $s^{[2]}$. Peter sets $s^{[3]} := s^{[1]} - s^{[2]} \mod q$, so that $s_j^{[3]} = s_j^{[1]} - s_j^{[2]} \mod o$ for $j \in J$ and $s_j^{[3]} = s_j^{[1]} - s_j^{[2]} \mod q$ for $j \in [m] \setminus J$, and makes a (partial) argument for subtraction of elements, described herein, that $s^{[3]}$ is the result of subtracting $s^{[2]}$ from $s^{[1]}$ and a (partial) argument for zero elements, described herein, that $s_j^{[3]} = 0$ for $j \in J$. Victor verifies this argument for constant numbers by checking said arguments of knowledge of a pre-image. This argument may also be made with subtraction of $s^{[1]}$ from $s^{[2]}$.

Methods for making zero-knowledge hashing arguments mixing secret and public elements are described. Given a zero-knowledge hashing argument of knowledge of a pre-image, as described herein, Peter may modify the argument to one for which some elements are public (i.e. no longer secret), provided problems of finding a pre-image remain hard, as follows. If all elements of a given vector are intended to be made public, then in addition to making the (unmodified) argument, Peter may reveal all elements of said vector, and Victor may verify the argument and that said vector hashes to its hash value as obtained from the argument. If only some elements are intended to be made public, Peter may make a (partial) argument for constant elements, described herein, where the constants used are the values of the elements intended to be made public, and Victor verifies the argument as described there.

Hardening of arguments of knowledge of a pre-image is described. Herein, hardening refers to modifications to such arguments that make it harder to mount attacks intended to discover a pre-image without knowing the secrets a-priori. Methods of hardening, salting arguments of knowledge of a pre-image, are described. Herein, salting refers to the use random (non-informative) secret values in addition to non-random (informative) ones. Salting allows making an argument of knowledges of a pre-image significantly more resistant to some forms of attacks. For example, an attack that involves guessing a pre-image for a given hash value would be harder to mount against a salted argument, since an attacker utilizing this form of attack would need to guess not only informative values but also non-informative values that have high entropy. An example way to salt an argument of knowledge of a pre-image is using t elements out of the m available for non-informative values that are drawn with uniform probability from the domain, e.g. for $o=2$, $m=4096$ the choice $t=128$ would correspond to $o^t \equiv 2^{128}$ guesses an attacker may have to make for non-informative elements and to $m-t \equiv 3968$ informative elements that may be used for arguments as described herein. Another example way is a modification of the former one that uses t extra elements instead. Thus, for 4096 informative elements and 128 non-informative ones, m is set to 4224 provided that problems of finding a pre-image remain hard. Yet another example is a hybrid of the former examples, where some elements are available and the rest are extra. Hardening an argument involving a relation between secrets may result in a relation between the non-informative elements of the hardened secrets; however, provided problems of finding a pre-image remain hard this does not significantly help an attacker.

Strength of arguments of knowledge of a pre-image described herein is considered. In case Peter is honest, i.e. follows the protocol of the argument, then the argument is zero-knowledge, i.e. verification of the argument would pass and Victor would not learn anything about the secret pre-image from the protocol beyond what the argument is intended to convey, e.g. the secret's domain S. In this case, Victor may view a false-acceptance probability $2^{-w}$ for w pairs of rounds. In case Peter is not honest, i.e. tries to deviate from the protocol of the argument, Victor may view a false-acceptance probability p as follows. Peter may cheat by being lucky enough to escape from revealing a cheat-element $x \in \mathbb{Z}_q \setminus \mathbb{Z}_o$ in each pair of rounds. The negated case in which $x \in -\mathbb{Z}_q \setminus -\mathbb{Z}_o$ is similar. To this end, Peter selects $x_+$, $x_-$ where $x_+ + x_- = x \mod q$ and at least one of $x_\pm$ is in $\mathbb{Z}_o$. When $o \leq x < 2o-1$ Peter may select $x_\pm \in \{x-o+1, \ldots, o-1\}$ in some pairs of rounds and Victor observes that the values $0, \ldots, x-o$ are missing. When $x \geq 2o-1$ Peter can only select one of $x_\pm$ in $\mathbb{Z}_o$, and in each pair of rounds Victor has probability ½ of observing the other one; Peter may also do this when o≤x<2o−1 and would prefer to minimize p. Hence, the probability of Peter escaping with cheating in one pair of rounds is c:=max(½, (2o−1−x)/o). The minimum number of pairs of rounds w to keep the false-acceptance probability no higher than $2^{-t}$ is at most $\lceil -t/\log_2(c) \rceil$. When o=2 or when x=3o/2−1 it is at most t; the escaping probability decreases quickly as x increases towards 3o/2−1. Hence, a cheating Peter can only increase the escaping probability for a cheat value that is up to 50% higher than the range $\mathbb{Z}_o$ argued for in an argument. Peter may select multiple cheat elements in one of $r_\pm$, yet this does not affect the escaping probability since an $r_\pm$ vector is revealed in full, while Peter would not prefer to select cheat elements in both $r_\pm$ as it only ensures verification would fail upon revealing. For argument composition, the hardness assumption means that a cheater in one argument is virtually forced to cheat in dependent arguments as well. Hence, the false-acceptance probability of the argument decreases quickly with w and the number of arguments transitively dependent on it. A target for the false-acceptance probability may be used to determine the appropriate w to use with a given argument.

Figure 13:
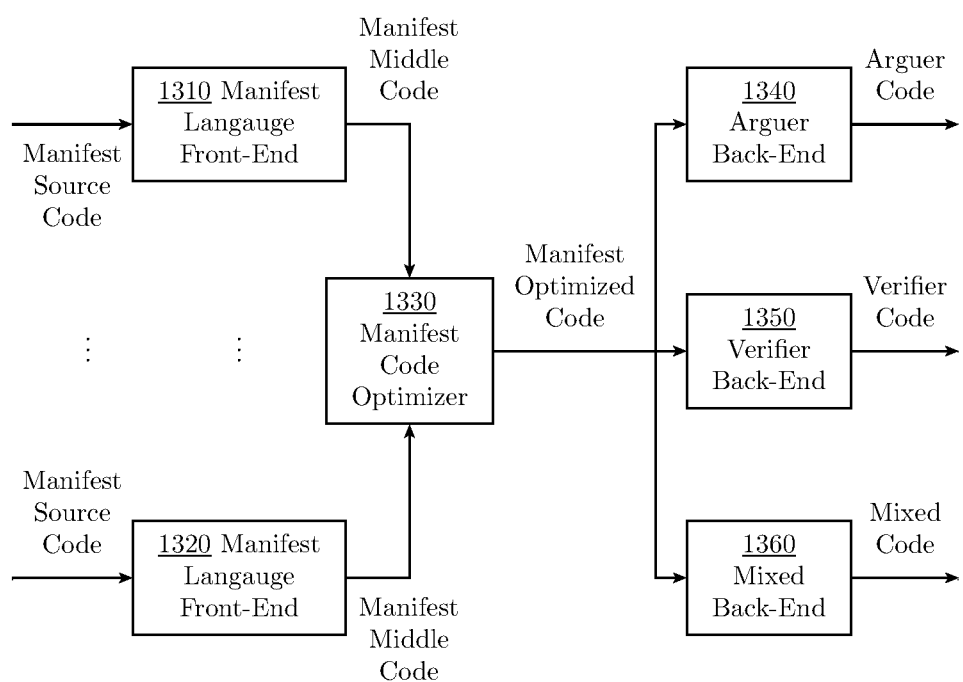
FIG. 13 is a schematic diagram illustrating a fifth example embodiment of the system of FIG. 1A.
Figure 14:
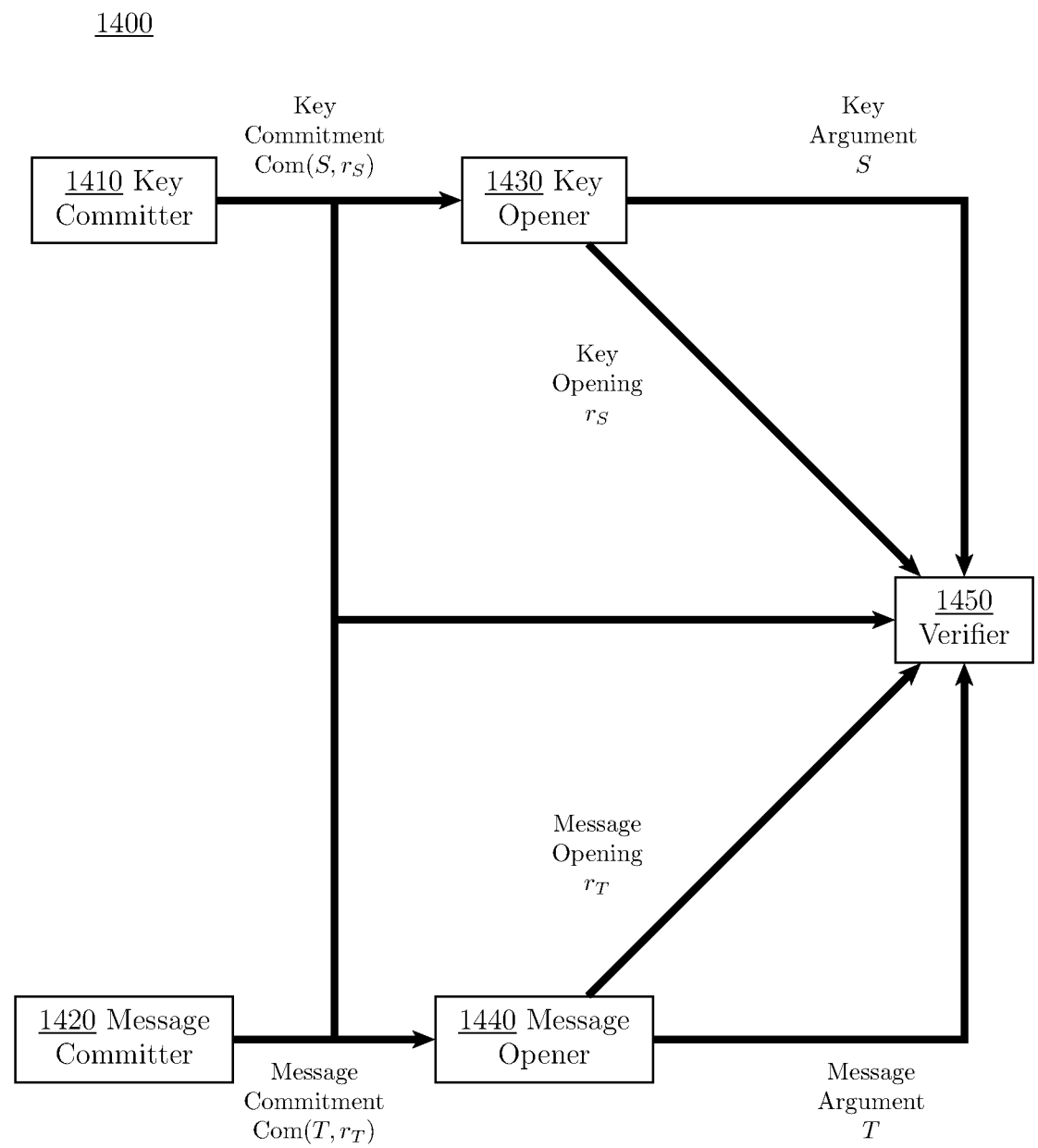
FIG. 14 is a schematic diagram illustrating the use of verifiable communication commitments in the system of FIG. 1A.

The system of FIG. 13 shows an example embodiment of the system of FIG. 1 that involves compilation. In the example, manifest source code may be provided to the manifest language front-ends 1310-1320. The manifest source code represents programs that may be compiled, in part of in full, from various high-level languages into executables with support for selective privacy and verification. The manifest source code may involve selective privacy and verification operations similar to general purpose programming languages such as the C language, e.g. with respect to operations on variables. The various zero-knowledge hashing arguments and techniques described herein, as well as others that would be apparent for one skilled in the art, may be used in implementing such operations. The manifest language front-ends 1310-1320 produce manifest middle code, which may be code in a form amenable for optimization that includes supports for selective privacy and verification. The manifest middle code is provided to the manifest code optimizer 1330 as input. The manifest code optimizer 1330 produces manifest optimized code, which may be in a form amenable for translation to program code with support for selective privacy and verification. Then, the manifest optimized code may be provided as input to any or all of the back-ends 1340-1360. The arguer back-end 1340 may use the manifest optimized code to produce program arguer code that includes support for arguing selective privacy. Such arguer code may be used by a first entity that wishes to avoid exposing secrets yet still allow a third-party entity to verify aspects of its secrets. The verifier back-end 1350 may use the manifest optimized code to produce program verifier code that includes support for selective verification. Such verifier code may be used by an entity that wishes to verify aspects of secrets of the first entity. The mixed back-end 1360 may use the manifest optimized code to produce program mixed code that includes support for selective arguing privacy and selective verification. Such mixed code may be used by entities that wish to play both roles of arguer and verifier.

The compilation process may involve standard techniques as well as techniques specific to arguments described herein. Here, compilation is understood in the wide sense, i.e. including processes performed by the front-ends, optimizer, and back-ends as described. The compilation process may, but is not limited to, use any of the example zero-knowledge hashing techniques described herein. For example, it may compile allocation of program variables by allocating memory for secret values and their parts. It may group variables together by allocating their secret values and their parts in the same vectors. It may rearrange such groups to facilitate SIMD operations by permuting secret values and their parts into vectors to apply a SIMD operation to vector values together. It may employ an argument cost model with code optimization to determine when it is beneficial to apply code transformation involving arguments such as SIMD ones. It may compile a simple expression, such as arithmetic, logical, and bitwise expressions, on program variables by making an argument involving the secret values and parts of these variables. It may compile a compound expression made of simple expressions by compiling arguments for the simple expressions and composing the arguments following the structure of the compound expression. It may compile control flow structures such as if- and loop-statements by compiling a control flow test on the result of a logical expression, which may be compound and involve other sub-expressions, e.g. arithmetic, and conditional branches corresponding to control branches. It may automatically harden arguments and/or determine the number of round pairs sufficient to bound the escape probability at a desirably low level for any argument that is compiled. It may also defer any of the above decisions to a later stage, e.g. to code execution time, by generating or including code for making these decisions.

Various techniques for zero-knowledge hashing argument with secret sharing are described. Secret sharing schemes, possibly verifiable and based on secure linear hashing schemes, may be used with linear zero-knowledge hashing arguments described herein. Such secret sharing schemes enable a dealer party to linearly split a secret into secret shares and distribute them to participant parties such that participants may later (independently from the dealer) collaborate to recover the secret by linearly combining their shares. If the secret sharing scheme used is verifiable then each participant may verify prior to collaboration that its share is valid, i.e. a collaboration would succeed in recovering the secret. An example for such a scheme is a lattice-based one due to Bansarkhani and Meziani. Such secret sharing schemes may be applied to a linear zero-knowledge hashing argument by taking the gestalt secret as the secret to share, the secret parts as the secret shares, and the same secure linear hashing scheme. For example, a zero-knowledge argument for modular addition of numbers, described herein, may be used with a verifiable secret sharing scheme based on secure linear hashing schemes, such that one secret share corresponds to $r_+^{[1]}, r_+^{[2]}, r_+^{[3]}$ and another to $r_-^{[1]}, r_-^{[2]}, r_-^{[3]}$ while the hashes $h^{[1]}, h^{[2]}, h^{[3]}, y$ are public. Then, a verifier may verify that a collaboration between participants who together posses all secret shares would allow them to recover the result of the modular addition.

Techniques for streaming zero-knowledge hashing arguments, e.g. ones described herein, are described. Peter may stream arguments one after the other to Victor, so that each argument may be verified as it received. As a convention of the protocol between Peter and Victor or in information communicated between them, Peter may also indicate to Victor which states, e.g. hashes, need not be kept in order to reduce the amount of memory resources demanded by the protocol. For example, in a stream of arguments of a protocol designed to argue the average of a sequence of numbers, Peter may indicate to Victor that only state on sufficient statistics need be kept, e.g. the running count and sum of the numbers. Moreover, Peter may use multiple channels in streaming to Victor, e.g. in order to parallelize or for using channels with differing characteristics.

Techniques for transforming zero-knowledge hashing arguments are described. A sequence of arguments linear in their inputs may be folded into one argument. The resulting argument would have as input (resp. output) the union of these inputs (resp. outputs) and the relations it holds for the inputs and outputs would remain a linear one, and hence may be argued using similar zero-knowledge hashing techniques. For example, a sequence of three arguments for $t^{[3]}=t^{[1]}+t^{[2]} \mod q$, $t^{[4]}=\gamma t^{[3]} \mod q$, $t^{[5]}=t^{[4]}+a \mod q$, where $\gamma$ is constant scalar and a is a constant vector, may be folded into one argument for $t^{[5]}=\gamma t^{[1]}+\gamma t^{[2]}+a \mod q$. In this case, the relation for the hashes would involve one or more carry vectors multiplied by o, as done in arguments for addition of elements or of numbers, described herein. In the same example, let $c_i \in \mathbb{Z}_2^m$, $y_i:=h_M(c_i) \mod q$ be carry vectors and their hashes for $i \in [u]$ where u is the number of additions in the argument, then the resulting relation for hashes may be $h_M(t^{[5]})=\gamma(h_M(t^{[1]})+h_M(t^{[2]}))+a+o \sum_{i=1}^{u} y_i \mod q$. Further, a number u' of carry vectors in $\mathbb{Z}_2^m$ may be folded into one carry vector in $\mathbb{Z}_{u'+1}^m$ provided problems of finding a pre-image remain hard. In the same example, with one fold for u'=u, let $c:=\sum_{i=1}^{u} c_i$, $y:=h_M(c)$ be the carry vector and its hash, then the resulting relation for hashes may be $h_M(t^{[5]})=\gamma(h_M(t^{[1]})+h_M(t^{[2]}))+a+oy \mod q$.

Arguments in which multiple hashes are posted as commitments (by Peter) may be transformed into ones in which fewer commitments are posted as follows. Peter and Victor agree on a secure hash function H. Let C be the concatenation of all commitments that no other values depend on. After the transformation, the commitments composing C will not be posted. Peter computes C':=H(C) and posts C'. First, Victor reconstructs C from other posts by Peter. This is possible since no other values depends on commitments composing C and in the original arguments Victor is able to verify the commitments and hence compute an expected value for each of them. Victor verifies the transformed arguments as usual and in addition by and checking that C'=H(C).

Any argument other than one for zero elements, e.g an argument for modular multiplication of numbers described herein, may be transformed to a similar partial argument, e.g. a partial argument for modular multiplication of numbers, using an argument for partial equality of elements described herein, as in the following example. Let $s^{[1]}$, $s^{[2]}$, $s^{[3]}$ be secrets, let $\Diamond$ be some binary operation, and let $J \subseteq [m]$ be a set of elements such that $s_j^{[3]}=s_j^{[1]} \Diamond s_j^{[2]}$ for $j \in J$. First, set $s^{[3]}:=s^{[1]} \Diamond s^{[2]}$, then make an argument that $s'_j{}^{[3]}=s_j^{[3]}$ for $j \in J$. Arguments for unary operations and for numbers, for example, may be transformed similarly.

Linear zero-knowledge arguments described herein may be transformed as follows. A linear commitment method may be used to commit to a basis of elements of the vectors that would be revealed in the arguments being transformed. For example, for an argument for zero elements, described herein, the basis would include, or span, the elements of $r_+$, $r_-$ involved in the argument. A commitment with selected openings method, e.g. with a pseudo-random sequence, may be used to reduce the communication demand for the linear commitment by opening only selected values as necessary by the verification protocol described next. A probabilistically checkable proof (PCP) for the relations, or constraints, involved in the verification of the arguments may be used. For example, a Hadamard-code based linear PCP may be used and optionally transformed into a multi-prover interactive proof (MIP), or, e.g. a shorter PCP may be used. For example, constructions such as one due to Ishai, Kushilevitz, and Ostrovsky, the Pepper one improving on in due to Setti, McPherson, Blumberg and Walfish, and one due to Ben-Sasson, Goldreich, Harsha and Sudan may be used. A PCP has the benefit of faster verification than that of each argument separately. For example, a low number of queries to a PCP leads to a low number of selected openings in the described commitment with selected openings.

Zero-knowledge arguments described herein may be transformed by using other argument systems in a similar way. For example, PCPs of proximity, robust or interactive or multi-round PCPs, and hybrids thereof as well as succinct argument systems, such as ones based on quadratic (or square) span (or arithmetic) programs, as well as zero-knowledge from multiparti computation (MPC) may be used.

Homomorphic encryption machineries may also be used to enable the prover (Peter) to produce arguments in the encrypted domain, i.e. where operations on plain values are replaced with ones on values encrypted using some key that may be unknown to the prover, resulting in a verifiable homomorphically encrypted argument system. For example, lattice-based machineries described by Gama, Izabachene, Nguyen and Xie including the number-theoretic and generalized group constructions may be used.

Arguments described herein may also be. This enables transforming selected parts of a computation having a finite set of inputs and outputs to use precompute arguments for them, or a precomputed compound argument for the entire part, or a hybrid of these. For example, memoization may be used to avoid re-computation of (at least some) arguments, or (possibly speculative) prediction may be used to precompute arguments, or selected parts of a computation, before they are required by a computation. For example, one selected part may end with an argument for the (secure) hash of its output while another selected part may start with an argument for the same hash of its input, so that the second parts computation is a continuation of the firsts, yet the parts may be argued in a parallel or distributed fashion. A selected part may also be transformed from arguing how a result is computed to arguing a witness for the correctness of the result, which may be used to reduce the computational resources demanded. For example, a part arguing the computation of the kth highest number out of a group of n numbers may be transformed to an argument showing that said number is indeed the kth highest by making comparison arguments between it and each of the remaining n–1 numbers.

Techniques for extending embodiments are described. This section describes a method for extending embodiments. By way of example, the extension is described for embodiments involving the discrete logarithm problem (DLP), which include all embodiments where a Schnorr-like protocol is used for constructing arguments. A group G of some order o is used in the description. An embodiment where argument S is constructed as a proof of knowledge of x in $y:=g^x$ in one instance may be extended to an embodiment having many instances. A possibly cryptographic, random or pseudo-random number generator R, for which $r_i$ is the ith random number for $i \in \mathbb{N}$, is set up. The number of $r_i$ values may be bounded, e.g. polynomial in a security parameter. The initial instance corresponds to i=0, $x_0=x$, $y_0=y$. In deriving instance i from instance i–1, knowledge of $x_{i-1}$ in $y_{i-1}:=g^{x_{i-1}}$ leads to knowledge of $x_i:=x_{i-1}+r_i \mod o$ in $y_i:=y_{i-1}g^{r_i}$ or alternatively knowledge of $x_i:=x_{i-1}r_i \mod o$ in $y_i:=y_{i-1}{}^{r_i}$. One may also copy, or reuse, $x_i:=x_{i-1}$ in $y_i:=y_{i-1}$. Hence, no communication of $x_i$, $y_i$, $r_i$ is needed to construct the argument of the next instance, and it may be determined using shorter communications (and/or conventions, requiring no communication) for R and the derivation method for each i.

Figure 12:
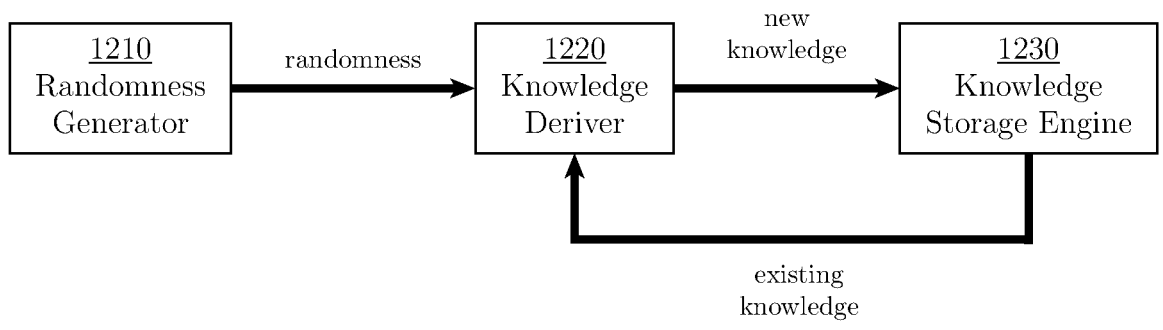
FIG. 12 is a schematic diagram and table diagram illustrating an example of extending embodiments of the system of FIG. 1A.

This construction may be enhanced to apply more widely, as described with respect to FIG. 12. A randomness generator 1210 may be used to obtain random numbers. The knowledge deriver 1220 uses the randomness provided by the randomness generator 1210. The knowledge deriver 1220 also uses existing knowledge provided by the knowledge storage engine 1230. By combining the provided existing knowledge and randomness, the knowledge deriver 1220 may produce new knowledge, which may be placed in the knowledge storage engine 1230, e.g. for future use. FIG. 12 further shows example derivations 1221 for addition 1222, multiplication 1223, subtraction 1224, division 1225, and copying 1226. In general, more than one random number may be used in a single derivation, e.g. addition of two random numbers. Known information that is not random may also be used in addition to random values in order to derive new knowledge.

This construction may be enhanced to apply more widely. One may use more than one random number in a single derivation, e.g. addition of two random numbers. The above sequential structure of instances may be modified to a tree one using a tree-structured random number generator that is split at each node and that is applied a different derivation at each edge. As above, shorter communications (and/or conventions, requiring no communication) may be used to determine the next node to derive from and the derivation from it. One may apply the above to argument T of an embodiment, by observing that an implication of knowledge of $x_{i-1}$ in $y_{i-1}:=g^{x_{i-1}}$ leads to an implication of knowledge of $x_i:=x_{i-1}+r_i$ mod o in $y_i:=y_{i-1}g^{r_i}$ or alternatively of $x_i:=x_{i-1}r_i$ mod o in $y_i:=y_{i-1}^{r_i}$. One may also apply the above, for S or T, with subtraction (resp. division) of $x_{i-1}$ by $r_i$ using negation (resp. reciprocal) of $r_i$ modulo o in an addition (resp. multiplication) derivation. One may also construct G with an unknown order and with a self-bilinear map E: G×G→G. The unknown order is beneficial for security, as the computational Diffie-Helman assumption does not hold for a group with a known order and a self-bilinear map. Now, one cannot find the negation or reciprocal modulo an unknown order, and so cannot derive using subtraction and division. One may still derive using addition and multiplication. One may derive knowledge of $x_i:=x_{i-1}x_0$ in $y_i:=E(y_{i-1}, y_0)$, where $y_0:=E(g^{x_0}, g)$, so that any power of x may be derived. By combining these types of derivation in the tree structure, one may derive polynomials of x in any degree. However, since x values cannot be applied an unknown modulus, they will grow in size fast, imposing practical limitations. The described techniques may also be generalized to embodiments with homomorphic cryptographic primitives other than DLP based ones, by using the homomorphic operations of the primitives for specification of the derivations for extending the embodiments.

A commitment scheme may be combined with verifiable communication to obtain a verifiable communication commitment. With respect to FIG. 14, the key committer 1410 produces the key commitment, which embeds the key argument, while the message committer 1420 produces the commitment message, which embeds the message argument. These key commitment is opened by the key opener 1430 to obtain the key opening and the key argument, while the message commitment is opened by the message opener 1440 to obtain the message opening and the message argument. The verifier 1450 compares the key opening with the key commitment and the message opening with the message commitment, and verifies that the commitments match the opening. The verifier also verifies the key argument and the message argument using available verifiable communication methods.

Several example methods for making verifiable communication commitments are described. A commitment scheme may be combined with verifiable communication to obtain a verifiable communication commitment. In order to convert an argument S (resp. T) into a commitment for S (resp. T), one may make a verifiable argument that opening of the commitment will reveal S (resp. T), or that knowledge of r implies S (resp. T). The opening does not reveal M, which remains secret as in verifiable communication. An interpretation of this construction is as chaining an implication argument from r to the argument S (resp. T). For example, for an argument T, an encoding of a message M such as $Enc(M):=g^M$ mod p may appear with a commitment Com (Enc(M), r) for which one may verify that its opening, by the revealing of r, implies T. The notations Com(S, r), Com(T, r) may be used for a commitment for argument S, T respectively. Pedersen commitment scheme, the message remains secret. Using techniques for modifying embodiments described here and in prior art, this example may be generalized to other methods of verifiable communication based on DLP. As the construction relies on Pedersen commitments, security of existing commitments may be increased when desired by producing new commitments tied to the previous ones, while maintaining computational binding and information hiding properties of Pedersen commitments, using prolongation.

A first example of embodiments with verifiable communication commitments is described. A group G of prime order p of bit length k with a subgroup of prime order o of bit length l, such that o|p−1, and two random generators g, h of the subgroup, such that DLP is hard for g, h and the discrete logarithm of h to base g is unknown, are set up. This establishes the set G.

User A wishing to receive a message from user B first chooses a secret key $d \in_R \mathbb{Z}^*_o$, and a secret $a \in_R \mathbb{Z}^*_o$, and constructs a corresponding public key t where $t:=g^d$ and a commitment t' to it where $t':=th^a$. User A communicates (g, t') openly and communicates a, d securely to user B using a traditional cryptographic communication system. This establishes pk=(g, t') as a public key, sk=d as a secret key and a as a secret of the commitment shared by both user A and user B.

User A produces a commitment to an argument of knowing sk as S. User A chooses $r_1, r_2 \in_R \mathbb{Z}^*_o$, sets $v:=g^{r_1}h^{r_2}$ and posts v. Given a challenge $c' \in C[l]$, user A sets $w_1:=r_1+c'd$ mod o, $w_2:=r_2+c'a$ mod o and posts $w_1, w_2$. The commitment to the argument is verified by checking that $g^{w_1}h^{w_2}=vt'^{c'}$, $g^{w_1}=v't'$ where $v':=v/h^{r_2}$, and may be opened by revealing $r_2$, thereby revealing a as $a=(w_2-r_2)/c'$ mod o and t as $t'/h^a$.

User B wishing to communicate message M to user A produces a commitment to an argument T whereby knowing sk implies knowing M as follows. User B chooses b, $r \in_R \mathbb{Z}^*_o$, sets $t'':=t$, $u:=g^b h^r$, $y:=g^M$, $y':=yh^b$ and communicates t'', u, y'. Given a challenge $c \in C[l]$, user B communicates (s, w) where $s:=b+d+cM$ mod o, $w:=r+cb$ mod o. The commitment to the argument is verified by checking that $g^s h^w=ut''y^c$, $g^s=u't''y^{c'}$ where $u':=u/h^r$, $y:=y'/h^b$ and may be opened by revealing r, thereby also revealing b as $b=(w-r)/c$ mod o. User A recovers M as $(s-b-d)/c$ mod o once b has been revealed. Once the commitments to S, T are opened, one may verify they are related to the same sk by checking that t''=t. In this embodiment, one may view that the opening $r_S$ for argument S is a (resp. and/or $r_2$) and the opening $r_T$ of argument T is b (resp. and/or r).

A second example of embodiments with verifiable communication commitments is described. In this embodiment the commitment for argument T may only be opened if that for argument S was. One way to obtain this is by having the opening of argument S be inferred from that of argument T. G, p, o, g, h are set up similarly. This establishes the set G. User A sets up d, a, t, t' and communicates (g, t') openly and communicates a, d securely to user B similarly. This establishes pk=(g, t') and sk=d, and a as a secret shared by user A and user B. User A produces a commitment to an argument of knowing sk as S similarly, namely by setting up $r_1$, $r_2$, v, $w_1$, $w_2$ and posting v, $w_1$, $w_2$ similarly. The commitment is verified and opened similarly.

User B wishing to communicate message M to user A produces a commitment to an argument T whereby knowing sk implies knowing M as follows. User B chooses b, $r \in_R \mathbb{Z}^*_o$, sets $u:=g^b h^r$, $y:=g^M$, $y':=yh^b$ and communicates u, y'. Given a challenge $c \in C[l]$, user B communicates (s, w) where $s:=b+d+cM$ mod o, $w:=a+r+cb$ mod o. The commitment to the argument is verified by checking that $g^s h^w = ut'y'^c$, $g^s = u't y'^c$ where $u':=u/h^r$, $y:=y'/h^b$ and may be opened by revealing r, thereby also revealing b as $b=(w-a-r)/c$ mod o once a has been revealed (also for argument S). User A recovers M as $(s-b-d)/c$ mod o once b has been revealed. It is verified that S, T are related to the same sk in that the same t is used in their corresponding verifications. In this embodiment, one may view that the opening $r_S$ for argument S is a (resp. and/or $r_2$) and the opening $r_T$ of argument T is a, b (resp. and/or $r_2$, r).

Example methods for zero-knowledge hashing with communication, applicable, for example, to the above described verifiable previewing system, are described herein. Zero-knowledge hashing may be implemented in cryptographic devices, such as cryptographic processors, for example in systems described herein. For example, the Random Value Generator may be implemented in a trusted computing module, the Committer for Secret Bits and the Committer for Hash Values and the Hasher may be implemented in a cryptographic processor, and the Verifier may be implemented in a processing device attached to a monitoring system. An advantage of using zero-knowledge hashing, as described, is a reduced amount of memory, computational, and communication resources needed as compared to traditional methods that involve complex verifiable computing machinery. In more detail, in various examples, a zero-knowledge argument of knowledge of a pre-image of some collision-free hash functions and its verifiable communication are described. Some zero-knowledge argument systems may employ collision-free hashing as a building block and may use these as building blocks. Hash values for secret bits and random values are computed and made public. An argument is made for commitments to the secret bits and random values. An argument for commitments to the hash values of the secret bits and random values is made.

Example methods for zero-knowledge hashing with communication are described. A group G of prime order p of bit length k with a subgroup of prime order o of bit length l, such that o|p−1, and two random generators g, h of the subgroup, such that DLP is hard for g, h and the discrete logarithm of h to base g is unknown, are set up. This establishes the set G. User A wishing to receive a message from user B first chooses a secret key $d \in_R \mathbb{Z}^*_o$, and a secret $a \in_R \mathbb{Z}^*_o$, and constructs a corresponding public key t where $t:=g^d$ and a commitment t' to it where $t':=th^a$. User A communicates (g, t') openly and communicates a, d securely to user B using a traditional cryptographic communication system. This establishes pk=(g, t') as a public key, sk=d as a secret key and a as a secret of the commitment shared by both user A and user B. User A produces a commitment to an argument of knowing sk as S. User A chooses $r_1$, $r_2 \in_R \mathbb{Z}^*_o$, sets $v:=g^{r_1} h^{r_2}$ and posts v. Given a challenge $c' \in C[l]$, user A sets $w_1:=r_1+c'd$ mod o, $w_2:=r_2+c'a$ mod o and posts $w_1$, $w_2$. The commitment to the argument is verified by checking that $g^{w_1} h^{w_2} = vt'^{c'}$, $g^{w_1} = v't^{c'}$ where $v':=v/h^{r_2}$ and may be opened by revealing $r_2$, thereby revealing a as $a=(w_2-r_2)/c'$ mod o and t as $t'/h^a$.

User B wishing to communicate message M to user A produces a commitment to an argument T whereby knowing sk implies knowing M as follows. User B chooses b, $r \in_R \mathbb{Z}^*_o$, sets $t'':=t$, $u:=g^b h^r$, $y:=g^M$, $y':=yh^b$ and communicates t'', u, y'. Given a challenge $c \in C[l]$, user B communicates (s, w) where $s:=b+d+cM$ mod o, $w:=r+cb$ mod o. The commitment to the argument is verified by checking that $g^s h^w = ut''y'^c$, $g^s = u't''y^{c'}$ where $u':=u/h^r$, $y:=y'/h^b$ and may be opened by revealing r, thereby also revealing b as $b=(w-r)/c$ mod o. User A recovers M as $(s-b-d)/c$ mod o once b has been revealed. Once the commitments to S, T are opened, one verifies they are related to the same sk by checking that t''=t. In this embodiment, one may view that the opening $r_S$ for argument S is a (resp. and/or $r_2$) and the opening $r_T$ of argument T is b (resp. and/or r).

An example method for verifiable communication of a pre-image of a hash value of such a function is described as follows. Bob chooses $u \in \mathbb{Z}_q$, sets $v:=g^u$, and posts v. Bob makes an argument S of knowledge of u for v using a well-known method. Bob communicates u securely to Alice using a traditional cryptographic communication system. This establishes sk=u and pk=v. Alice wishing to verifiably communicate the hash value w to Bob first invokes a method for making a zero-knowledge argument of knowledge of the hash value like the one just described. Now, Alice makes an argument T that knowledge of sk implies knowledge of the DL to base g' of $e_j$ or $e_j/g$. This may be done for example using verifiable partial communication, e.g as applied to a Schnorr based method. This argument implies Bob knows $t_j$ and hence also $s_j$, as Bob recovers $s_j$ as 0 (resp. 1) when he knows the DL to base g' of $e_j$ (resp. $e_j/g$).

The described zero-knowledge hashing with communication methods may be generalized to handle a secret $s:=(s_1, s_2, \ldots, s_m) \in \{0, 1, \ldots, k-1\}^m$ with k>2 by using range commitments for $\{s_j\}$ or $\log_2$ k-bits commitments when k is a whole power of 2. They may be further generalized to handle a secret $s:=(s_1, s_2, \ldots, s_m) \in \times_{j-1}^m \{0, 1, \ldots, k_j-1\}$ with $k_j \geq 2$ by using bit-, multiple-bits-, or range-commitments fitting the domains of $\{s_j\}$, or to shifted domains for $\{s_j\}$ by using corresponding shifted commitments, or to set domains for $\{s_j\}$ by using set-membership commitments. They may be implemented using parallelized or distributed computation, e.g. along the i or j indices, and their performance may be improved by computing multiple group-exponentiations concurrently, e.g. by combining pre-computed group-exponentiations to powers of 2 into each desired group-exponentiation.

Embodiments may involve commitments to multiple communications. Example methods for making a commitment to multiple communications are described. Once a commitment to multiple communications is made it may be opened so that all the communications are performed together, as will be elaborated on later. A commitment to multiple communications may be used with the above described system for verifiable previewing. For example, by applying the commitment to the verifiable communication of selected parts, the opening of the commitment performs the communication of all selected parts together. Thus, a large amount of information may be revealed to recipients upon a much smaller communication of an opening. This enables reducing the observed latency of, and the effort involved in, completing the delivery of multiple communications. In some implementations, a large commitment to multiple communications may be set up by advanced communication systems, incorporating devices for the Arguer S and Committer for T components, situated around the world, while the opening may be affected by a much simpler device, such as a handheld terminal or a smartwatch incorporating a Commitment Opener, requiring relatively little resources for the opening.

Commitment to multiple communications involves a single commitment x made for verifiable communication of multiple messages $\{M_i\}$, each to a secret key $sk_i$, for $i \in [k]$, where k is the number of communications involved. An argument S is made for knowledge of $sk_i$ while a commitment with a common opening x is made for verifiable communication of $M_i$, for $i \in [k]$. The opening of the commitment lets a verifier simultaneously verify communication of each message.

Example methods for committing to multiple verifiable communications, possibly with different sending and/or receiving parties, are described. A group G, with a generator g of large prime order o of bit length l, is set up such that DLP is hard in G. This establishes the set G. Let $k \in \mathbb{N}$ where k<<o, and let i range over [k]. Let h be a generator of a group H of order o such that DLP is hard in H. The notations m+h mod o, m−h mod o, mh mod o, m/h mod o and $g^h$, for a message m and $h \in H$, refer to a representation of m in $\mathbb{Z}_o$ and to a representation (or cryptogrphic hash) of h in $\mathbb{Z}_o$. User $A_i$ and user $B_i$ may be different for each i which corresponds to one verifiable communication. User C is to open a commitment to these multiple verifiable communications, as described below.

User C chooses a key $x \in_R H$. User C computes $w := h^x$ and posts w, thus committing to x. User $A_i$ chooses secret $r_i \in_R \mathbb{Z}_o$. User $A_i$ computes $t_i := g^{r_i}$ and posts $t_i$. This establishes $sk_i = r_i$ and $pk_i = t_i$. User $A_i$ produces an argument S of knowing $sk_i$, i.e. knowing $r_i$ for $t_i$, using a known verifiable communication method. User $A_i$ communicates $r_i$ securely to user $B_i$ using a traditional cryptographic communication system. User $B_i$ wishing to commit (on key x) to communicate message $M_i$ to user $A_i$ produces a commitment to an argument T whereby knowing $sk_i$ implies knowing $M_i$ as follows. User $B_i$ computes $y_i := g^{M_i}$ and posts $y_i$. Given a challenge $c_i \in C[l]$, user $B_i$ chooses $b_i \in_R \mathbb{Z}_o$, sets $s_i := r_i + c_i M_i$ mod o, $v_i := h^{b_i}$, $u_i := s_i + w^{b_i}$ mod o, and posts $v_i$, $u_i$. The pair $v_i$, $u_i$ constitutes a variant of ElGamal encryption of $s_i$ using key x. Optionally, user $B_i$ may compute $z_i := g^{w^{b_i}}$ and post $z_i$, allowing a verifier to check that $g^{u_i} = z_i t_i y_i^{c_i}$. User C opens the commitment by revealing x', where x':=x, thereby revealing $s'_i$ as $u_i - v_i^{x'}$ mod o. The opening is verified by checking that $w = h^{x'}$, and the communications are verified by checking that $g^{s'_i} = t_i y_i^{c_i}$ if not already verified via $z_i$ as described above.

An example alternative is described. Let E: $G \times G \to G_T$ be a pairing, for which $\forall a, b \in \mathbb{Z}_o: E(g^a, g^b) = E(g, g)^{ab}$ and E(g, g) generates $G_T$, such that DLP is hard in $G_T$. Modify the above method as follows: in place of $u_i := s_i + w^{b_i}$ mod o use $u_i := s_i w^{b_i}$ mod o, in place of $g^{u_i} = z_i t_i y_i^{c_i}$ use $E(g, g^{u_i}) = E(z_i, t_i y_i^{c_i})$, and in place of $u_i - v_i^{x'}$ mod o use $u_i / v_i^{x'}$ mod o.

These methods may be generalized by using different encryption methods in argument T and a corresponding commitment to a key for such an encryption. A commitment to multiple communications may be configured so that its opening would result in openings of other commitments to multiple communications. Some ways to do so include encrypting the other commitment values $\{x_j\}$ under the same key used for the commitment x, assigning these $\{x_j\}$ values to some (possibly related) messages $\{M_j\}$, and making the opening of x reveal these multiple commitment values.

Example methods for communicating messages related in certain ways are described. A group G, with a generator g of large order o of bit length l, is set up along with a pairing E: $G \times G \to G_T$, for which $\forall a, b \in \mathbb{Z}_o: E(g^a, g^b) = E(g, g)^{ab}$ and E(g, g) generates $G_T$, such that DLP is hard in G, $G_T$. This establishes the set G. Let i range over [l], let j range over $\{0, \ldots, J-1\}$ where $J \in \mathbb{N}$, J<<o, and let $\{a_j\}$ be distinct where $a_j \in \mathbb{Z}_o$. A binary operator $\oplus$ is defined with a group structure on $\mathbb{Z}_o$, with the inverse element of w denoted by −w, along with a set of functions $z_j(w)$ such that $\forall w, w': z_j(w \oplus w') = z_j(w) z_j(w')$. In a first example construction, let $a_j > 1$, $w_1 \oplus w_2 := w_1 + w_2$ mod o, $z_j(w) := a_j^w$ mod o, and the double-DL problem is hard in G. In a second example construction, let $a_j > 0$, e.g. $a_j = j+1$ or $a_j := e^j$ mod o for $e \in \mathbb{Z}_o$, e>1, let $w_1 \oplus w_2 := w_1 w_2$ mod o, $z_j(w) := m^{a_j}$ mod o, and the eth-root of DL problem is hard in G.

User A chooses secrets x, $x_j \in_R \mathbb{Z}_o$, sets s: $g^{x_j}$, $v_j := g^{x z_j(x)}$, and posts $s_j$, $v_j$. In one example alternative, user A may be constrained to choose all $x_j$ to be the same, in which case only one $s_j$ value is posted. In another example alternative, user A may be constrained to choose all $x_j$ as 1, in which case no $s_j$ value is posted. The unconstrained case generalizing these cases is described here. This establishes $sk = \{x, x_j\}$, $pk = \{s_j, v_j\}$. User A communicates x to user B securely using a traditional cryptographic communication system. User A produces an argument S of knowing sk as follows. User A chooses secrets $r_i \in_R \mathbb{Z}_o$, sets $u_{i,j} := g^{z_j(r_i)}$, and posts $u_{i,j}$. Given a challenge $c \in C[l]$, user A posts $t_i$ where $t_i := r_i$ if $c[i] = 0$ or $t_i := r_i \oplus x$ mod o if $c[i] = 1$. The argument is verified by checking that $u_{i,j} = g^{z_j(t_i)}$ if $c[i] = 0$ or $E(u_{i,j}, v_j) = E(s_j, g^{z_j(t_i)})$ if $c[i] = 1$. A simulator given $w_j$, possibly with $w_j = z_j(x)$ for unknown x, may choose c and set $v_j := g^{x_j w_j}$, $t_i := r_i$, and $u_{i,j} := g^{z_j(r_i)}$ if $c[i] = 0$ or $u_{i,j} := g^{w'_j}$ where $w'_j := z_j(r_i)/w_j$ mod o if $c[i] = 1$ to pass verification. When $1/w_j$ mod o is not unique, any reciprocal may be used.

User B wishing to communicate messages $\{z_j(M)\}$ to user A produces an argument T whereby knowing sk implies knowing $\{z_j(M)\}$ as follows. User B first posts $y_j$, where $y_j := g^{z_j(M)}$. User B proves knowledge of M for $y_j$, e.g. using the just said method for argument S. User B posts s where $s := x \oplus M$ mod o. The argument is verified by checking that $E(v_j, y_j) = E(s_j, g^{z_j(s)})$. User A recovers M as $s \oplus -x$ mod o and $\{z_j(M)\}$ from it. A simulator given $m_j$, possibly with $m_j = z_j(M)$ for unknown M, may choose s and set $y_j := g^{m_j}$, $v_j := g^{x_j w_j}$ with $w_j := z_j(s)/m_j$ mod o, where $w_j$ may be given to the above simulator, to pass verification.

Example embodiments involving techniques for verifiable oblivious communication are described. These techniques enable a wider range of systems for verifiable previewing, digital goods and information compensation. As elaborated on below, verifiable oblivious communications may be used to implement a complex computation of an encyphered preview from a digital good while enabling verification and recovery. This preview computation may be used in verifiable previewing instead of the preview process for obtaining a selection of parts. An verifiable oblivious communication results in the verifiable communication of a message in a way that is only partially controlled by the sending party. Methods for verifiable oblivious communication are described below in general and later in specific embodiments for certain cryptosystems.

Example methods for verifiable oblivious communication described below may be used for communicating 1-out-of-2 messages given to the sending party. This is analogous to 1-out-of-2 oblivious transfer, where Alice chooses two messages and Bob gets to choose which one to receive yet Bob does not receive the other message and Alice does not learn which one of the messages Bob received. However, in verifiable oblivious communication the same message chosen by Bob is also communicated to Charlie, and this may be verified without learning which of the two messages was communicated. Hence, verifiable oblivious communication may be viewed as an enhancement of oblivious transfer, inheriting many of its properties. The methods may be generalized to k-out-of-n verifiable oblivious communication by generalizing 1-out-of-2 oblivious transfer to k-out-of-n oblivious transfer and utilizing said analogy. The methods may also be generalized by extending verifiable oblivious communication, i.e. implementing a large number of verifiable oblivious communications using a small number of verifiable oblivious communications, by extending oblivious transfer and utilizing said analogy. The methods may be further generalized to secure-multiparty-computation, where information learned by a party for any computation step may be verifiably communicated to another party, by basing secure-multiparty-computation on 1out-of-2 oblivious transfer and utilizing said analogy. 1-out-of-2 oblivious transfer is a complete primitive for secure-multiparty-computation. Similarly, 1-out-of-2 verifiable oblivious communication is a complete primitive for verifiable communication of secure-multiparty-computation.

Techniques for verifiable oblivious communication may be implemented in cryptographic devices, such as trusted computing modules, for example in systems as described herein. An advantage of using verifiable oblivious communication in such systems is the reduced computational and communication resources needed for delivering results of a complex computation from one device to multiple other devices concurrently compared to those that would be required by serial repetition.

Figure 18:
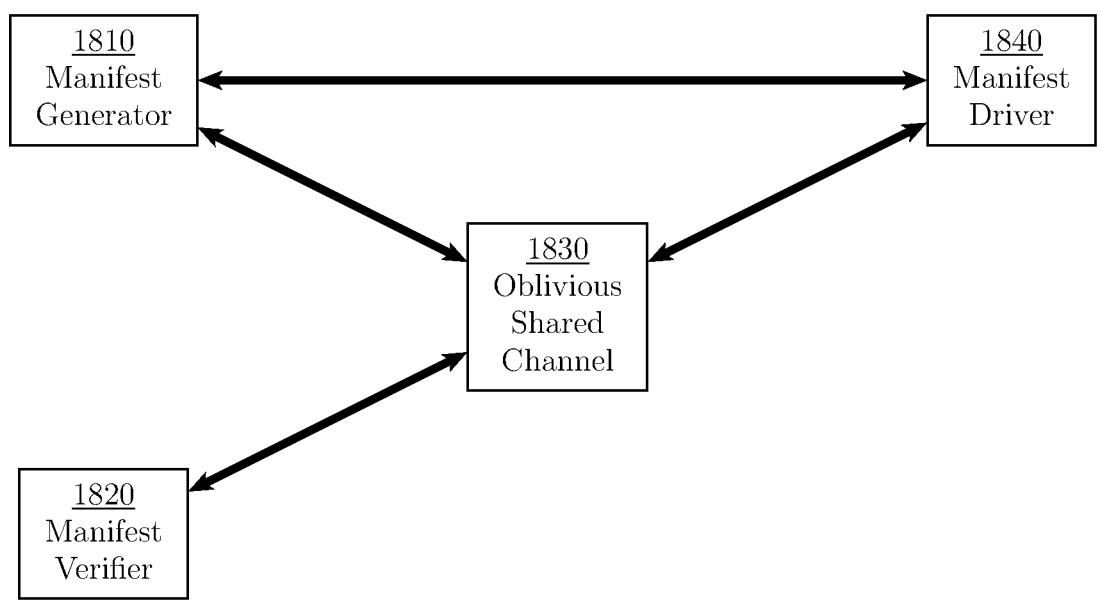
FIG. 18 is a schematic diagram of a system illustrating a fifth example embodiment of the system of FIG. 1A, incorporating oblivious verifiable oblivious communication.

Verifiable oblivious communication embodiments are described with respect to FIG. 18 in comparison to FIG. 1A. The manifest generator 1810, which corresponds to the manifest generator 140, is used to produce a manifest. The manifest driver 1840, which corresponds to the manifest driver 160, is used to drive the production of the manifest. The manifest verifier 1820, which corresponds to the manifest verifier 180, is used to verify the manifest. The oblivious shared channel 1830 provides access to the manifest while enabling the verification of the oblivious communication.

A first example method for 1-out-of-2 verifiable oblivious communication for Paillier cryptosystem is described. The method may be viewed as involving a 1-out-of-2 oblivious transfer with Paillier cryptosystem and verifiable communication of related messages, described herein. Let p, q be large primes having $\gcd(pq, (p-1)(q-1))=1$, assured when p, q are of equal bit length. Let $n:=pq$, $\lambda:=\text{lcm}(p-1, q-1)$. Let g' be as $g' \in_R \mathbb{Z}^*_{n^2}$ until $\mu:=(L(g'^\lambda \mod n^2))^{-1} \mod n$ exists, where $$L(u) := \frac{u-1}{n}.$$

Here, a/b is the quotient, i.e. $\max_{v \in \mathbb{N}} a \geq vb$. If p, q are of equal bit length, simpler is setting $g':=n+1$, $\lambda:=\phi(n)$, $\mu:=\phi(n)^{-1}$ where $\phi(n):=(p-1)(q-1)$. Let n, g' be public and $\lambda$, $\mu$ be known to Alice. Let g be a generator of an order-$n^2$ group G where the double-DL problem is hard. Let $h(\bullet)$ be a cryptographic hash function.

Alice sets up secrets $m_i \in \mathbb{Z}_n$ and posts commitments $h_i:=h(m_i)$ for them. Alice chooses $x_i \in_R \mathbb{Z}_n$ and posts them. Bob chooses secrets $b \in_R \{0, 1\}$, $k \in_R \mathbb{Z}_n$, $r \in_R \mathbb{Z}^*_n$ (r may be set to 1). Bob sets $v:=x_b+g'^k r^n \mod n^2$ and posts v. The term $g'^k r^n \mod n^2$ of v constitutes a Paillier encryption of k. Bob makes an argument of knowledge of double-DL to bases g', g for $(v-x_0)/r^n$ or $(v-x_1)/r^n$, e.g. using a first construction of verifiable communication of related messages, where $J:=1$ and $a_0:=g'$, and where $x_j$ are constrained to be the same value $r^n$, as follows. Given a challenge $c \in C[1]$, Bob chooses $z \in_R \mathbb{Z}_n$ and sets $c_{1-b}:=z$, $c_b:=c \oplus c_{1-b}$. Not knowing any of p, q, $\lambda$, $\mu$, Bob cannot find k' such that $v=x_{1-b}+g'^{k'} r^n \mod n^2$, solved by $k'=L((v-x_{1-b})^\lambda \mod n^2)\mu \mod n$. Bob verifiably communicates to Charlie k in $v-x_b$ using a challenge $c_b$ and simulates verifiable communication to Charlie of k' in $v-x_{1-b}$ using a simulated challenge $c_{1-b}$. With this, as described herein, one can verify that Bob and Charlie know the same k, b which remain unknown to Alice. Alice computes $k_i:=L((v-x_i)^\lambda \mod n^2)\mu \mod n$, sets $m'_i:=m_i+k_i \mod n$, and posts $m'_i$. Bob and Charlie recover $k_b$ as k and $m_b$ as $m'_b-k_b \mod n$, and verify that $h(m_b)=h_b$. If this verification passes, Bob and/or Charlie post a message (e.g. "OK") indicating acceptance; otherwise, Bob and/or Charlie post k, r to allow a verifier to find $b \in \{0, 1\}$ such that $v=x_b+g'^k r^n \mod n^2$, recover $k_b$ and $m_b$ similarly, and see that $h(m_b) \neq h_b$. This method may be generalized to use other encryption methods based on hardness of a DLP.

A second example method for 1-out-of-2 verifiable oblivious communication for RSA cryptosystem is described. The method may be viewed as involving a 1-out-of-2 oblivious transfer with RSA cryptosystem and verifiable communication of related messages, described herein. Let g be a generator of a group G of order n such that DLP is hard in G and $n:=pq$, $o:=(p-1)(q-1)$ for p, q large safe primes of similar bit length. Let d, e be a RSA key pair with d verifiably known to Alice and let e, n, g, G be public. Let i range over $\{0, 1\}$. Let $h(\bullet)$ be a cryptographic hash function.

Alice sets up secrets $m_i \in \mathbb{Z}_n$ and posts commitments $h_i:=h(m_i)$ for them. Alice chooses $x_i \in_R \mathbb{Z}_n$ and posts them. Bob chooses secrets $b \in_R \{0, 1\}$, $k \in_R \mathbb{Z}_n$. Bob computes $v:=x_b+k^e \mod n$ and posts v. The term $k^e \mod n$ appearing in v constitutes an RSA encryption of k. Bob makes an argument of knowledge of eth-root of DL to base g, e.g. using a second construction of verifiable communication of related messages, where $J:=1$ and $a_0:=e$, and where $x_j$ is constrained to be 1, as follows. Given a challenge $c \in C[1]$, Bob chooses $z \in_R \mathbb{Z}_n$ and sets $c_{1-b}:=z$, $c_b:=c \oplus c_{1-b}$. Not knowing any of p, q, d, o, Bob cannot find k' such that $v=x_{1-b}+k'^e \mod n$, solved by $k'=(v-x_{1-b})^d \mod n$. Bob verifiably communicates to Charlie k in $v-x_b$ using a challenge $c_b$ and simulates verifiable communication to Charlie of k' in $v-x_{1-b}$ using a simulated challenge $c_{1-b}$. With this, as discussed herein, one may verify that Bob and Charlie know the same k, b which remain unknown to Alice. Alice computes $k_i:=(v-x_i)^d \mod n$, sets $m'_i:=m+k_i \mod n$, and posts $m'_i$. Bob and Charlie recover $k_b$ as k and $m_b$ as $m'_b-k_b \mod n$, and verify that $h(m_b)=h_b$. If this verification passes, Bob and/or Charlie post a message (e.g. "OK") indicating acceptance; otherwise, Bob and/or Charlie post k to allow a verifier to find $b \in \{0, 1\}$ such that $v=x_b+k^e \mod n$, recover $k_b$ and $m_b$ similarly, and see that $h(m_b) \neq h_b$. This method may be generalized to use other encryption methods based on hardness of an eth-root problem.

Figure 15:
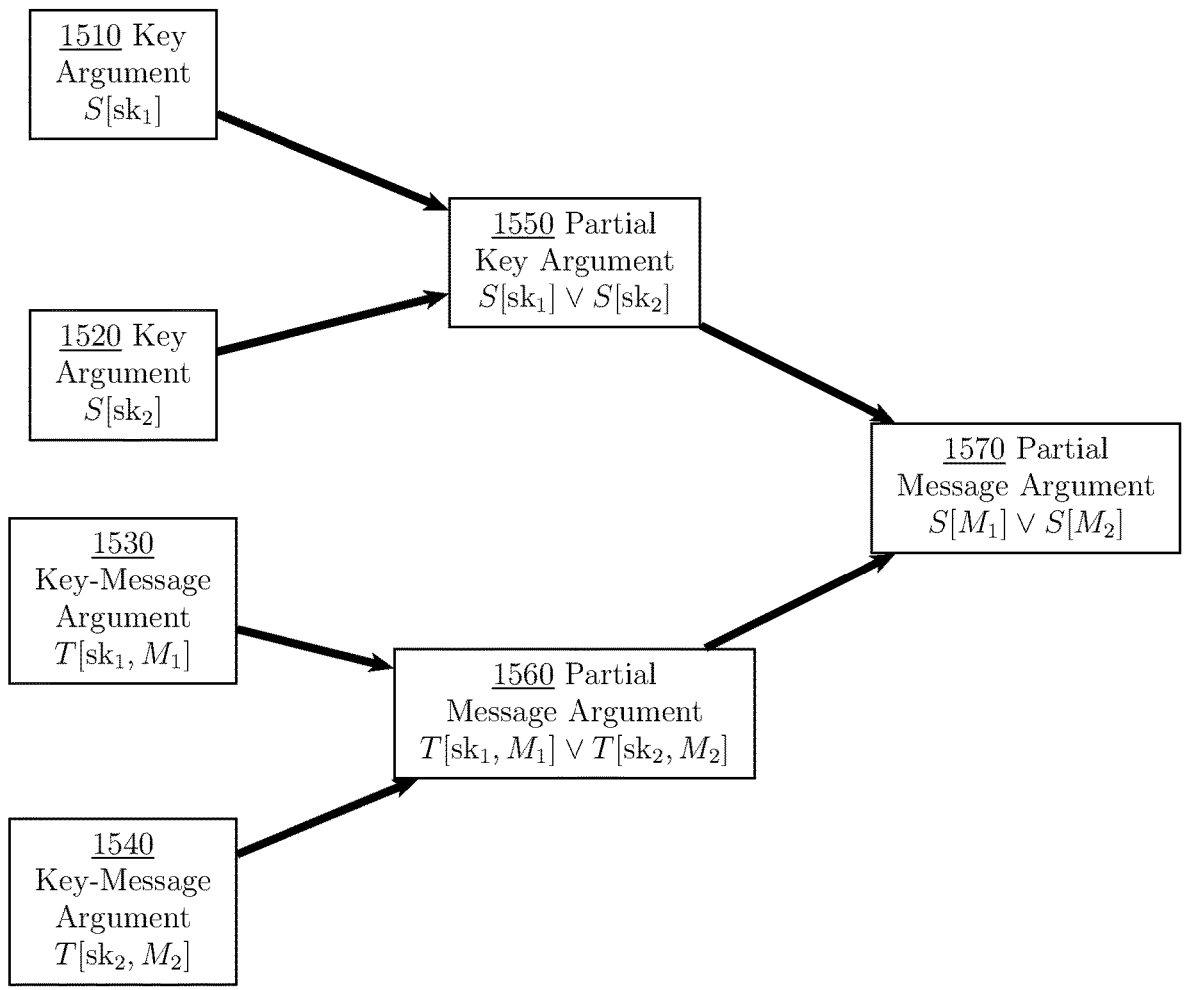
FIG. 15 is a schematic diagram illustrating the use of partial verifiable partial communication in the system of FIG. 1A.

Arguments of partial knowledge may be used in verifiable communication methods to obtain verifiable partial communication. FIG. 15 is a schematic diagram illustrating the use of verifiable partial communication in the system of FIG. 1A. The key argument 1510 and the key argument 1520 are combined using a logical disjunction operation, as will be described, to obtain the partial key argument 1550. Then, the key-message argument 1530 and the key-message argument 1540 are combined using a logical disjunction operation, as will be described, to obtain the partial key-message argument 1560. Finally, the partial key argument 1550 and the key-message argument 1560 are combined to obtain the partial message argument 1570. Thus, there is only partial knowledge with respect to the communication.

Example methods for verifiable partial communication are described. Arguments of partial knowledge may be used to convince that an unspecified part of a specified knowledge set (i.e. along with any deducible knowledge) is known, e.g. one-out-of-two pieces of knowledge. An argument may be constructed using a sigma-protocol for each piece of knowledge along with an argument that (only) some of the challenges are fake, i.e. chosen by the arguer rather than unpredictable to it. In verifiable partial communication, one may convince that an unspecified part of a specified message set has been communicated, e.g. one-out-of-two messages. One may generalize from one-out-of-two messages to k-out-of-n messages using standard techniques, such as combining multiple one-out-of-two constructions. In the example of FIG. 15, S[x] stands for an argument of knowledge of x, and T[x, y] stands for an argument whereby knowledge of x implies knowledge of y, and V stands for logical disjunction. Well-known arguments of partial knowledge involving logical disjunction, conjunction and negation (yielding non-monotone formulae) may be used to obtain methods of verifiable partial communication with these logical operations in a similar way.

Further, examples embodiments of verifiable partial communication may be constructed by combining arguments of partial knowledge and verifiable communication. In these embodiments, argument S is an argument of partial knowledge of sk and argument T is an argument that partial knowledge of sk implies partial knowledge of M. The embodiments use one-of-two arguments of partial knowledge and may be generalized by similarly using k-of-n arguments of partial knowledge, which are well-known. They use some DLP-based method of verifiable communication and may be generalized by using other DLP-based methods and sigma-protocols for them.

A first example of embodiments with verifiable partial communication is described. In this embodiment, user B verifiably partially communicates one-of-two messages in its control to user A using one-of-two arguments of partial knowledge. A group G, with generator g of prime order o of bit length l, where DLP is hard, is set up. This establishes the set G. A random element $z \in_R G$, whose discrete logarithm to base g is not known to communicating and observing parties, is also set up. Here a is used as an index running over $\{0, 1\}$.

User A wishing to receive a message from user B first chooses a secret key $d \in_R Z_o^*$ with a corresponding public key $t_1 := g^d$, and values $w_0 \in_R Z_o^*$, $c'_0 \in C[l]$, $i \in_R \{0, 1\}$. User A sets $t_0 := z/g^d$, $v_0 := g^{w_0}/t_0^{c'_0}$, $j := 1-i$. User A communicates (g, $t_i$, $t_j$) openly and d securely to user B using a traditional cryptographic communication system. This establishes pk= (g, $t_i$, $t_j$) as a public key, and sk=d as a secret key shared by both user A and user B. User B can distinguish $t_1$ from $t_0$, by checking $t_1 = g^d$, and determine i, j while observers not knowing d cannot do so. User A produces an argument of partially knowing sk as S. User A chooses $r_1 \in_R Z_o^*$, sets $v_a := g^{r_a}$, and communicates ($v_i$, $v_j$). Given a challenge $c' \in C[l]$, user A sets $c'_1 := c' \oplus c'_0$, $w_a := r_a + c'_a d \mod o$, and communicates ($c'_i$, $c'_j$, $w_i$, $w_j$). The argument is verified by checking that $c' = c'_i \oplus c'_j$, $t_i t_j = z$, $g^{w_a} = v_a t_a^{c'_a}$.

User B wishing to partially communicate message M to user A produces an argument T whereby partially knowing sk implies partially knowing M as follows. User B chooses $c_0 \in C[l]$, $u \in_R Z_o^*$, sets $y_0 := g^u t_0^{-1/c_0 \mod o}$, $y_1 := g^M$ and communicates ($y_i$, $y_j$). Given a challenge $c \in C[l]$, user B sets $c_1 := c \oplus c_0$, $s_0 := u c_0 \mod o$, $s_1 := d + c_1 M \mod o$ and communicates ($c_i$, $c_j$, $s_i$, $s_j$). The argument is verified by checking that $c = c_i \oplus c_j$, $g^{s_a} = t_a y_a^{c_a}$. User A recovers M as $(s_1-d)/c_1 \mod o$. Since $c_j$ (resp. $c'_j$ or $t_j$) can be determined from $c_i$ (resp. $c'_i$ or $t_i$), one may improve verifiable partial communication protocols such as this one by communicating $c_i$ (resp. $c'_i$ or $t_i$) instead of $c_i$, $c_j$ (resp. $c'_i$, $c'_j$ or $t_i$, $t_j$).

A second example of embodiments with verifiable partial communication is described. In this embodiment, user B verifiably partially communicates one of two messages, only one of which is under its control, to user A using one-of-two arguments of partial knowledge. A group G, with generator g of prime order o of bit length l, where DLP is hard, is set up. This establishes the set G. An element $z \in G$, whose discrete logarithm to base g is not known to communicating and observing parties and corresponds to an unknown message $M' \in Z_o^*$ where $g^{M'} = z$, is given to user B. Here a is used as an index running over $\{0, 1\}$.

User B wishing to partially communicate message M or M' to user A produces an argument T whereby partially knowing sk implies partially knowing M or M' as follows. User B chooses $c_0 \in_R C[l]$, $s_0 \in_R Z_o^*$, sets $y_0 := z$, $y_1 := g^M$, $t_0 := g^{s_0}/y_0^{c_0}$, and communicates $t_0$ securely to user A using a traditional cryptographic communication system. User A wishing to receive a message from user B first chooses a secret key $d \in_R Z_o^*$ with a corresponding public key $t_1 := g^d$, and values $w_0 \in_R Z_o^*$, $c'_0 \in C[l]$, $i \in_R \{0, 1\}$. User A sets $j := 1-i$, $v_0 := g^{w_0}/t_0^{c'_0}$. User A communicates (g, $t_i$, $t_j$) openly and d securely to user B using a traditional cryptographic communication system. This establishes pk=(g, $t_i$, $t_j$) as a public key, and sk=d as a secret key shared by both user A and user B. User B can distinguish $t_1$ from $t_0$, by checking $t_1 = g^d$, and determine i, j while observers not knowing d cannot do so. User A produces an argument of partially knowing sk as S. User A chooses $r_1 \in_R Z_o^*$, sets $v_1 := g^{r_1}$, and communicates ($v_i$, $v_j$). Given a challenge $c' \in C[l]$, user A sets $c'_1 := c' \oplus c'_0$, $w_1 := r_1 + c'_1 d \mod o$, and communicates ($c'_i$, $c'_j$, $w_i$, $w_j$). The argument is verified by checking that $c' = c'_i \oplus c'_j$, $g^{w_a} = v_a t_a^{c'_a}$.

User B communicates ($y_i$, $y_j$) openly. Given a challenge $c \in C[l]$, user B sets $c_1 := c \oplus c_0$, $s_1 := d + c_1 M \mod o$ and communicates ($c_i$, $c_j$, $s_i$, $s_j$). The argument is verified by checking that $c = c_i \oplus c_j$, $g^{s_a} = t_a y_a^{c_a}$. User A recovers M as $(s_1-d)/c_1 \mod o$. Since $c_j$ (resp. $c'_j$) can be determined from $c_i$ (resp. $c'_i$), one may improve verifiable partial communication protocols such as this one by communicating $c_i$ (resp. $c'_i$) instead of $c_i$, $c_j$ (resp. $c'_i$, $c'_j$). z may be given by some party and/or an upfront commitment to z may be given to that party, so that the party may verify that $z = y_0$ and/or that the commitment opens to z. Other upfront commitments, such as to $c_0$, $s_0$ by user B, may also be used.

A first example of embodiments with verifiable communication is described. This example embodiment uses a Schnorr-like protocol for constructing T and an ElGamal-signature-like protocol for constructing S. User A wishing to receive a message from user B first constructs a group G, with generator g of prime order o of bit length l, where DLP is hard, a secret key $d \in_R Z_o^*$, and a corresponding public key $t=g^d$. In other embodiments, G may be well-known or given by others. Both a multiplicative group and an elliptic curve group are applicable here. The multiplicative group modulo p for prime p has a known order $o=p-1$. For an elliptic curve group, Schoof showed a polynomial time algorithm, later improved by Elkies and Atkin and analyzed by Dewaghe, for determining the group's order o given its parameters.

User A communicates (g, t) openly and communicates d securely to user B using a traditional cryptographic communication system. This establishes pk=(g, t) as a public key, sk=d as a secret key shared by both user A and user B, and the set G. User A produces an argument of knowing sk as a signature S of Q as follows. Alternatively, one may produce S based on Schnorr as follows. User A produces an argument of knowing sk as S. User A chooses $r \in_R \mathbb{Z}^*_o$, sets $v=g^r$, and communicates v. Given a challenge $c' \in C[l]$, user A communicates $w=r+c'd \mod o$. The argument is verified by checking that $g^w=vt^{c'}$. Let $H(\bullet)$ be a cryptographic hash function that is publicly known. User A chooses $j' \in_R \mathbb{Z}^*_o$ having $\gcd(j, o)=1$, sets $r=g^{j'}$, and computes $q=(H(Q)-dr)/j' \mod o$; this step is repeated until $q \neq 0$. Herein, when an $x \in G$ appears in the exponent, it may be converted to $x \in \mathbb{Z}^*_o$ using a function $G \rightarrow \mathbb{Z}^*_o$ with unpredictable image. A public cryptographic hash function on a binary form of x may be used. User A communicates r, q openly. The argument is verified by checking that $g^{H(Q)}=t^r r^q$. User B wishing to communicate message M to user A produces an argument T whereby knowing sk implies knowing M as follows. Given a challenge $c \in C[l]$, user B communicates (y, s) where $y=g^M$, $s=d+cM \mod o$. The argument is verified by checking that $g^s=ty^c$. User A recovers M as $(s-d)/c \mod o$.

A second example of embodiments with verifiable communication is described. This example embodiment is a modification of the first example of embodiments with verifiable communication where user A construct G, g, d once and reuses them in the communication of multiple messages, while cryptographic security remains similar. This is done using a blinding-like technique, as described below. This technique applies to other embodiments where ElGamal is used for S.

User A sets up G, g, d, t, o similarly. In addition, user A randomly chooses $j \in_R \mathbb{Z}^*_o$ and communicates k, where $k=d+j \mod o$, securely to user B using a traditional cryptographic communication system, and communicates u where $u=g^j$ openly. This establishes pk=(g, t, u) as a public key and sk=k as a secret key shared by both user A and user B, and the set G. User A produces an argument of knowing sk as a signature S of Q as follows. Alternatively, one may produce S based on Schnorr as follows. User A produces an argument of knowing sk as S. User A chooses $r \in_R \mathbb{Z}^*_o$, sets $v=g^r$, and communicates v. Given a challenge $c' \in C[l]$, user A communicates $w=r+c'k \mod o$. The argument is verified by checking that $g^w=v(ut)^{c'}$. Let $H(\bullet)$ be a cryptographic hash function that is publicly known. User A chooses $j' \in_R \mathbb{Z}^*_o$, having $\gcd(j', o)=1$, sets $r=g^{j'}$, and computes $q=(H(Q)-kr)/j' \mod o$; this step is repeated until $q \neq 0$. User A communicates r, q openly. The argument is verified by checking that $g^{H(Q)}=(tu)^r r^q$. User A produces an argument of knowing sk as a signature S of Q similarly, with k replacing d. User B wishing to communicate message M to user A produces an argument T whereby knowing sk implies knowing M as follows. Given a challenge $c \in C[l]$, user B communicates (y, s) where $y=g^M$, $s=k+cM \mod o$. The argument is verified by checking that $g^s=tuy^c$. User A recovers M as $(s-k)/c \mod o$.

A third example of embodiments with verifiable communication is described. This example embodiment is a modification of the first example of embodiments with verifiable communication where user B is the one producing S using user A's secret key, as if it is delegated. This technique applies to other embodiments where user A and user B share sk. User A sets up G, g, d, t, o similarly. User A communicates (g, t) openly and communicates d securely to user B similarly, establishing pk=(g, t), sk=d, and G similarly. User B produces an argument of knowing sk as a signature S of Q similarly. User B wishing to communicate message M to user A produces an argument T similarly. User A recovers M similarly.

A fourth example of embodiments with verifiable communication is described. This example embodiment is a modification of the second example of embodiments with verifiable communication where user B is the one producing S using user A's secret key, as if it is delegated. This technique applies to other embodiments where user A and user B share sk. It demonstrates that techniques described here may be used together. Here we demonstrate this for multiple combination of techniques. User A sets up G, g, d, t, o, j, u, k similarly. User A communicates (g, t, u) openly and communicates k securely to user B similarly, establishing pk=(g, t, u), sk=k, and G similarly. User B produces an argument of knowing sk as a signature S of Q similarly. User B wishing to communicate message M to user A produces an argument T similarly. User A recovers M similarly.

A fifth example of embodiments with verifiable communication is described. This example embodiment is a modification of the third example of embodiments with verifiable communication where user A constructs additional k secret parameters. This technique applies to other embodiments employing the discrete logarithm problem. From both security and practical points of view, k would be much smaller than o.

Here, formulas with a free subscript i apply for all $i \in \{1, \ldots, k\}$. User A sets up G, g, d, t, o similarly. In addition, user A randomly chooses $m_i \in_R \mathbb{Z}^*_o$ and computes $y_i=g^{m_i}$. User A communicates $(g, t, y_i)$ openly and communicates $(d, m_i)$ securely to user B similarly, establishing pk=(g, t, $y_i$), sk=(d, $m_i$), and G similarly. User A produces an argument S of knowing sk using signatures of Q as follows. Given challenges $c_i \in C[l]$, user A communicates $s_i$ where $s_i=d+c_i m_i \mod o$. Let $(\bullet)$ be a cryptographic hash function that is publicly known. User A chooses j, $j' \in_R \mathbb{Z}^*_o$ having $\gcd(j, o)=1$, $\gcd(j', o)=1$, sets $r=g^{j'}$, $r_i=g^{j'_i}$, and computes $q=(H(Q)-dr)/j' \mod o$, $q_i=(H(Q)-m_i r)/j'^i \mod o$; a step is repeated until its $q \neq 0$ or $q_i \neq 0$. User A communicates r, $r_i$, q, $q_i$ openly. The argument is verified by checking that $g^{s_i}=ty_i^{c_i}$ and that $g^{H(Q)}=t^r t^q=t^{r_i} r_i^{q_i}$. User B wishing to communicate message M to user A produces an argument T whereby knowing sk implies knowing M as follows. Given challenges c, $c' \in C[l]$, user B communicates (y, s) where $y=g^M$, $s=d+(\Sigma c'_i m_i)+cM \mod o$. The argument is verified by checking that $g^s=t(\Pi y_i^{c'_i})y^c$. User A recovers $m_i$ as $(s_i-d)/c_i \mod o$ and M as $(s-d-\Sigma c_i m_i)/c \mod o$.

A sixth example of embodiments with verifiable communication is described. This example embodiment is a modification of the first example of embodiments with verifiable communication where user A and user B produce the argument T together, without user B knowing the private key corresponding to pk, which remains secret rather than shared between them. This technique applies to other embodiments where a Schnorr-like protocol is used for T. It demonstrates a case where sk is not a private key corresponding to the public key pk. User A sets up two sets of ElGamal parameters G, g, o and G', g', d', t', o' similarly, where G' is (possibly isomorphic to) a subgroup of $\mathbb{Z}^*_{o'}$ so that $g^{g^x}$ is well-defined for $x\in[o']$. User A communicates both (g, g') openly, establishing pk=(g, g'), sk=t', and G similarly, leaving d' secret. User A produces an argument of knowing sk as a signature S of Q (with d', t') similarly. Here, when an $x\in G'$ (e.g. t') appears in the exponent, a function $G'\to \mathbb{Z}^*_o$ with unpredictable image may apply to x. Any public cryptographic hash function on a binary form of x can be used.

User B wishing to communicate message M to user A produces an argument T whereby knowing sk implies knowing M as follows. First, user A communicates t' to user B privately using a traditional cryptographic communication system. Note that user B does not learn the secret d'. Next, user A randomly chooses $j'\in_R \mathbb{Z}^*_o$, computes k'=d'+j', and communicates u", v' where $u''=g^{g^{k'}}$, $v'=g^{j'}$. Note that since DLP is hard in G', only knowing d' allows producing u". User B verifies that $u''=g^{v't'}$. User B communicates u, y where $u=g^{t'}$, $y=g^M$. Given a challenge $c\in C[l]$, user B communicates s where s=t'+cM. The argument is verified by checking that $u^{v'}=u''$, $g^s=uy^c$. User A recovers M as (s−t')/c mod o.

A seventh example of embodiments with verifiable communication is described. This example embodiment is a modification of the third example of embodiments with verifiable communication where a Diffie-Helman-like protocol is used for constructing T. User A sets up G, g, d, t, o similarly. User A communicates (g, t) openly and communicates d securely to user B similarly, establishing pk=(g, d) and sk=d. User B produces an argument of knowing sk as a signature S of Q similarly. User B wishing to communicate message M to user A produces an argument T whereby knowing sk implies knowing M as follows. User B randomly chooses $j\in_R \mathbb{Z}^*_o$ and communicates j. Given a challenge $c\in C[l]$, user B communicates (y, s) where $y=g^M$, s=dj+cM mod o. The argument is verified by checking that $g^s=t^j y^c$. User A recovers M as (s−dj)/c mod o.

An eighth example of embodiments with verifiable communication is described. This example embodiment is a modification of the example of embodiments with verifiable communication where a blinding-like technique similar to that in the second example of embodiments with verifiable communication is applied. User A sets up G, g, d, t, o similarly. In addition, user A randomly chooses $j'\in_R \mathbb{Z}^*_o$ and communicates k, where k=d+j' mod o, securely to user B using a traditional cryptographic communication system, and communicates u where $n=g^{j'}$ openly. This establishes pk=(g, t, u) as a public key and sk=k as a secret key shared by both user A and user B, and the set G.

User B produces an argument of knowing sk as a signature S of Q similarly. User B wishing to communicate message M to user A produces an argument T whereby knowing sk implies knowing M as follows. User B randomly chooses $j\in_R \mathbb{Z}^*_o$ and communicates (j, v) where $v=g^{kj}$. Given a challenge $c\in C[l]$, user B communicates (y, s) where $y=g^M$, $s=k_j+cM$ mod o. The argument is verified by checking that $v=(tu)^j$, $g^s=vy^c$. User A recovers M as (s−kj)/c mod o.

A ninth example of embodiments with verifiable communication is described. This example embodiment is a modification of the third example of embodiments with verifiable communication where a Cramer-Shoup-like protocol is used for constructing T. User A sets up G, g, d, t, o similarly. User A wishing to receive a message from user B first randomly chooses $j_1, j_2, k_1, k_2 \in_R \mathbb{Z}^*_o$, then sets up a Cramer-Shoup key pair on G with z:=d, with generators $g_1, g_2$ where $g_1:=g$, and with $x_i:=j_i/d$ mod o, $y_i:=k_i/d$ mod o for $i\in\{1, 2\}$. This yields a public key (c', d', h) where $c'=g_1^{x_1}g_2^{x_2}$, $d'=g_1^{y_1}g_2^{y_2}$, $h=g_1^z=t$, a secret key $(x_1, x_2, y_1, y_2, z)$, and a cryptographic hash function H. User A communicates (t, $g_1, g_2$, c', d', h, $j_1, j_2, k_1, k_2$, H) openly and d securely to user B similarly, establishing pk=(t, $g_1, g_2$, c', d', h, $j_1, j_2, k_1, k_2$, H) and sk=d.

User B produces an argument of knowing sk as a signature S of Q similarly. User B wishing to communicate message M to user A produces an argument T as follows. User B randomly chooses j, k, $r\in_R \mathbb{Z}^*_o$, computes $w=g_1^j$, $u_1=g_1^k$, $u_2=g_2^k$, $y=g_1^M$, $e'=h^k y$, $\alpha=H(u_1, u_2, e')$, $v=c'^k d'^{k\alpha}$, $v'=v^d$, $a=g_1^r$, $b=v^r$ and posts (w, y, $u_1, u_2$, e', v, v'). User B verifiably communicates j for $g_1^j$ using one of the known methods. Given challenges $c_1, c_2\in C[l]$, user B computes $s=d+j+c_1 M$ mod o, $x=r+c_2 d$ mod o and communicates (s, x). Each of the challenges $c_1, c_2$ may be set to a function of $\alpha$. The argument is verified by recovering $\alpha$ as $H(u_1, u_2, e')$, checking that $g_1^x=ah^{c_2}$, $v^x=bv'^{c_2}$ which shows the same exponent appears in h, v' to bases $g_1$, v respectively, and checking that $g_1^s=hwy^{c_1}$ and $v'=u_1^{j_1}u_1^{j_2}(u_1^{k_1}u_2^{k_2})^\alpha$. User A recovers M as $(s-d-j)/c_1$ mod o.

A tenth example of embodiments with verifiable communication is described. This example embodiment uses a Schnorr-like protocol for constructing both T and S. User A wishing to receive a message from user B first constructs a group G, with generator g of prime order o of bit length l, where DLP is hard, a secret key $d\in_R Z_o^*$, and a corresponding public key $t=g^d$. This establishes the set G. User A communicates (g, t) openly and communicates d securely to user B using a traditional cryptographic communication system. This establishes pk=(g, t) as a public key and sk=d as a secret key shared by both user A and user B. User A produces an argument of knowing sk as S. User A chooses $r\in_R \mathbb{Z}^*_o$, sets $v:=g^r$, and communicates v. Given a challenge $c'\in C[l]$, user A communicates w:=r+c'd mod o. The argument is verified by checking that $g^w=vt^{c'}$. User B wishing to communicate message M to user A produces an argument T whereby knowing sk implies knowing M as follows. Given a challenge $c\in C[l]$, user B communicates (y, s) where $y:=g^M$, s:=d+cM mod o. The argument is verified by checking that $g^s=ty^c$. User A recovers M as (s−d)/c mod o.

An eleventh example of embodiments with verifiable communication is described. This example embodiment is a modification of the tenth example embodiment with verifiable communication where a blinding-like protocol is used. User A sets up G, g, o, d, t similarly. In addition, user A chooses $j\in_R Z_o^*$ and sets k:=d+j mod o, $u:=g^j$. User A communicates (g, t, u) openly and communicates k securely to user B similarly, establishing pk=(g, t, u) and sk=k. User A produces an argument of knowing sk as S. User A chooses $r\in_R \mathbb{Z}^*_o$, sets $v:=g^r$, and communicates v. Given a challenge $c'\in C[l]$, user A communicates w:=r+c'k mod o. The argument is verified by checking that $g^w=v(tu)^{c'}$. User B wishing to communicate message M to user A produces an argument T whereby knowing sk implies knowing M as follows. Given a challenge $c\in C[l]$, user B communicates (y, s) where $y:=g^M$, s:=k+cM mod o. The argument is verified by checking that $g^s=tuy^c$. User A recovers M as (s−k)/c mod o.

A twelfth example of embodiments with verifiable communication is described. This example embodiment uses a pairing. It includes a description of a method for constructing an argument of knowledge of a discrete logarithm. User A sets up G, g, d, t, o similarly with a pairing E: $G\times G\to G_T$, for which $\forall a, b\in \mathbb{Z}^*_o$: $E(g^a, g^b)=E(g, g)^{ab}$ and E(g, g) generates $G_T$. Two well-known ones are Weil and Tate pairings, which are efficient to compute. The order o may be chosen as a Solinas prime to allow for certain optimizations. This establishes the set G.

User A produces an argument of knowing sk as S as follows. User A chooses $a \in_R \mathbb{Z}^*_o$, sets $u:=g^a$, and posts u. To prove knowledge of d in t, user A sets s':=ad mod o and posts s'. The argument is verified by checking that $E(g, g)^{s'}=E(u, t)$. User A communicates d to user B by a traditional cryptographic protocol. User B wishing to communicate message M to user A produces an argument T as follows. User B sets $y:=g^M$ and posts y. User A sets s:=dM mod o and posts s. The argument is verified by checking that $E(g, g)^s=E(t, y)$. User A recovers M as s/d mod o.

A thirteenth example of embodiments with verifiable communication is described. This example embodiment is a modification of the twelfth example embodiment with verifiable communication where sk may be shared in the construction of multiple instances of the embodiment for communicating between the users. User A sets up G, g, d, t, o similarly with a pairing E: $G \times G \rightarrow G_T$. User A wishing to receive a message from user B produces an argument S similarly. This is only necessary in the first instance as will be understood next. User B wishing to communicate message M to user A produces an argument T as follows. First, M' is assumed to be a previous message that was verifiably communicated for $g^{M'}$ by user B to user A, using this method or one such as that of the tenth example of embodiments with verifiable communication, e.g. if this is the first instance. It is ensured no message verifiably communicated in this manner is ever repeated. Let $u:=g^{M'}$ which as assumed has been previously posted. Given a challenge $c \in C[l]$, user B computes s:=dM'+cM mod o and posts s. The argument is verified by setting v:=E(t, u), z:=E(g, y) so that $v=E(g, g)^{dM'}$, $z=E(g, g)^M$ and checking that $E(g, g)^s=vz^c$. User A recovers M as (s−dM')/c mod o.

A fourteenth example of embodiments with verifiable communication is described. This example embodiment is a modification of the twelfth example embodiment with verifiable communication where an eth root of a discrete logarithm is communicated. It includes a description of a method for constructing an argument of knowledge of an eth-root of a discrete logarithm. User A sets up G, g, d, t, o similarly with a pairing E: $G \times G \rightarrow G_T$ where DLP in G, $G_T$ and eth-root of the discrete logarithm in G are hard. However, in this case, for a fixed e, user A chooses $x \in_R \mathbb{Z}^*_o$ and sets $d:=x^e$ mod o, so x is a root of a discrete logarithm of t. This establishes sk=x instead of d, and the set G. User A produces an argument of knowing sk as S as follows. User A chooses $a \in_R \mathbb{Z}^*_o$, sets $u:=g^{a^e}$, and posts u. To prove knowledge of x in t, user A sets s':=ax mod o and posts s'. The argument is verified by checking that $E(g, g)^{s'^e}=E(u, t)$. User A communicates x to user B by a traditional cryptographic protocol. User B wishing to communicate message M to user A produces an argument T as follows. User B sets $y:=g^{M^e}$ and posts y. User A sets s:=xM mod o and posts s. The argument is verified by checking that $E(g, g)^{s^e}=E(t, y)$. User A recovers M as s/x mod o.

A fifthteenth example of embodiments with verifiable communication is described. This example embodiment is a modification of the twelfth example embodiment with verifiable communication where a double-discrete logarithm is communicated. It includes a description of a method for constructing an argument of knowledge of a double-discrete logarithm. User A sets up G, g, d, t, o similarly with a pairing E: $G \times G \rightarrow G_T$ where DLP in G, $G_T$ and double-discrete logarithm problem in G are hard. However, in this case, for a fixed h of order o' in $\mathbb{Z}^*_o$, user A chooses $x \in_R \mathbb{Z}^*_o$, and sets $d:=h^x$ mod o, so x is a double discrete logarithm of t. This establishes sk=x instead of d, and the set G. User A produces an argument of knowing sk as S as follows. User A chooses $a \in_R \mathbb{Z}^*_o$, sets $u:=g^{h^a}$, and posts u. To prove knowledge of x in t, user A sets s':=a+x mod o and posts s'. The argument is verified by checking that $E(g, g)^{h^{s'}}=E(u, t)$. User A communicates x to user B by a traditional cryptographic protocol. User B wishing to communicate message M to user A produces an argument T as follows. User B sets $y:=g^{h^M}$ and posts y. User A sets s:=x+M mod o and posts s. The argument is verified by checking that $E(g, g)^{h^s}=E(t, y)$. User A recovers M as s−x mod o.

A sixteenth example of embodiments with verifiable communication is described. This example embodiment is a modification of the twelfth example embodiment with verifiable communication where an eth-root of a discrete logarithm is communicated using Schnorr-like protocols. It includes a description of a method for constructing an argument of knowledge of an eth-root of a discrete logarithm. User A sets up G, g, d, t, o similarly with a pairing E: $G \times G \rightarrow G_T$ where DLP in G, $G_T$ and root-of-discrete-logarithm problem in G are hard. For a fixed e, user A chooses $x \in_R \mathbb{Z}^*_o$ and sets $d:=x^e$ mod o, so x is a root of discrete logarithm of t. User A communicates x to user B by a traditional cryptographic protocol. This establishes sk=x instead of d, and pk, G similarly. User A produces an argument of knowing sk as S as follows. User A chooses a, $r \in_R \mathbb{Z}^*_o$, sets $u:=g^{r^e}$, $v:=g^a$, and posts u, v. Given a challenge $c' \in C[l]$, user A sets $v':=g^{a^{c'}}$, $u':=ax^c$ mod o, $t':=g^{x^{c'e}}$, s':=rx$^{c'}$ mod o and posts v', u', t', s'. The argument is verified by setting $u'':=g^{u'^e}$ and checking that E(g, u'')=E(v', t'), E(v, t)=E(g, $g^{u'}$), E(v', $g^{s^{s'}}$)=E(u, u''). User B wishing to communicate message M to user A produces an argument T as follows. User B chooses $b \in_R \mathbb{Z}^*_o$, sets $w:=g^b$, $y:=g^{M^e}$ and posts w, y. Given a challenge $c \in C[l]$, user A sets $w':=g^{b^c}$, $z:=bM^e$ mod o, $y':=g^{M^{ce}}$, s:=xM mod o and posts w', z, y', s. The argument is verified by setting $z':=g^z$ and checking that E(g, z')=E(w', y'), E(w, y)=E(g, $g^z$), E(w', $g^{s^e}$)=E(t, z'). User A recovers M as $(s/x)^{1/c}$ mod o.

A seventeenth example of embodiments with verifiable communication is here described. This example embodiment is a modification of the twelfth example embodiment with verifiable communication where a double-discrete logarithm is communicated using Schnorr-like protocols. It includes a description of a method for constructing an argument of knowledge of a double-discrete logarithm. User A sets up G, g, d, t, o similarly with a pairing E: $G \times G \rightarrow G_T$ where DLP in G, $G_T$ and double-discrete logarithm problem in G are hard. For a fixed h of order o' in $\mathbb{Z}^*_o$, user A chooses $x \in_R \mathbb{Z}^*_o$, and sets $d:=h^x$ mod o, so x is a double discrete logarithm of t. User A communicates x to user B by a traditional cryptographic protocol. This establishes sk=x instead of d, and pk, G similarly. User A produces an argument of knowing sk as S as follows. User A chooses $a \in_R \mathbb{Z}^*_o$, $r \in \mathbb{Z}^*_{o'}$, sets $u:=g^{h^r}$, $v:=g^a$, and posts u, v. Given a challenge $c' \in C[l]$, user A sets $v':=g^{a^{c'}}$, $u':=ah^x$ mod o, $t':=g^{h^{c'x}}$, s':=r+c'x mod o and posts v', u', t', s'. The argument is verified by setting $u'':=g^{u'^e}$ and checking that E(g, u'')=E(v', t'), E(v, t)=E(g, $g^{u'}$), E(v', $g^{h^{s'}}$)=E(u, u''). User B wishing to communicate message M to user A produces an argument T as follows. User B chooses $b \in_R \mathbb{Z}^*_o$, sets $w:=g^b$, $y:=g^{h^M}$ and posts w, y. Given a challenge $c \in C[l]$, user A sets $w':=g^{b^c}$, $z:=bh^M$ mod o, $y':=g^{h^{cM}}$, s:=x+cM mod o and posts w', z, y', s. The argument is verified by setting $z':=g^z$ and checking that E(g, z')=E(w', y'), E(w, y)=E(g, $g^z$), E(w', $g^{h^s}$)=E(t, z'). User A recovers M as (s−x)/c mod o.

An eighteenth example of embodiments with verifiable communication is here described. This example embodiment is a modification of the fourteenth example embodiment with verifiable communication where a plain protocol is used for constructing argument T. User A sets up G, g, x, d, t, o, E similarly. This establishes sk=x and the set G. User A produces an argument of knowing sk as S similarly. User B wishing to communicate message M to user A produces an argument T as follows. User B computes a:=M/x mod o and posts a. The argument is verified by computing y:=$t^{a^e}$, noting that y=$g^{M^e}$. User A recovers M as ax mod o.

A nineteenth example of embodiments with verifiable communication is described.

This example embodiment is a modification of the twelfth example embodiment with verifiable communication where a plain protocol is used for constructing argument T. User A sets up G, g, x, d, t, o, h, E similarly. This establishes sk=x and the set G. User A produces an argument of knowing sk as S similarly. User B wishing to communicate message M to user A produces an argument T as follows. User B computes a:=M−x mod o and posts a. The argument is verified by computing y:=$t^{h^a}$, noting that y=$g^{h^M}$. User A recovers M as a+x mod o.

A twentieth example of embodiments with verifiable communication is described. The example includes a description of a method for verifiable communication of an ElGamal encryption of a message. User A sets up two sets of ElGamal parameters G, g, o and G', g', d', t', o' similarly with a pairing E: G×G→$G_T$, where G' is (possibly isomorphic to) a subgroup of $\mathbb{Z}^*_o$, so that $g^{g^x}$ is well-defined for x∈[o'], such that DLP in G, G', $G_T$ and double-discrete logarithm problem in G are hard. Let b in t:=$g^{g^b}$ be a secret shared by Alice and Bob. Bob proves knowledge of b using a double-discrete logarithm method as described above. To verifiably communicate k in y:=$g^{g^k}$ to Bob, Alice posts z:=$g'^a$ for a:=k−b mod o'. One can determine y as $t^z$ and infer that Bob can recover $g^{t^k}$ mod o' as z$g^{t^b}$ mod o'. Alice verifiably communicates a message M∈[o'] as follows. Alice posts a commitment m to M where m:=$g^M$ mod o. Alice posts s where s:=M$g^{t^k}$ mod o'. The argument is verified by checking that E(g, $g^s$)=E(m, y). Bob recovers M as s/$g^{t^k}$ mod o'. The pair of posts z, s by Alice constitute an ElGamal encryption in G' having a shared secret $g^{t^k}$.

A twenty-first example of embodiments with verifiable communication is here described. This example includes a description of a method for verifiable communication of a Paillier encryption of a message. Alice and Bob do not know the Paillier secrets. The public Paillier parameters are a generator g and a modulus $n^2$. Alice and Bob use a traditional cryptographic protocol to share a secret a∈$_R$ $\mathbb{Z}^*_n$. Bob proves knowledge of a in t:=$g^a$ mod $n^2$ using a DL method, for which some choices have been described above, resulting in posting t. For a given M∈$\mathbb{Z}_n$, Alice choose r∈$_R$ $\mathbb{Z}^*_n$, sets y:=$g^M r^n$ mod $n^2$ and posts y which is a Paillier encryption of M. Given a challenge c∈$\mathbb{Z}_n$, Alice sets s:=a+cM, u:=$r^c$ mod $n^2$ and posts s, u. This argument is verified by checking that $ty^c$=$g^s u^n$ mod $n^2$.

A twenty-second example of embodiments with verifiable communication is described. This example includes a description of a method for verifiable communication of a RSA secret d. Let g be a generator of a group G of order o for which DLP is hard where o:=(p−1)(q−1), n:=pq for p, q large primes of similar bit length, let (d, n), (e, n) be a RSA key pair known to Alice, and let e, n, g, G be public. Alice commits to y:=$g^d$ mod n and t:=$g^r$ mod n for r∈$_R$ $\mathbb{Z}^*_n$. Given a challenge c, Alice posts s:=r+cd. Now it can be verified that $y^e$=g mod n and that $g^s$=$ty^c$ mod n or $g^{se}$=$t^e g^c$ mod n. Finally, Alice verifiably communicates r for $g^r$ mod n to Bob.

A twenty-third example of embodiments with verifiable communication is described. This example involves commitments with selected openings. Groups $G_1$, $G_2$, with corresponding generators $g_1$, $g_2$ of large prime order o of bit length l, are set up such that DLP is hard in $G_1$, $G_2$. Let E: $G_1 \times G_2 \to G_T$ be a pairing, for which ∀a, b∈$\mathbb{Z}_o$: E($g_1^a$, $g_2^b$)=E($g_1$, $g_2$)$^{ab}$ and E($g_1$, $g_2$) generates $G_T$, such that DLP is hard in $G_T$. Let n∈$\mathbb{N}$, let i range over [n], and let $a_i$∈$\mathbb{Z}_o$ be public.

For the commitment, Peter chooses secrets r, x∈$_R$ $\mathbb{Z}_o$, sets t:=$g_1^r$, y:=$g_2^x$, z:=E(t, y), and posts t, z. This commits to $rx/a_i$ mod o for i∈[n] and to r. For the openings, given I⊆[n], Peter reveals $y_i$:=$g_2^{x_i}$ where $x_i$:=$rx/a_i$ mod o for i∈I. Victor verifies this opening by checking that E($g_1$, $y_i^{a_i}$)=z. For verifiable communication of the openings, Peter verifiably communicates the DL of t to base $g_1$, namely r, and of z to base E($g_1$, $g_2$), namely x':=rx mod o, to Robert using available methods. Robert recovers x as x'/r mod o and, on commitment opening, $x_i$ as $x'/a_i$ mod o for i∈I.

This method may be enhanced as follows. It may be iterated, parallelized or distributed, in any order or incrementally, over the independent steps of i. Hash commitments $h(y_i)$ may be used at the time of commitment and checked at the time of opening, using the revealed $y_i$, whence $h(y_i)$ may be used to effectively limit $rx/a_i$ mod o to one solution for a non-prime o. Random $a_2$, e.g. from a public random number generator such that one seed number suffices for recovering all $a_i$, may be used.

In the embodiments described here, unless explicitly stated otherwise, a message to-be-delivered may be identified with its possibly padded binary form and a corresponding number M. If M is no greater than the cardinality of the set G of a given embodiment, then M is identified with the Mth element of G. Otherwise, standard techniques apply, including applying the system to each small enough part of the message, as well as using a hybrid cryptosystem where the present system is used for key encapsulation and a standard symmetric cryptosystem for data encapsulation. The same techniques apply if M is used in an exponent of a group generator and M is greater than the cardinality of the group.

In certain embodiments a well-known message is used. In this case, unless explicitly stated otherwise, the well-known message is identified with a number Q and the Qth element of G similarly. Other standard techniques apply for choosing the well-known message, including using a trusted party to choose it. For security of arguments, specifically S, the well-known message is chosen in an unpredictable manner only after the setup part is complete, such as by applying a cryptographic hash function to data including pk. Unless stated otherwise, a random choice means a draw with uniform probability from a set that is understood from the context.

In certain embodiments a traditional cryptographic protocol may be used to communicate a secret between users so that the secret is shared between the users. In this case, both traditional encryption and secret sharing methods may be used to establish such a shared secret. A challenge c to a communicating user includes an element in a specified set, not chosen or feasibly predictable by this user, derived from possibly random data, and provided by a user or a third-party. This definition includes challenges computed as a cryptographic hash function applied to data. The set C[l] is often used for challenges, where C[l] is a large enough range of large integers that is designed to ensure a challenge chosen from it effectively introduces sufficient randomization into formulas where the challenge appears. C[l] may be set to the range of integers having a leading 1 bit followed by k bits, for some k>$\log_2(l)$, and (unless otherwise stated) l may be set to the group order o if the challenge provider knows o and otherwise to a number known to be significantly higher than o. Such a number can typically be determined. For example, for RSA, with public parameter n, l=n may be set.

In some embodiments described below c is inverted modulo o, and for this inversion to be well-defined, c must be co-prime to o. The probability c is not co-prime to o is extremely small, comparable to the probability of factoring o or of breaking the RSA cryptosystem simply by guessing a secret parameter. In some case, such as when elements of C[l] are operated on with XOR ($\oplus$ notation), C[l] may be set to $\{1, 2, \ldots, 2^k\}$. It should be understood that protocols are intended to be followed if they would pass verification and otherwise may be aborted. In this description, DL stands for discrete-logarithm and DLP for discrete-logarithm problem.

Some embodiments here are constructed by using one cryptographic primitive for each of the arguments S and T. Each cryptographic primitive has its own advantages, which often carry over to the embodiment using it. As a first example, the Schnorr primitive used in some embodiments has the advantage of computational zero-knowledge, i.e. it is infeasible for a computationally bounded adversary to learn anything about M, under a standard assumption that DLP is hard in G. As a second example, the ElGamal primitive used in some embodiments has security advantages under the Decisional Diffie-Helman (DDH) assumption. In practice, selecting an embodiment to use, out of the many available ones, is often driven at least in part by such considerations.

Some embodiments here are constructed as interactive protocols. These protocols may be converted to non-interactive ones using well-known techniques, such as Fiat-Shamir transform and signatures of knowledge.

The description of each embodiment details explicit realizations of the system elements. These are G, sk, pk, M, S, T. Taken together, S and T verify the communication of M. Other embodiment-specific elements may also appear. Though the descriptions refer to "user A", "user B", or similar in singular form, that should not be interpreted to limit the number of parties playing the role of the described user.

Mathematical writing follows standard cryptography notation. Letters, possibly with primes, denote variables, so A, A', A", a, a', a" are distinct. Usually, small letters denote numbers or set elements and capital letters denote objects. pk and sk, possibly tuples, denote public and secret key respectively. Subscript denotes an index, which is part of a variable notation. Superscript denotes an exponent of a power. Curly braces denote a set description. Brackets denote indexing or dependencies, as will be understood from the context. Parentheses with commas denote a tuple or a function application as will be understood from the context. mod n denotes arithmetics modulo n. The notation a∥b denotes concatenation of string representations of a and b. The notation $\in_R$ denotes drawing an element with uniform probability from a set. For n∈ℕ, the notation [n] denotes the set $\{1, \ldots, n\}$. Other symbols have standard mathematical interpretation.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the processing of a computer program include, byway of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed:

1. A method comprising:
configuring an encyphered resource gateway controlling a shared channel;
configuring a first security domain and a second security domain, both connected to the shared channel;
using, at the first security domain, a manifest generator configured to produce a manifest including an encyphered resource;
transferring, from the first security domain via the shared channel and with the second security domain as destination, the manifest including the encyphered resource as a message;
intercepting, at the encyphered resource gateway controlling the shared channel, the message;
using, at the encyphered resource gateway, a manifest verifier to enforce a policy with respect to the manifest and the encyphered resource without decrypting the encyphered resource; and
determining, at the encyphered resource gateway and according to the policy, an action in response to the transferring.

2. The method of claim 1 further comprising:
transferring the encyphered resource from the first security domain to the second security domain; and
ensuring, using the policy, the encyphered resource may only be transferred to allowed recipients.

3. The method of claim 1 further comprising:
defining rules within the policy with respect to senders, recipients, and/or properties of resources; and
using a rules enforcer to enforce the policy and determine the action.

4. The method of claim 3 further comprising:
using traces capturing information about grants and revocation orders; and
consulting, by the rules enforcer, the traces to grant, revoke, and administer rights to access resources.

5. The method of claim 4, further comprising:
storing the traces in a traces storage engine; and
fetching the traces from the traces storage engine for the consulting.

6. The method of claim 1 further comprising:
defining risk limits within the policy; and
verifying compliance with the risk limits.

7. The method of claim 1 further comprising:
determining selected aspects of the message; and
allowing the transferring, blocking the transferring, or raising an alert in response to the transferring.

8. A non-transitory computer-readable medium storing executable instructions that when executed by at least one processor cause the at least one processor to:
configure an encyphered resource gateway controlling a shared channel;
configure a first security domain and a second security domain, both connected to the shared channel;
use, at the first security domain, a manifest generator configured to produce a manifest including an encyphered resource;
transfer, from the first security domain via the shared channel and with the second security domain as destination, the manifest including the encyphered resource as a message;
intercept, at the encyphered resource gateway controlling the shared channel, the message;
use, at the encyphered resource gateway, a manifest verifier to enforce a policy with respect to the manifest and the encyphered resource without decrypting the encyphered resource; and
determine, at the encyphered resource gateway and according to the policy, an action in response to the transferring.

9. The non-transitory computer-readable medium of claim 8, wherein the instructions, when executed by the at least one processor, are further configured to cause the at least one processor to:
transfer the encyphered resource from the first security domain to the second security domain; and
ensure, using the policy, the encyphered resource may only be transferred to allowed recipients.

10. The non-transitory computer-readable medium of claim 8, wherein the instructions, when executed by the at least one processor, are further configured to cause the at least one processor to:
define rules within the policy with respect to senders, recipients, and/or properties of resources; and
use a rules enforcer to enforce the policy and determine the action.

11. The non-transitory computer-readable medium of claim 10, wherein the instructions, when executed by the at least one processor, are further configured to cause the at least one processor to:
use traces capturing information about grants and revocation orders; and
consult, by the rules enforcer, the traces to grant, revoke, and administer rights to access resources.

12. The non-transitory computer-readable medium of claim 11, wherein the instructions, when executed by the at least one processor, are further configured to cause the at least one processor to:
store the traces in a traces storage engine; and
fetch the traces from the traces storage engine for the consulting.

13. The non-transitory computer-readable medium of claim 8, wherein the instructions, when executed by the at least one processor, are further configured to cause the at least one processor to:
defining risk limits within the policy; and
verifying compliance with the risk limits.

14. The non-transitory computer-readable medium of claim 8, wherein the instructions, when executed by the at least one processor, are further configured to cause the at least one processor to:
determining selected aspects of the message; and
allowing the transferring, blocking the transferring, or raising an alert in response to the transferring.

15. A system comprising:
at least one processor; and
at least one memory, the at least one memory storing a set of instructions, which, when executed, cause the at least one processor to:
configure an encyphered resource gateway controlling a shared channel;
configure a first security domain and a second security domain, both connected to the shared channel;

use, at the first security domain, a manifest generator configured to produce a manifest including an encyphered resource;

transfer, from the first security domain via the shared channel and with the second security domain as destination, the manifest including the encyphered resource as a message;

intercept, at the encyphered resource gateway controlling the shared channel, the message;

use, at the encyphered resource gateway, a manifest verifier to enforce a policy with respect to the manifest and the encyphered resource without decrypting the encyphered resource; and determine, at the encyphered resource gateway and according to the policy, an action in response to the transferring.

16. The system of claim 15, wherein the instructions, when executed by the at least one processor, are further configured to cause the at least one processor to:

transfer the encyphered resource from the first security domain to the second security domain; and ensure, using the policy, the encyphered resource may only be transferred to allowed recipients.

17. The system of claim 15, wherein the instructions, when executed by the at least one processor, are further configured to cause the at least one processor to:

define rules within the policy with respect to senders, recipients, and/or properties of resources; and use a rules enforcer to enforce the policy and determine the action.

18. The system of claim 17, wherein the instructions, when executed by the at least one processor, are further configured to cause the at least one processor to:

use traces capturing information about grants and revocation orders; and consult, by the rules enforcer, the traces to grant, revoke, and administer rights to access resources.

19. The system of claim 18, wherein the instructions, when executed by the at least one processor, are further configured to cause the at least one processor to:

store the traces in a traces storage engine; and fetch the traces from the traces storage engine for the consulting.

20. The system of claim 15, wherein the instructions, when executed by the at least one processor, are further configured to cause the at least one processor to:

defining risk limits within the policy; and verifying compliance with the risk limits.

21. The system of claim 15, wherein the instructions, when executed by the at least one processor, are further configured to cause the at least one processor to:

determining selected aspects of the message; and allowing the transferring, blocking the transferring, or raising an alert in response to the transferring.

* * * * *